US011710255B2

United States Patent
Frei et al.

(10) Patent No.: US 11,710,255 B2
(45) Date of Patent: *Jul. 25, 2023

(54) MANAGEMENT AND DISPLAY OF OBJECT-COLLECTION DATA

(71) Applicant: TerraClear Inc., Bellevue, WA (US)

(72) Inventors: Brent Ronald Frei, Bellevue, WA (US); Dwight Galen McMaster, Burien, WA (US); Michael Racine, Bellevue, WA (US); Jacobus du Preez, Snoqualmie, WA (US); William David Dimmit, Seattle, WA (US); Isabelle Butterfield, Bellevue, WA (US); Clifford Holmgren, Spanaway, WA (US); Dafydd Daniel Rhys-Jones, Tacoma, WA (US); Thayne Kollmorgen, Eugene, OR (US); Vivek Ullal Nayak, Seattle, WA (US)

(73) Assignee: TerraClear Inc., Bellevue, WA (US)

( * ) Notice: Subject to any disclaimer, the term of this patent is extended or adjusted under 35 U.S.C. 154(b) by 16 days.

This patent is subject to a terminal disclaimer.

(21) Appl. No.: 17/381,925

(22) Filed: Jul. 21, 2021

(65) Prior Publication Data

US 2021/0358104 A1 Nov. 18, 2021

Related U.S. Application Data

(63) Continuation of application No. 16/510,708, filed on Jul. 12, 2019, now Pat. No. 11,074,680.

(Continued)

(51) Int. Cl.
*G06K 9/00* (2022.01)
*G06K 9/46* (2006.01)
(Continued)

(52) U.S. Cl.
CPC .............. *G06T 7/74* (2017.01); *A01B 43/00* (2013.01); *A01B 59/042* (2013.01);
(Continued)

(58) Field of Classification Search
CPC ........... G06T 7/0002; G06T 7/62; G06T 7/73; G06T 7/13; G06T 7/70; G06T 3/00;
(Continued)

(56) References Cited

U.S. PATENT DOCUMENTS 6,456,991 B1 9/2002 Srinivasa et al.
6,792,147 B1 9/2004 Saka et al.
(Continued)

FOREIGN PATENT DOCUMENTS

BE 1024513 B1 3/2018
CA 2 359 237 A1 8/2000
(Continued)

OTHER PUBLICATIONS

Shi et al., "Ship Classification Based on Multifeature Ensemble with Convolutional Neural Network," Remote Sensing, Feb. 18, 2019, 21 pages.
(Continued)

*Primary Examiner* — David F Dunphy
(74) *Attorney, Agent, or Firm* — Seed Intellectual Property Law Group LLP

(57) ABSTRACT

An object identification and collection method is disclosed. The method includes receiving a pick-up path that identifies a route in which to guide an object-collection system over a target geographical area to pick up objects, determining a current location of the object-collection system relative to the pick-up path, and guiding the object-collection system along the pick-up path over the target geographical area based on the current location. The method further includes capturing images in a direction of movement of the object-collection system along the pick-up path, identifying a target object in the images; tracking movement of the target object
(Continued)

through the images, determining that the target object is within range of an object picker assembly on the object-collection system based on the tracked movement of the target object, and instructing the object picker assembly to pick up the target object.

18 Claims, 58 Drawing Sheets

Related U.S. Application Data

(60) Provisional application No. 62/697,057, filed on Jul. 12, 2018.

(51) Int. Cl.

| | | |
|---|---|---|
| *G06T 7/73* | (2017.01) | |
| *B64C 39/02* | (2023.01) | |
| *G06T 7/00* | (2017.01) | |
| *G08G 5/00* | (2006.01) | |
| *G06T 7/13* | (2017.01) | |
| *G06T 7/70* | (2017.01) | |
| *G05D 1/10* | (2006.01) | |
| *G06T 7/62* | (2017.01) | |
| *A01B 43/00* | (2006.01) | |
| *A01B 69/00* | (2006.01) | |
| *A01B 59/042* | (2006.01) | |
| *B64D 47/08* | (2006.01) | |
| *G05D 1/00* | (2006.01) | |
| *G06T 3/00* | (2006.01) | |
| *G06T 7/60* | (2017.01) | |
| *G06N 3/08* | (2023.01) | |
| *G06V 20/10* | (2022.01) | |
| *G06F 18/211* | (2023.01) | |
| *G06F 18/214* | (2023.01) | |
| *G06F 18/21* | (2023.01) | |
| *G06F 18/20* | (2023.01) | |
| *G06N 3/045* | (2023.01) | |
| *G06V 10/20* | (2022.01) | |
| *G06V 20/00* | (2022.01) | |
| *B64U 101/00* | (2023.01) | |
| *B64U 101/30* | (2023.01) | |
| *B64U 101/60* | (2023.01) | |

(52) U.S. Cl.
CPC .......... *A01B 69/001* (2013.01); *B64C 39/024* (2013.01); *B64D 47/08* (2013.01); *G05D 1/0038* (2013.01); *G05D 1/101* (2013.01); *G06F 18/211* (2023.01); *G06F 18/214* (2023.01); *G06F 18/217* (2023.01); *G06F 18/2163* (2023.01); *G06F 18/285* (2023.01); *G06N 3/045* (2023.01); *G06N 3/08* (2013.01); *G06T 3/00* (2013.01); *G06T 7/0002* (2013.01); *G06T 7/13* (2017.01); *G06T 7/60* (2013.01); *G06T 7/62* (2017.01); *G06T 7/70* (2017.01); *G06T 7/73* (2017.01); *G06V 10/255* (2022.01); *G06V 20/10* (2022.01); *G06V 20/188* (2022.01); *G06V 20/38* (2022.01); *G08G 5/0034* (2013.01); *G08G 5/0069* (2013.01); *B64U 2101/00* (2023.01); *B64U 2101/30* (2023.01); *B64U 2101/60* (2023.01); *B64U 2201/20* (2023.01); *G06T 2207/10032* (2013.01); *G06T 2207/20081* (2013.01); *G06T 2207/20084* (2013.01); *G06T 2207/20104* (2013.01); *G06T 2207/30188* (2013.01); *G06T 2207/30244* (2013.01)

(58) Field of Classification Search
CPC ......... G06T 7/60; A01B 43/00; A01B 59/042; A01B 69/001; B64C 39/024; B64D 47/08; G05D 1/0038; G05D 1/101; G06K 9/0063; G06K 9/00657; G06K 9/00664; G06K 9/4604; G06K 9/6227; G06K 9/6228; G06K 9/6256; G06K 9/6261; G06K 9/6262; G06N 3/0454; G06N 3/08; G08G 5/0034; G08G 5/0069
See application file for complete search history.

(56) References Cited

U.S. PATENT DOCUMENTS

| | | |
|---|---|---|
| 8,903,177 B2 | 12/2014 | Livet et al. |
| 9,607,220 B1 | 3/2017 | Smith et al. |
| 10,189,568 B2 | 1/2019 | O'Connor et al. |
| 10,303,172 B2 | 5/2019 | Hwang et al. |
| 10,796,275 B1 * | 10/2020 | Wilkins ................. A01D 46/30 |
| 10,861,184 B1 * | 12/2020 | Kalakrishnan ............ G06T 7/60 |
| 2003/0165258 A1 * | 9/2003 | Kubota ..................... G06T 7/12 382/199 |
| 2008/0159622 A1 | 7/2008 | Agnihotri et al. |
| 2009/0038186 A1 | 2/2009 | Osswald et al. |
| 2010/0250024 A1 | 9/2010 | Macedo Ribeiro et al. |
| 2011/0053642 A1 | 3/2011 | Lee |
| 2011/0305445 A1 | 12/2011 | Yasuda et al. |
| 2012/0124037 A1 | 5/2012 | Lee et al. |
| 2012/0201469 A1 | 8/2012 | Livet et al. |
| 2012/0290152 A1 | 11/2012 | Cheung et al. |
| 2014/0007730 A1 | 1/2014 | DeLouis |
| 2014/0211987 A1 | 7/2014 | Fan et al. |
| 2014/0343955 A1 | 11/2014 | Raman |
| 2016/0063420 A1 | 3/2016 | Tomii et al. |
| 2016/0070265 A1 | 3/2016 | Liu et al. |
| 2016/0202227 A1 | 7/2016 | Mathur et al. |
| 2016/0340120 A1 | 11/2016 | Curotto et al. |
| 2016/0378109 A1 | 12/2016 | Raffa et al. |
| 2017/0154273 A1 | 6/2017 | Guttman |
| 2017/0300514 A1 | 10/2017 | Yan et al. |
| 2017/0351933 A1 | 12/2017 | Bleiweiss |
| 2018/0109767 A1 | 4/2018 | Li et al. |
| 2018/0150718 A1 | 5/2018 | Omari et al. |
| 2018/0319396 A1 | 11/2018 | Foster et al. |
| 2018/0335779 A1 | 11/2018 | Fisher et al. |
| 2019/0028676 A1 | 1/2019 | Koga et al. |
| 2019/0050685 A1 | 2/2019 | Kaminski et al. |
| 2019/0166765 A1 | 6/2019 | Maor |
| 2019/0318636 A1 | 10/2019 | Gu |

FOREIGN PATENT DOCUMENTS

| | | | |
|---|---|---|---|
| CA | 3034059 | * 2/2018 | ............ A01D 46/24 |
| KR | 10-2017-0065337 A | 6/2017 | |
| WO | 2008/048700 A2 | 4/2008 | |
| WO | 2013/097252 A1 | 7/2013 | |
| WO | 2016/123656 A1 | 8/2016 | |
| WO | 2017/077543 A1 | 5/2017 | |
| WO | 2017/144291 A1 | 8/2017 | |
| WO | 2017/170651 A1 | 10/2017 | |
| WO | 2017/199088 A1 | 11/2017 | |
| WO | 2018/087546 A1 | 5/2018 | |
| WO | 2018/201180 A | 11/2018 | |

OTHER PUBLICATIONS

Wen et al., "Ensemble of Deep Neural Networks with Probability-Based Fusion for Facial Expression Recognition," *Cogn Comput* 9:597-610, 2017.

* cited by examiner

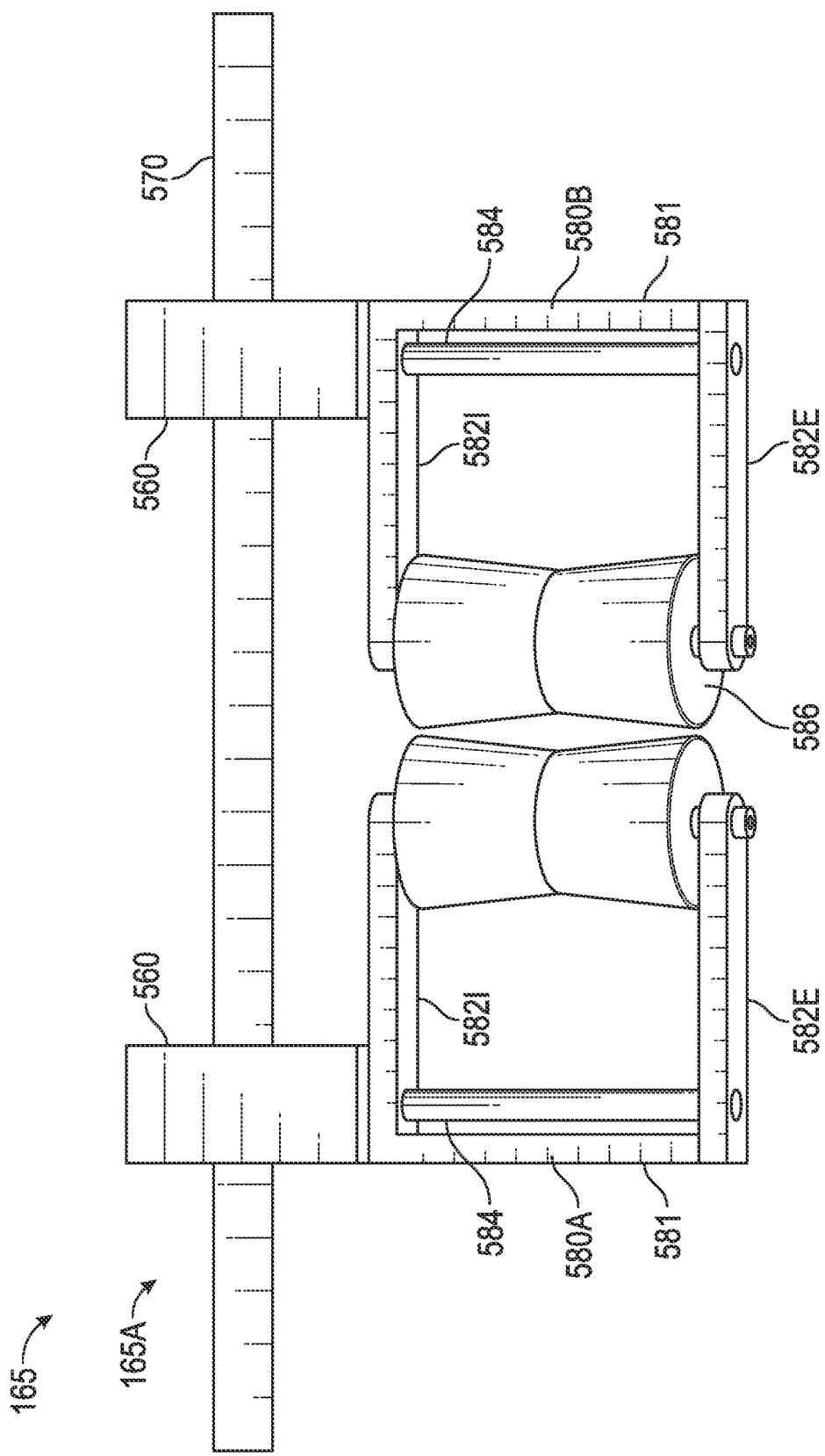

MANAGEMENT AND DISPLAY OF OBJECT-COLLECTION DATA

TECHNICAL FIELD

The present disclosure relates generally to the identification, tracking, mapping, and collection of objects from the ground or a field.

BACKGROUND

Description of the Related Art

Rocks in agricultural fields present a problem to farmers across the country and throughout the world. Rocks can foul up and interfere with the operation of automated, expensive agricultural equipment, such as mechanized seeders and combines. Rocks also present safety hazards to farmers and their land, such as from sparks arising from contact with rotating metallic equipment. These issues can result in expensive repair, lost productivity, and the need for careful planning.

While a number of implements—such as rakes, windrowers, and sieves, or combinations thereof—can be used to clear fields of rocks and other objects, they generally include manual operation and still have a high rate of failure (i.e., they often miss rocks). This failure rate often results in multiple passes by these implements and they are often supplemented by human intervention to pick rocks that are left behind. Such manual operation and human picking intervention involves expenditure on the labor required, and is often slow and unpleasant work. It is with respect to these and other considerations that the embodiments described herein have been made.

BRIEF SUMMARY

Embodiments are generally directed to the use of an object-collection system to pick up objects from a target geographical area. Images of the target geographical area are analyzed to identify and locate the objects within the target geographical area. The locations of the identified objects are utilized to guide the object-collection system over the target geographical area towards the objects to pick up and remove the identified objects from the target geographical area.

A method may be summarized as including receiving a pick-up path that identifies a route in which to guide a object-collection system over a target geographical area to pick up objects; determining a current location of the object-collection system relative to the pick-up path; guiding the object-collection system along the pick-up path over the target geographical area based on the current location; capturing a plurality of images in a direction of movement of the object-collection system along the pick-up path; identifying a target object in the plurality of images based on a dataset of known object features; tracking movement of the target object through the plurality of images; determining that the target object is within range of a object picker assembly on the object-collection system based on the tracked movement of the target object; and instructing the object picker assembly to pick up the target object. Guiding the object-collection system along the pick-up path may include selecting a travel waypoint on the pick-up path; determining a travel direction from the current location to the travel waypoint; and providing guide information from the current location to the travel waypoint on the pick-up path.

The method may further include displaying, to a user, guide information from the current location to a location of a next target object.

The method may further include determining guide information from the current location to a location of a next target object; and presenting automatic travel instructions to a motor-control system that autonomously controls the object-collection system to the location of the next target object.

The method may further include obtaining a plurality of image tracking portions of a first image of the plurality of images; determining a feature characteristic in each of the plurality of image tracking portions; tracking movement of the feature characteristic across the plurality of images; determining a speed of movement of each feature characteristic based on the tracked movement; and determining an overall speed of the object-collection system based on a combination of the speed of movement of each feature characteristic for the plurality of image tacking portions.

The method may further include displaying the plurality of images to a user; and displaying a representation of the pick-up path to the user. Displaying the plurality of images may include detecting a boundary of the target object; and augmenting the plurality of images to include the boundary of the target object.

A object-collection system may be summarized as including a object picker assembly configured to capture a target object; a camera configured to capture a plurality of images in a direction of movement of the object-collection system; a processor; and a memory that stores computer instructions that, when executed by the processor, cause the processor to: receive a pick-up path that identifies a route in which to guide the object-collection system over a target geographical area to pick up objects; determine a current location of the object-collection system relative to the pick-up path; guide the object-collection system along the pick-up path over the target geographical area based on the current location; capture the plurality of images via the camera as the object-collection system is traveling over the target geographical area; identify the target object in the plurality of images based on a dataset of known object features; track movement of the target object through the plurality of images; determine that the target object is within range of a object picker assembly on the object-collection system based on the tracked movement of the target object; and instruct the object picker assembly to pick up the target object.

Execution of the computer instructions by the processor to guide the object-collection system along the pick-up path may cause the processor to: select a travel waypoint on the pick-up path; determine a travel direction from the current location to the travel waypoint; and provide guide information from the current location to the travel waypoint on the pick-up path. Execution of the computer instructions by the processor may cause the processor to: display, to a user, guide information from the current location to a location of a next target object. Execution of the computer instructions by the processor may cause the processor to: determining guide information from the current location to a location of a next target object; and presenting automatic travel instructions to a motor-control system that autonomously controls the object-collection system to the location of the next target object. Execution of the computer instructions by the processor may cause the processor to: obtain a plurality of image tracking portions of a first image of the plurality of images; determine a feature characteristic in each of the plurality of image tracking portions; track movement of the feature characteristic across the plurality of images; determine a speed of movement of each feature characteristic based on the tracked movement; and determine an overall speed of the object-collection system based on a combination of the speed of movement of each feature characteristic for the plurality of image tacking portions. Execution of the computer instructions by the processor may cause the processor to: display the plurality of images to a user; and display a representation of the pick-up path to the user. Execution of the computer instructions by the processor to display the plurality of images may cause the processor to: detect a boundary of the target object; and augment the plurality of images to include the boundary of the target object.

A non-transitory processor-readable storage medium that stores computer instructions that, when executed by a processor on a computer, cause the processor to perform actions, wherein the actions may be summarized as including receiving a pick-up path that identifies a route in which to guide an object-collection system over a target geographical area to pick up objects; determining a current location of the object-collection system relative to the pick-up path; guiding the object-collection system along the pick-up path over the target geographical area based on the current location; capturing a plurality of images in a direction of movement of the object-collection system along the pick-up path; identifying a target object in the plurality of images based on a dataset of known object features; tracking movement of the target object through the plurality of images; determining that the target object is within range of an object picker assembly on the object-collection system based on the tracked movement of the target object; and instructing the object picker assembly to pick up the target object. Guiding the object-collection system along the pick-up path may include selecting a travel waypoint on the pick-up path; determining a travel direction from the current location to the travel waypoint; and providing guide information from the current location to the travel waypoint on the pick-up path.

The non-transitory processor-readable storage medium may further include displaying, to a user, guide information from the current location to a location of a next target object.

The non-transitory processor-readable storage medium may further include determining guide information from the current location to a location of a next target object; and presenting automatic travel instructions to a motor-control system that autonomously controls the object-collection system to the location of the next target object.

The non-transitory processor-readable storage medium may further include obtaining a plurality of image tracking portions of a first image of the plurality of images; determining a feature characteristic in each of the plurality of image tracking portions; tracking movement of the feature characteristic across the plurality of images; determining a speed of movement of each feature characteristic based on the tracked movement; and determining an overall speed of the object-collection system based on a combination of the speed of movement of each feature characteristic for the plurality of image tacking portions.

The non-transitory processor-readable storage medium may further include detecting a boundary of the target object; augmenting the plurality of images to include the boundary of the target object; displaying the plurality of augmented images to a user; and displaying a representation of the pick-up path to the user.

BRIEF DESCRIPTION OF THE SEVERAL VIEWS OF THE DRAWINGS

Non-limiting and non-exhaustive embodiments are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings:

FIG. 16B illustrates a top view of an object picking assembly that includes a pair of travelers that move along a rail, with each traveler respectively associated with a head assembly;

DETAILED DESCRIPTION

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

Figure 1A:
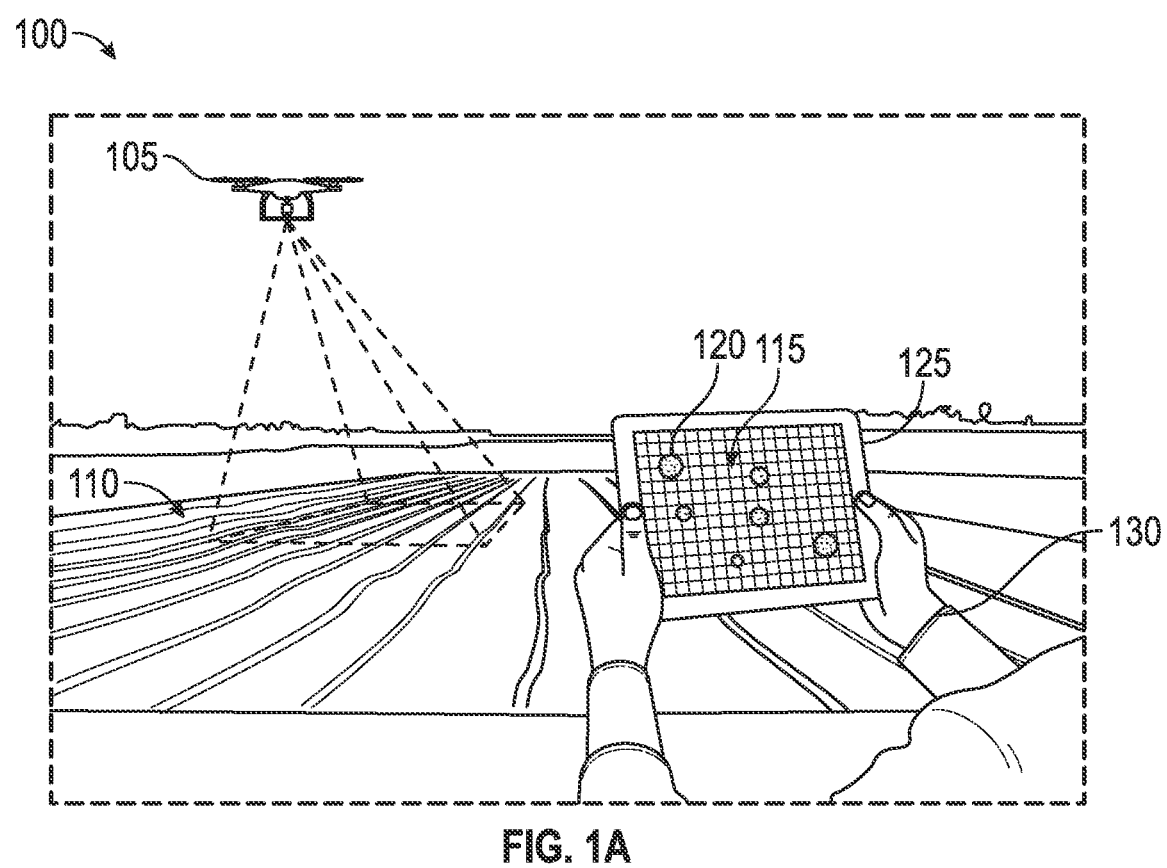
FIGS. 1A-1B are example illustrations of a drone analyzing a field to identify and map objects such that the mapped objects are viewable on a mobile computing device in accordance with embodiments described herein.
Figure 1B:
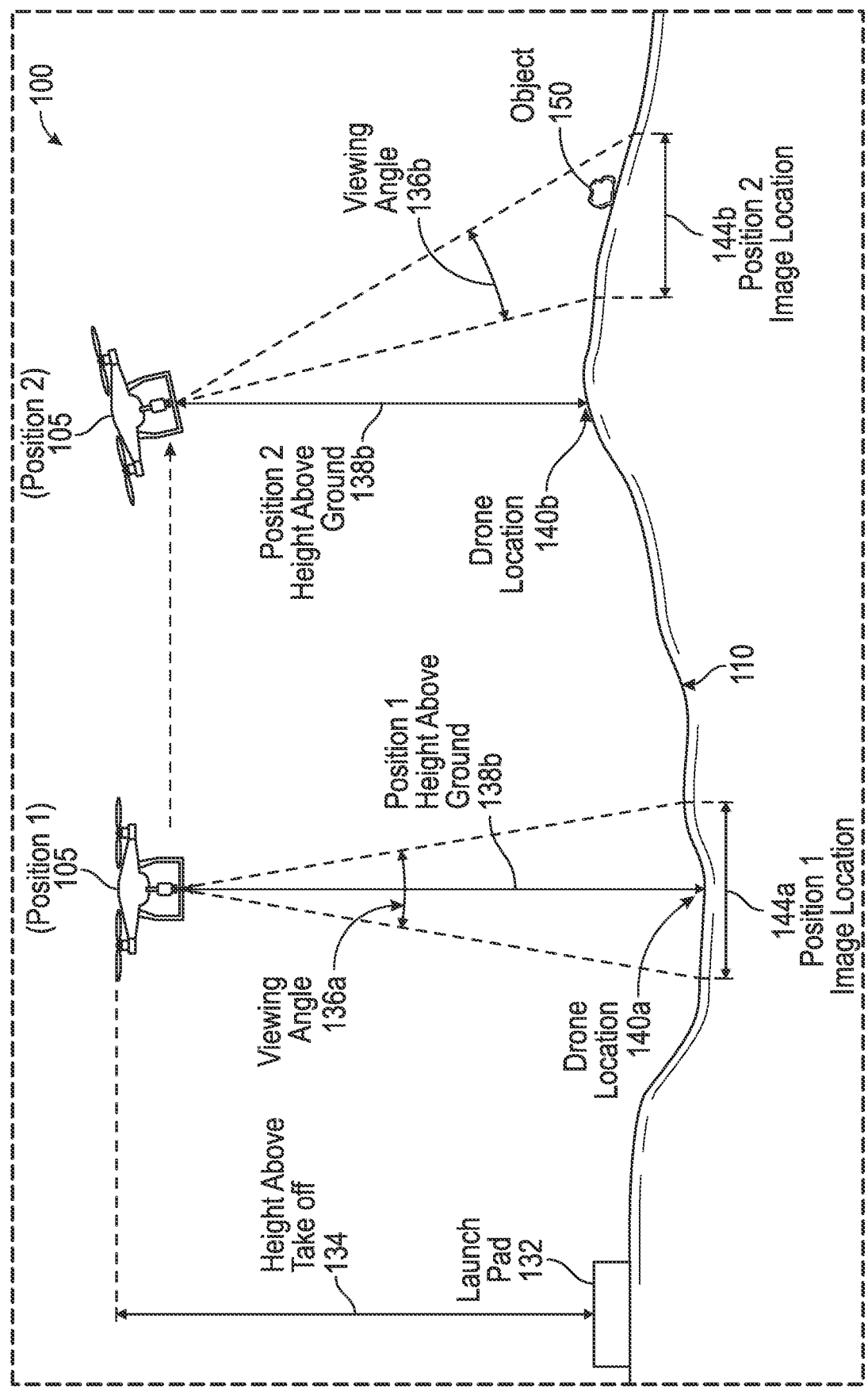

FIGS. 1A-1B are example illustrations of a drone analyzing a field to identify and map objects such that the mapped objects are viewable on a mobile computing device in accordance with embodiments described herein. Beginning with FIG. 1A is an example illustration of an environment 100 where a drone 105 is scanning a field 110 using one or more sensors (not illustrated) to capture images of objects located in the field 110.

The field 110 is a target geographical area that is to be scanned by the drone 105. The target geographical area may be a field, a plot or tract of land, an orchard, plains, a residential or commercial lot, grasslands, a pasture, a range, a garden, farmland, or other type of surveyable land area. For convenience in describing some embodiments herein, the target geographical area may be generally referred to as a field, such as field 110.

The objects described herein may be natural objects, such as rocks, boulders, weeds, or logs; manmade objects, such as hay bales, golf balls, or baseballs; fruits or vegetables, such as watermelons, cantaloupe, honeydew melon, squash, pumpkins, zucchini, or cucumbers; or other pickable or collectable objects (e.g., animal excrement, garbage, debris, etc.). Objects may be small in size, such as golf ball to basketball size, or they may be large in size, such as hay bales or logs. In various embodiments, small objects are those objects with a size or weight below a selected threshold, and large objects are those objects with a size or weight above the selected threshold. The selected threshold may be set by a user or administrator and may be pre-selected or adjusted real time as a target geographical area is being scanned or as objects are being collected.

As described herein, objects are identified in a target geographical area such that those objects can be picked up or collected. Use of the terms pick up and collect may be used interchangeably and may include other forms of gathering or removing objects from the target geographical area, including, but not limited to, amassing, compiling, clearing, extracting, or the like.

Briefly, a user selects or otherwise identifies the field 110 to be scanned by the drone 105. The drone 105 flies over the field and collects sensor data and vehicle positioning data. The data is analyzed to identify and determine a location of objects in the field 110. A graphical user interface 115 can then be displayed to a user 130 on a mobile user device 125 to present a map or images that include visual representations of the objects 120 identified in the field 110. As discussed in more detail herein, the user 130 can manipulate the graphical user interface 115 to show different types or sizes of objects 120, concentrations of objects 120 (e.g., a heat-map view of object density), an optimal path to collect the objects from the field 110, or other information. In some embodiments, the graphical user interface 115 can also enable the user 130 to set or modify the field 110 to be scanned by the drone 105.

A representation of the identified objects 120 can be presented to the user 130 via the graphical user interface 115 on the mobile user device 125. Moreover, where a scan of the field 110 includes data regarding the location, size, and shape of objects 120 in the field 110, such data can be overlaid and represented on an image or representation of the field 110 (e.g., via graphical user interface 115). The graphical user interface 115 can include topographical data of the field 110; locations of the identified objects 120 in the field 110; size of the identified objects 120; shape of the identified objects 120; estimated mass of the identified objects 120; location of ground features of the field 110 (e.g., a pond, stream, field row, field furrow, irrigation channel, and the like); location of field elements (e.g., a fence line, stump, crops, vegetation, tree, building structure, vehicle, road, sidewalk, pole, and the like); field characteristics (e.g., moisture content, soil type, and the like); and any other suitable data regarding the field 110 or elements related to the field 110.

In some embodiments, the graphical user interface 115 may present the user 130 with graphical controls or other input elements to allow the user 130 to input parameters regarding the objects. For example, in one embodiment, the graphical user interface 115 may present a scroll bar or up/down arrows where the user 130 can adjust a size parameter of the objects that are represented on the graphical user interface 115. For example, the user 130 can indicate that they only want to see objects that are larger than 20 cm (approximately eight inches). As the user 130 manipulates such size parameter input, the graphical user interface 115 adds or removes the representations of objects 120 as they meet or fall below the user-selected threshold.

Figure 3A:
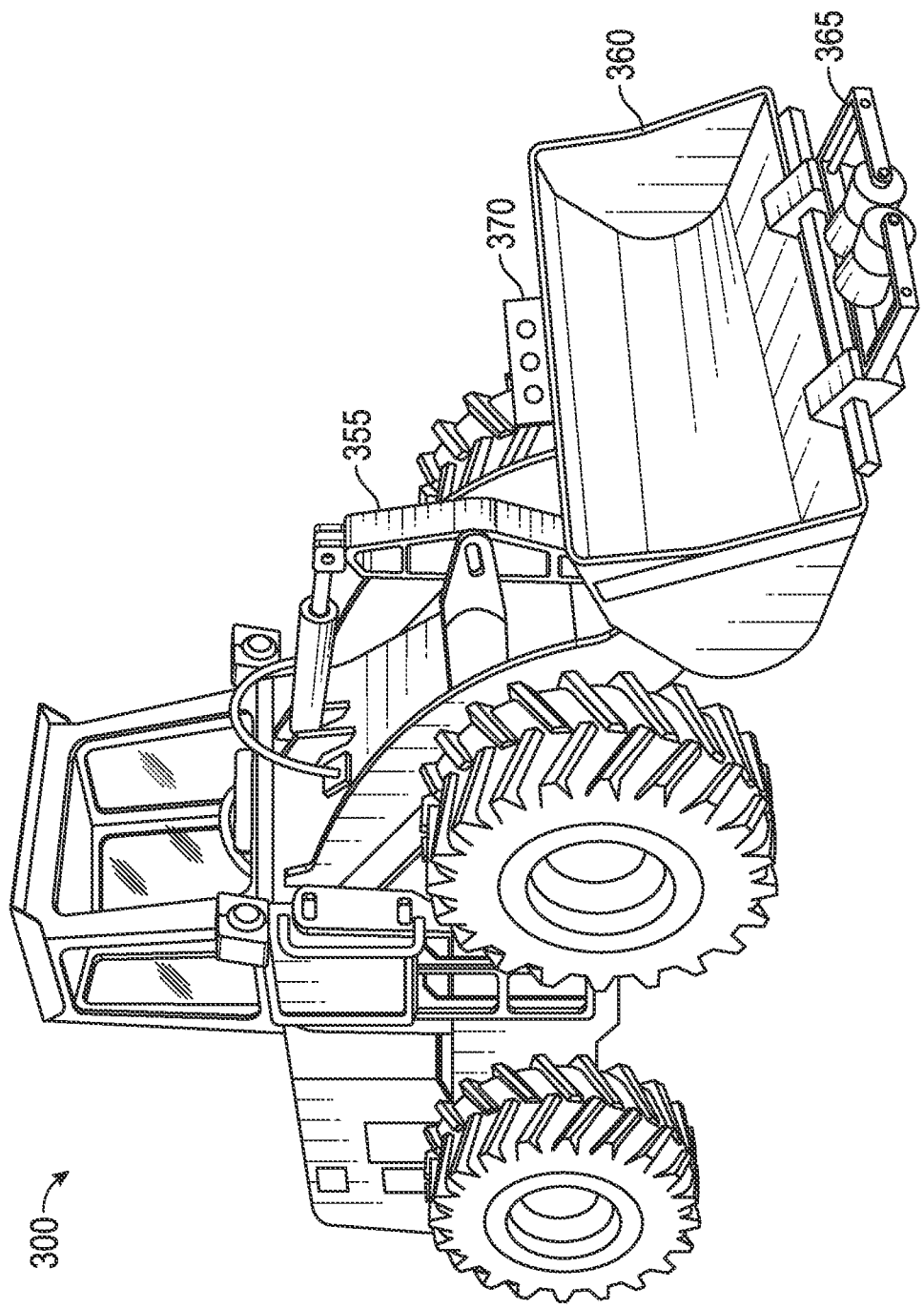
FIGS. 3A-3B are example illustrations of various embodiments of an object object-collection system in accordance with embodiments described herein.
Figure 3B:
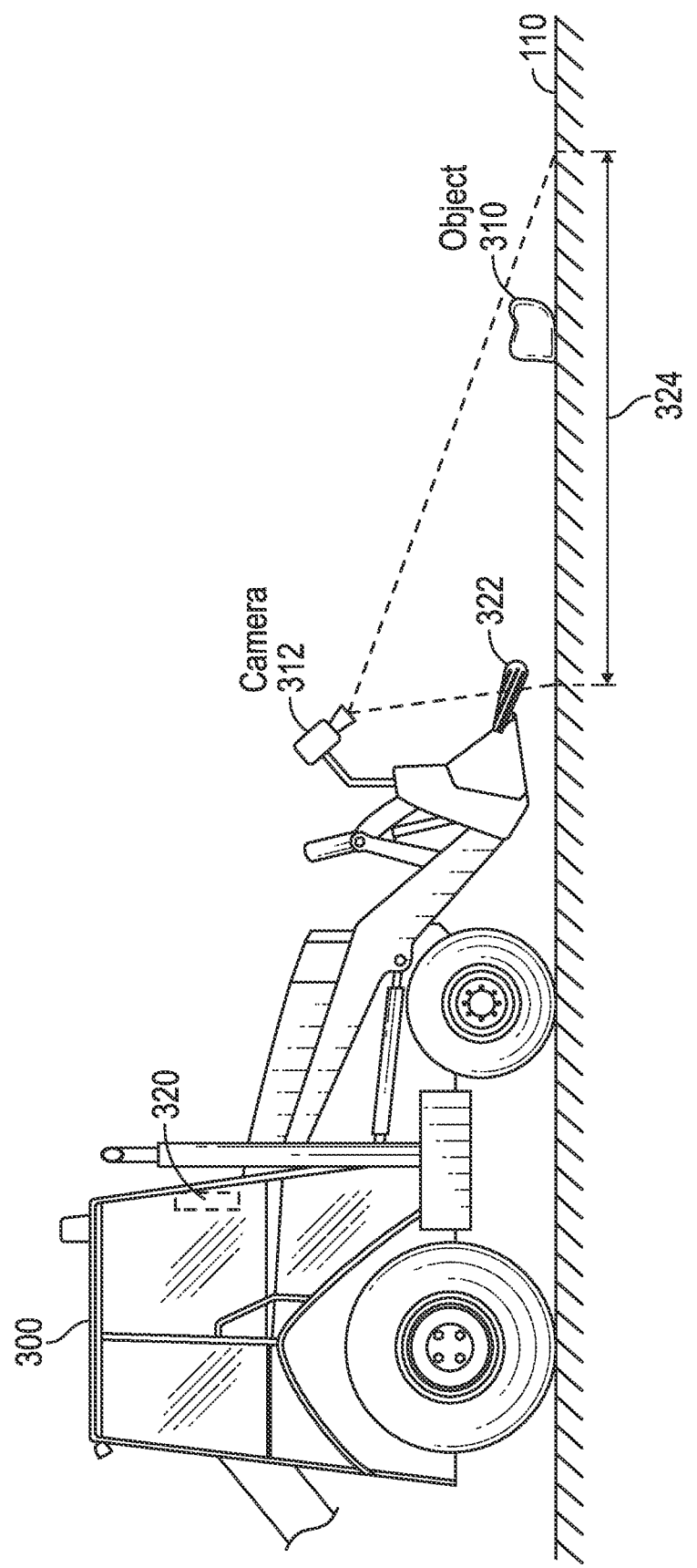

The graphical user interface 115 may also display a heat-map illustrating clustering or density of objects in the target geographical area. In some embodiments, the heat-map may be modified or changed based on the user's selection of different size parameters of objects in which to display. In yet other embodiments, the graphical user interface 115 may include a representation of a pick-up path or route. In some embodiments, the user 130 can draw or manipulate the graphical user interface 115 to define the pick-up path over the target geographical area. In other embodiments, the pick-up path may be generated based on a best, optimal, or most efficiently calculated path to pick up the objects 120, such as by utilizing one or more "traveling salesman" algorithms, clustering algorithms, or other path planning or fact finding algorithms. The pick-up path can be utilized by a user or an autonomous controller to instruct or guide an object-collection system across the field 110 to pick up and collect at least some of the objects 120. For example, FIGS. 3A and 3B illustrate example embodiments of an object-collection system 300, which is described in more detail below. Although the pick-up path is described as being a best or optimal path to pick up the identified objects, the pick-up path may also be suboptimal or close to optimal. Moreover, the pick-up path may be determined based on one or more user selected options. For example, a user can select a the pick-up path to be a shortest distance, fewest turns greater than 90 degrees, avoid oversized objects, etc.

Scanning of the field 110 can be performed automatically or manually by a user. For example, in some embodiments, the user 130 can manually operate the drone 105 (e.g., via the user device 125 or other remote control) to fly over and scan the field 110 or a portion thereof. In other embodiments, the user 130 can define a mapping or scanning location (e.g., by defining a two- or three-dimensional area via a mapping utility of the user device 125), and the user 130 can initiate automated scanning of the defined mapping location via the drone 105.

In various such embodiments, a user, such as user 130, may input an address or GPS coordinates to identify the field 110. A public land database or other records database may be accessed to determine the legal boundary of the field 110. In other embodiments, the user 130 may utilize a graphical user interface 115 on the mobile user device 125 to view an image of the field such that the user 130 is enabled to draw in the boundary of the field 110. Similarly, the user 130 may be enabled to draw, label, or otherwise select exclusion zones in the field 110 that are not to be scanned by the drone 105. In yet other embodiments, image recognition techniques may be employed to identify the boundaries or exclusion zones, or both. As one example of such processing, the image recognition techniques may be employed to detect hard edges (e.g., an edge of a field, fence, ditch, etc.) based on color or texture changes, detect houses based on a shape and color of a roof, etc.

In some embodiments, the above described techniques for identifying the field 110 may be used in combination. For example, the user may input GPS coordinates, which are used to obtain a satellite image of the field 110. The user can then draw in the boundaries or exclusion zones on the image to define the field 110 (target geographical area) to be scanned. In various embodiments, the boundaries and exclusion zones may be referred to as or include boundary information, and it may include GPS coordinates labelling scannable areas, GPS coordinates labelling excluded or non-scannable areas, or other types of information to define a scanning area.

Figure 6A:
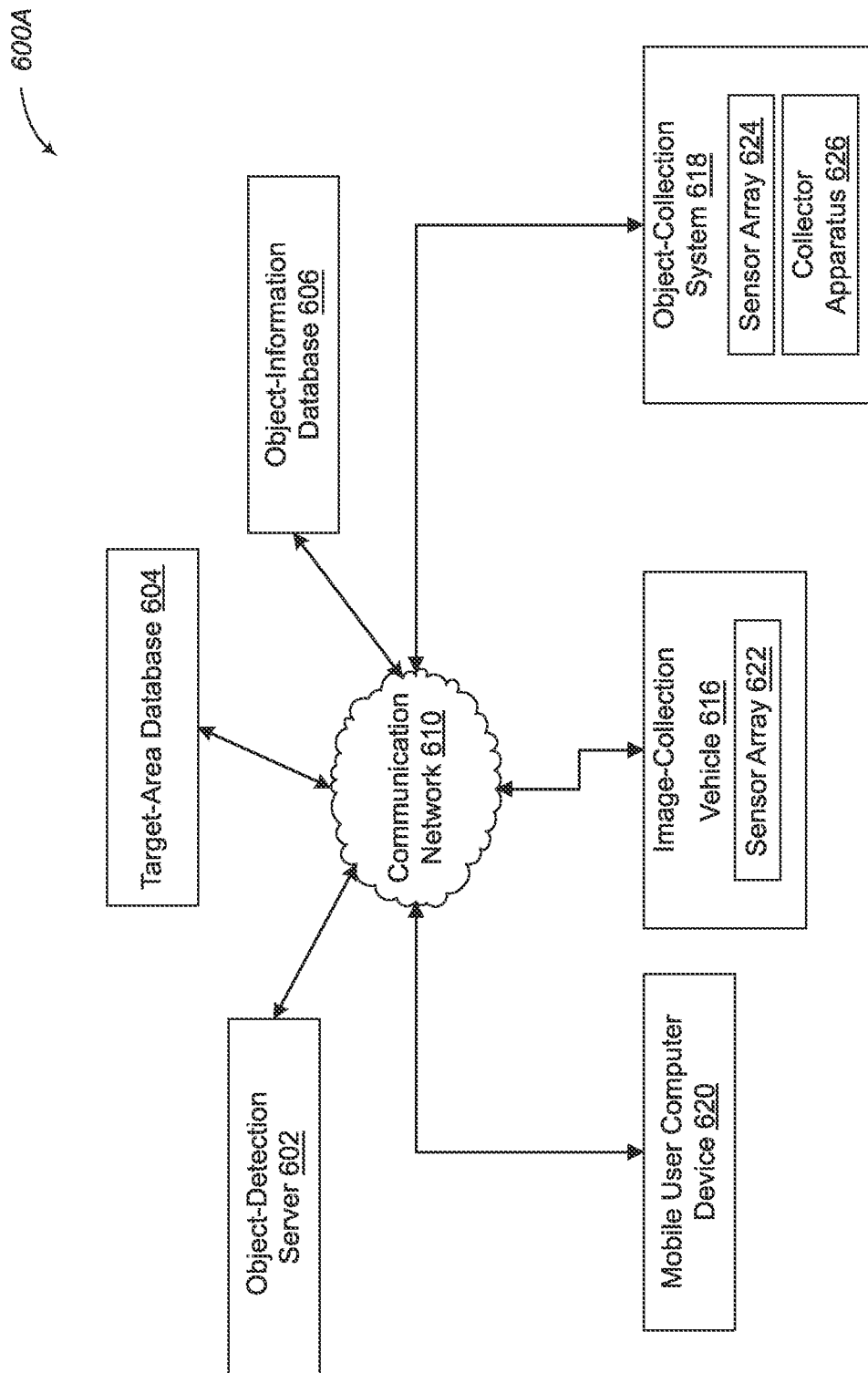
FIG. 6A illustrates a context diagram of a system for scanning a target geographical area, identifying objects in that area, and employing an object-collection system to pick up the objects in accordance with embodiments described herein.

The drone 105 may be any suitable manned or unmanned image-collection vehicle, such as image-collection vehicle 616 in FIG. 6A. In various embodiments, the drone 105 uses one or more suitable sensors to scan the field 110, such as sensor array 622 in FIG. 6A.

Data from the one or more sensors, and data from the drone 105, are analyzed to identify objects within the field 110, which is described in more detail herein. Briefly, however, the sensor data may be pre-processed to determine an actual ground location of the sensor data and to create uniform sensor data. The uniform sensor data can then be input through one or more artificial neural networks designed to identify known objects in particular conditions.

Once identified, the locations of the objects are determined based on their position within the uniform sensor data and the actual ground location of the sensor data. The locations of the objects are stored in a database (e.g., object-information database 606 in FIG. 6), along with other information, such as object size, class of the object (e.g., rock, human, animal, etc.), or other information.

Although embodiments described herein are referred to as using one or more artificial neural networks to identify objects, embodiments are not so limited and other computer vision algorithms or technique may be used. For example, in some embodiments, shape-based algorithms, color-based algorithms, or other visual machine learning techniques may be employed to identify objects. In some embodiments, the computer vision algorithms or techniques may be selected by a user based on the type of object being identified or the conditions of the target geographical area. In yet other embodiments, machine learning techniques may be employed to learn which computer vision algorithms or techniques are most accurate or efficient for a type of object of condition.

In some embodiments, the drone 105 may capture data from a plurality of sensors, such that their data is utilized in conjunction with each other to identify the objects. For example, in one embodiment, the drone 105 may scan the field 105 using a thermal camera. The thermal data can be analyzed to identify areas of possible locations of objects. The drone 105 can then scan the areas of possible objects using a visual spectrum camera to rule out or pinpoint the location the objects. This multi-spectral data analysis provides many benefits, including distinguishing some objects (e.g., rocks) from vegetation and increasing overall processing speed (e.g., by performing faster, less-complex analysis on the thermal data and performing slower, more-complex analysis on only a portion of the field that has a high likelihood of including objects). Although this example describes the use of two sensors during two different scans, embodiments are not so limited. Rather, in other embodiments, more sensors may be utilized, and in yet other embodiments, the sensors may capture data during the same or subsequent scans of the field 110.

Moreover, some scans for some sensors may be performed at a first height above the field 110, while other scans for other sensors may be perform at a second height above the field 110, where the second height is less than the first height. Furthermore, while the example of FIG. 1A illustrates a single drone 105, in further embodiments, a plurality of drones can be used to scan the field 110. For example, in some embodiments, each of the plurality of drones may utilize a same type of sensor, but scan different portions of the field 110. In other embodiments, one or more of the plurality of drones may utilize a sensor that is different from the other drones. In yet other embodiments, one or more of the plurality of drones may perform a scan at one height above the ground, while the other drones perform scans at one or more other heights. Again, the use of different sensors or scan at different heights can separate the analysis into identifying areas of possible objects and separately identifying the objects.

In various embodiments, the sensor data may be modified or manipulated prior to analyzing the data for objects. For example, such modifications may include stitching together and/or overlaying of one or more images, sets of data from one or more sensors, and the like. For example, where a drone 105 generates a plurality of images of a field 110, the plurality of images can be stitched together to generate a single larger contiguous image. As described in more detail herein, these images may be further pre-processed and manipulated prior to employing one or more artificial neural networks to identify the objects.

The process of identifying objects and determining their locations can be performed in real time, or near real time, as the drone 105 is scanning the field 110, or it can be performed after the drone 105 has completed the scan of the field 110 (post-processing of the sensor data). In some embodiments, the post processing of the sensor data can be automatically performed when the drone 105 has completed its scan or when the drone 105 has established a wired or wireless connection with a processing server (e.g., object-detection server 602 in FIG. 6A), or the post processing can be perform in response to a user manually initiating the processing.

After the drone 105 has completed its scan of the filed 110 and one or more objects are identified and located, an object-collection system (not illustrated) (e.g., object collection system 300 in FIGS. 3A-3B) may be employed to pick up or otherwise collect the one or more objects from the field 110, which is described in more detail below. In some embodiments, the object-collection system may be employed after an object is identified and while the drone 105 is continuing to scan the field. For example, the drone 105 may perform object identification and location determination while it is scanning the field 110. The drone 105 can then transmit the object locations to the object-collection system as they are being located. The object-collection system can then attempt to locate and pick up the objects.

In some embodiments, the object-collection system can provide feedback to the drone 105 to indicate whether an object identified by the drone 105 is picked up, missed, or is not an object at all (e.g., by analyzing higher resolution images captured closer to the ground). The drone 105 can use this information to re-scan an area, update its image recognition techniques, etc. In this way, the drone 105 and the object-collection system coordinate the real-time (or near real-time) scanning and collection of objects. In other embodiments, the drone 105 may transmit the captured images to another computing device, such as the mobile user computer, to perform the object identification and location determination. This other computing device can then coordinate the scanning of the target geographical area by the drone 105 and the collection of objects by the object-collection system.

Although FIG. 1A illustrates the use of an aerial drone to scan the field 110, embodiments are not so limited. In other embodiments, a ground-based image-collection system may be employed to scan the field 110. For example, a tractor may be configured with a sensor array to scan the field 110 while the tractor is performing other tasks, such as seeding, spraying, etc. As another example, an autonomous rover may be employed to perform the first scan of the field 110. Once the scan is complete, the tractor, rover, or other object-collection system may be deployed to collect the objects.

FIG. 1B is another example illustration of a drone 105 analyzing a field 110 to identify and map objects 150 in accordance with embodiments described herein. In general, a scanning map, flight plan, or travel plan, is downloaded or otherwise installed on the drone 105. The flight plan identifies a route and altitude in which the drone 105 is to fly over the field 110. The drone 105 begins flight from a launch pad 132. In various embodiments the flight plan may identify specific GPS coordinates in which the drone 105 is to fly. In other embodiments, the flight plan may specify coordinates relative to the launch pad, which may also include a height above takeoff 134.

As illustrated, the drone 105 captures a first image at position 1. At this position, the drone captures a first image of image location 144a, which is centered at the drone location 140a and has a viewing angle 136a. The drone 105 may continue to capture additional images in accordance to its flight plan. At some later point in time, the drone captures a second image of image location 144b and has a viewing angle 136b. However, due to wind, flight characteristics, or other environmental elements, the drone 105 may have tilted at the time the image was captured such that the image location 144b is not centered at the drone location 140b, but rather some distance away, which is further illustrated in FIG. 1D. Various embodiments described herein utilize the avionic telemetry data of the drone 105 to determine an actual image position, and thus determines and actual location of object 150.

To accurately employ one or more artificial neural networks to identify object 150, the image quality should be of a high enough resolution so that the artificial neural networks can detect object features, while also encompassing a sufficient amount of ground space. Therefore, a desirable pixel-to-ground distance ratio should be determined. Unfortunately, due to undulations and imperfections in the field 110, the drone's height above the ground can fluctuate. For example, at position 1, the drone 105 is at a first height above ground 138a, and at position 2, the drone 105 is at a second height above ground 138b. In this illustrated example, the drone is closer to the ground at position 2 than at position 1. Many drones maintain their altitude based on a height above takeoff 134, which may be more or less than the drone's actual height above the ground at a current location. Therefore, in various embodiments described herein, the drone 105 includes a sensor to determine the drone's height above ground 138, which can be used by the drone to maintain an appropriate height above ground or it can be used to determine an actual image location, such as at position 2.

Figure 1C:
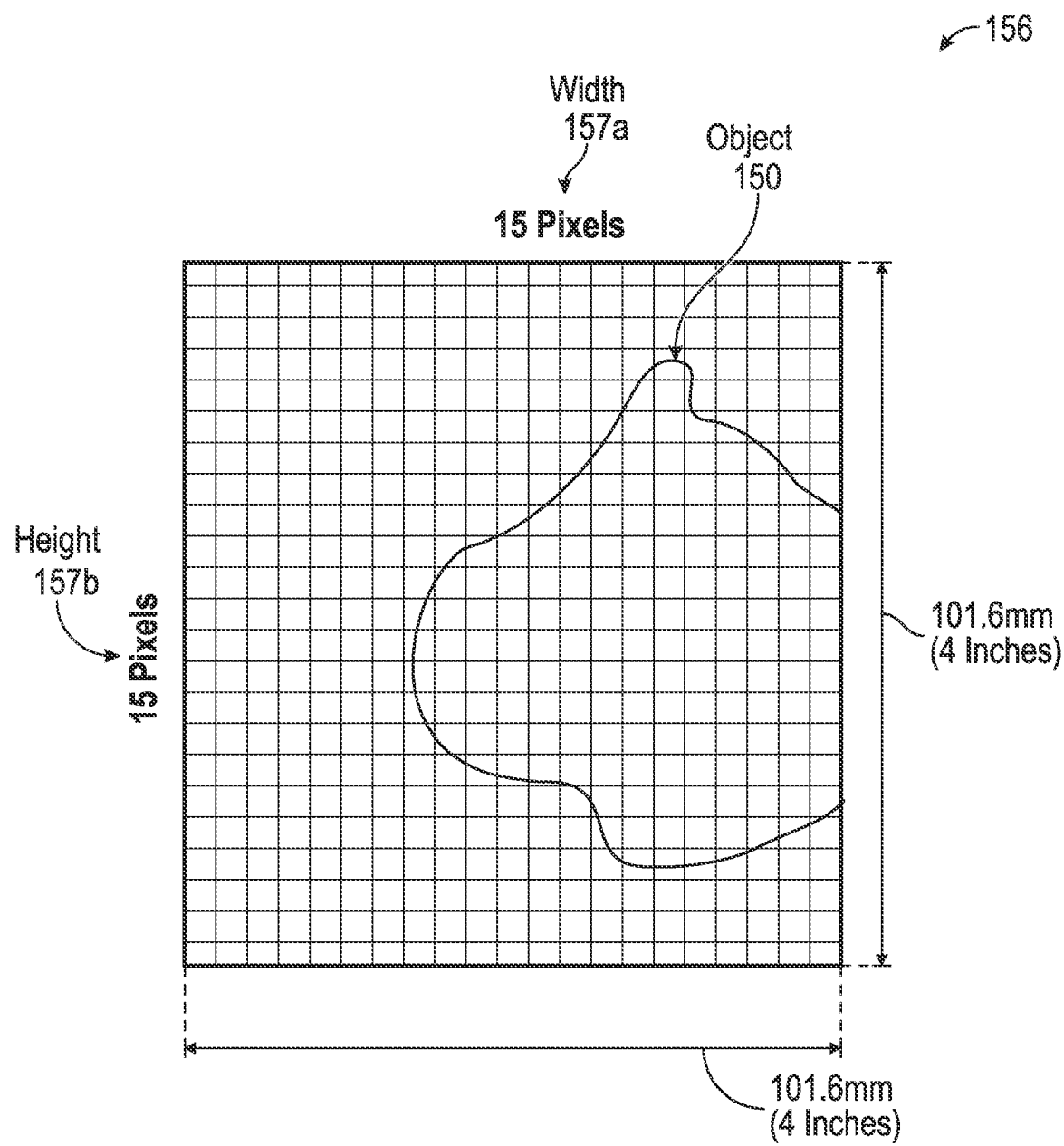
FIG. 1C is an example image portion that a includes representation of an object that was captured by a drone in accordance with embodiments described herein.

FIG. 1C is an example image portion 156 that includes a representation of an object 150 that was captured by a drone in accordance with embodiments described herein. As described herein, images captured by a drone or other image-collection system are stretched and manipulated to remove distortion caused by uneven terrain or a non-vertical angle of capture, which is further described herein. The resulting image is an image with a uniform distribution of pixels to ground distance. In various embodiments, an example desired pixel-to-distance ratio is 15 pixels to approximately 101.6 mm (or approximately four inches). Accordingly, FIG. 1C illustrates an image portion 156 having a width 157a of 15 pixels and a height 157b of 15 pixels. Both the height 157b and width 157a have an approximate ground coverage of 101.6 mm (or four inches).

FIG. 1C illustrates just one example of a pixel-to-distance ratio of a desired resolution in which features of an object 150 can be detected by a trained artificial neural network. If fewer pixels are utilized to represent the same ground distance, then the image may not have enough detail to identify an object 150 in the image, which can result in missed smaller sized objects. Conversely, if more pixels are utilized to represent the same ground distance, then the smaller objects sizes can be identified, but the image may cover too small of an area—resulting in many more images being captured to cover the entire target geographical area, which utilizes additional computing resources to process the additional images. Therefore, the pixel-to-distance ratio can be modified based on the application of the methods and systems described herein. In some embodiments, the pixel-to-distance ratio can be modified by changing the camera or sensors utilized to capture images of the target geographical area. In other embodiments, a capture height (e.g., height above ground 138 in FIG. 1B) may be adjusted to change the pixel-to-distance ratio.

Figure 1D:
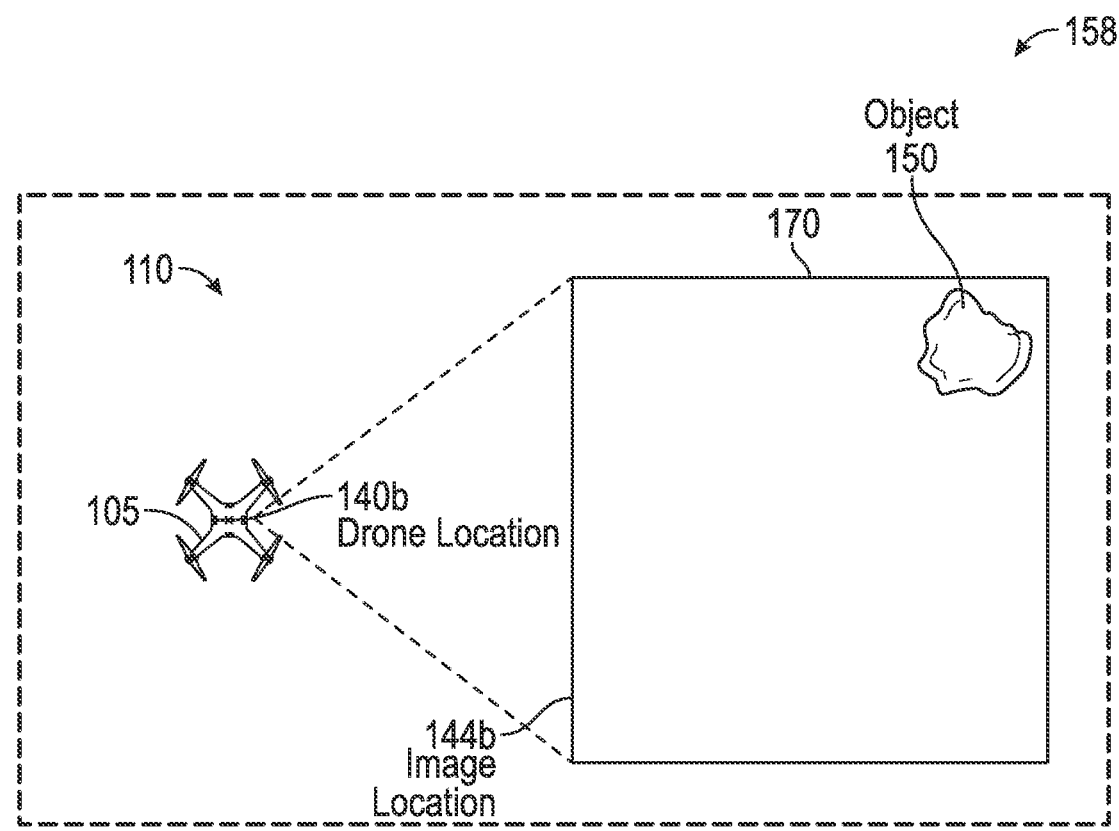
FIG. 1D is a top view example illustration of a position of a drone relative to a location of a captured image of a field in accordance with embodiments described herein.

FIG. 1D is a top view example illustration 158 of drone location 140*b* of a drone 105 relative to a location 144*b* of a captured image 170 of a field 110 in accordance with embodiments described herein. As mentioned above, wind or other flight characteristics of the drone 105 may result in a camera on the drone 105 being in some position or angle other than vertical to the ground. Accordingly, a GPS captured location 140*b* of the drone 105 may be different from that actual image location 144*b*, which in this illustration is off to the right of the drone location 140*b*. As described in more detail herein, avionic telemetry information of the drone and the drone's location 140*b* at a time of image capture can be utilized to determine the actual image location 144*b* of the image 170. Once the location 144*b* of the image is determined, a position of object 150 in the image 170 can be translated to an actual position of the object 150 within the target geographical area.

Figure 2A:
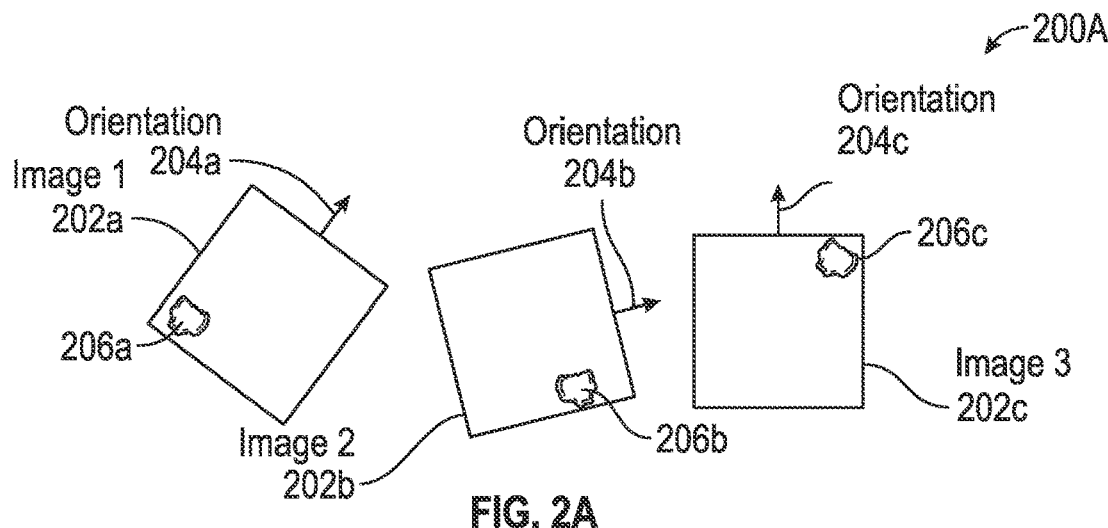
FIGS. 2A-2C are example illustrations of overlaying images to identify the same object in multiple images in accordance with embodiments described herein.
Figure 2B:
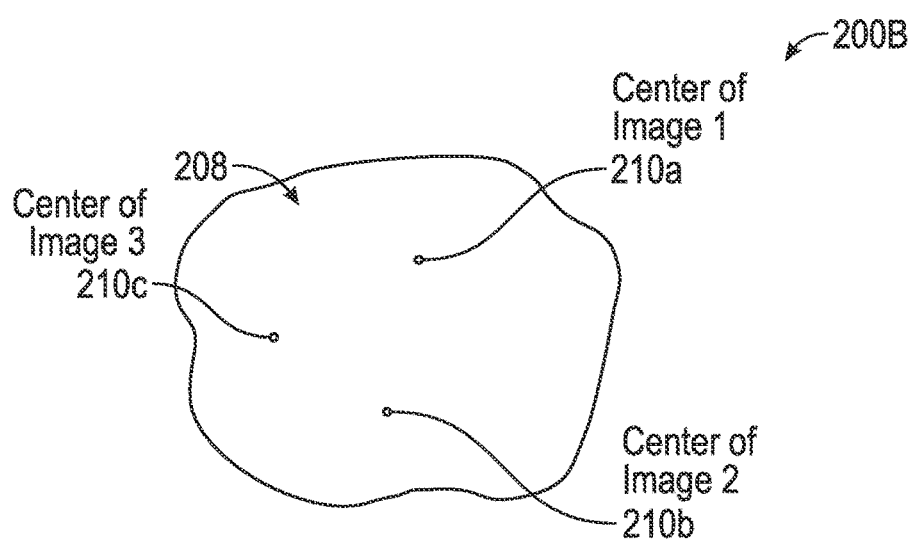
Figure 2C:
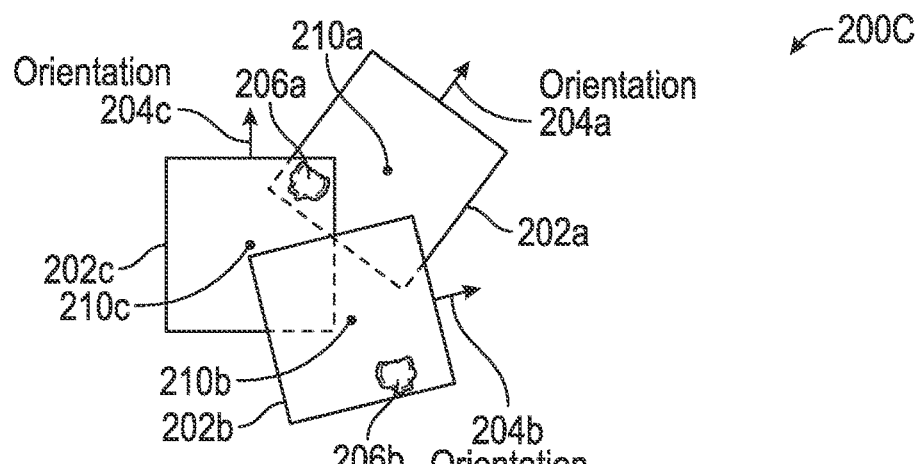

FIGS. 2A-2C are example illustrations of overlaying images to identify the same object in multiple images in accordance with embodiments described herein. Example 200A illustrates three images—Image_1, Image_2, and Image_3 referenced as images 202*a*, 202*b*, and 202*c*, respectively (collectively images 202)—of a target geographical area. Each image 202 is captured at a different location 210 and at a different orientation 204 and includes an object 206. Whether the object 206 identified in each image 202 is in fact the same object or are different objects can be determined based on the object position, image position, and orientation of the images.

For example, image 202*a* is captured at orientation 204*a* and includes object 206*a*; image 202*b* is captured at orientation 204*b* and includes object 206*b*; and image 202*c* is captured at orientation 204*c* and includes object 206*c*. Embodiments described herein are employed to determine a center location 210 of image 202 in the target geographical area. For example, Image_1 (202*a*) is centered at location 210*a*, Image_2 (202*b*) is centered at location 210*b*, and Image_3 (202*c*) is centered at location 210*c*. When images 202 are overlaid on each other based on their center location 210 and orientation 204, as shown in FIG. 2C, then it can be determined that object 206*a* in Image_1 (202*a*) is the same object as object 206*c* in Image_2 (202*c*), but is different from object 206*b* in Image_2 (202*b*). In various embodiments, a pixel location of each object 206 within the corresponding image 202, along with the physical location 210 of the images, can be used to determine whether the objects are the same or different, which is described in more detail below in conjunction with FIG. 11.

FIGS. 3A-3B are example illustrations of various embodiments of an object object-collection system in accordance with embodiments described herein.

FIG. 3A illustrates one example embodiment of an object-collection system 300 that includes a vehicle 355 with a bucket 360 that includes an object-collector apparatus 365 disposed at a front-end of the bucket 360. A sensing array 370 is shown disposed at a top end of the bucket 360. As described herein, in some embodiments, a generated object-pick-up path or route can be used to direct a user in driving the system 300 proximate to one or more previously identified objects such that the object-collector apparatus 365 can automatically pick up the objects and deposit the objects in the bucket 360. In other words, the generated route of travel can be used for rough positioning of the object-collector apparatus 365 on the bucket 360 so that the object-collector apparatus 365 can automatically pick up one or more objects at a given waypoint along the route of travel.

Although FIG. 3A illustrates an example embodiment of a system 300 comprising a loader with a bucket 360, it should be clear that other embodiments can comprise any suitable vehicle of various suitable configurations. For example, other embodiments can include a truck, all-terrain vehicle (ATV), tractor, dump truck, a specialized proprietary vehicle, and the like. Additionally, while the example of FIG. 3A illustrates an example of a vehicle 355 having a cab for a human operator, various examples can include manned or unmanned vehicles, which may or may not be configured for use by a human operator. For example, in some embodiments, the vehicle 355 can be operated by a human user sitting in the cab of the vehicle 355 or can be configured for autonomous use without a human user sitting in the cab or other location on the vehicle 355.

Also, while the example of FIG. 3A and other examples herein illustrate a bucket 360 associated with an object-collector apparatus 365, where picked objects are deposited in the bucket 360 by the object-collector apparatus 365, further examples can use various other suitable containers for objects and/or locations for an object-collector apparatus 365 to be disposed. Accordingly, in some examples, a bucket 360 can be absent from a system 300.

In embodiments having a bucket 360, such a bucket 360 can comprise a standard bucket with elements such as an object-collector apparatus 365 and/or sensor array 370 being removably coupled to the standard bucket or can comprise a specialized bucket 360 having elements such as an object-collector apparatus 365 and/or sensor array 370 integrally disposed thereon. In some examples, it can be desirable to convert a commercially available front-loader into a system 300 by coupling an object-collector apparatus 365 and/or sensor array 370 to the bucket 360 of the commercially available front-loader. In other examples, a specialized object picking bucket 360 can be coupled with a vehicle 355 configured for a bucket 360.

Additionally, while the example of FIG. 3A illustrates an object-collector apparatus 365 coupled to a bottom leading edge of the bucket 360, in further examples, an object-collector apparatus 365 can be coupled in any suitable location on a bucket 360 or other location about the vehicle 355 or system 300. Similarly, the example of the object-collector apparatus 365 of FIG. 3A should not be construed as being limiting on the wide variety of suitable object-collector apparatuses 365 that can be associated with a system 300. Further non-limiting examples of some suitable object-collector apparatuses 365 are discussed in more detail herein.

Also, as discussed herein, the sensor array 370 can be coupled in any suitable location on a bucket 360 or other location about the vehicle 355 or system 300. Additionally, the sensor array 370 can comprise one or more suitable sensors, including a camera, RADAR, LIDAR, SONAR, positioning device (e.g., GPS, compass and the like), a microphone, and the like. A camera can include any suitable type of camera, including a visible light camera, infrared camera, ultraviolet camera, thermographic camera, and the like. Additionally, in some examples, a system 300 can include a plurality of sensor arrays 370, which can be disposed on any suitable location of a vehicle 355 or external to the vehicle 355 (e.g., disposed on a drone that follows the vehicle 355).

FIG. 3B illustrates another example embodiment of an object-collection system 300. In this illustrated example, a camera 312 captures images of a ground area 324 in front of the object-collection system 300. As the object-collection system 300 travels along the field 110, the camera captures a plurality of images. The images are analyzed using one or more artificial neural networks to identify objects 310, which the object-collection system 300 can pick up using object-collector apparatus 322. The object-collector apparatus 322 may be an embodiment of object-collector apparatus 626 in FIG. 6A, which is described in more detail below. Briefly, the object-collector apparatus 322 is configured to pick up an object 310 when the object-collection system 300 approaches the object 310 without picking up or greatly disturbing the ground.

Figure 5:
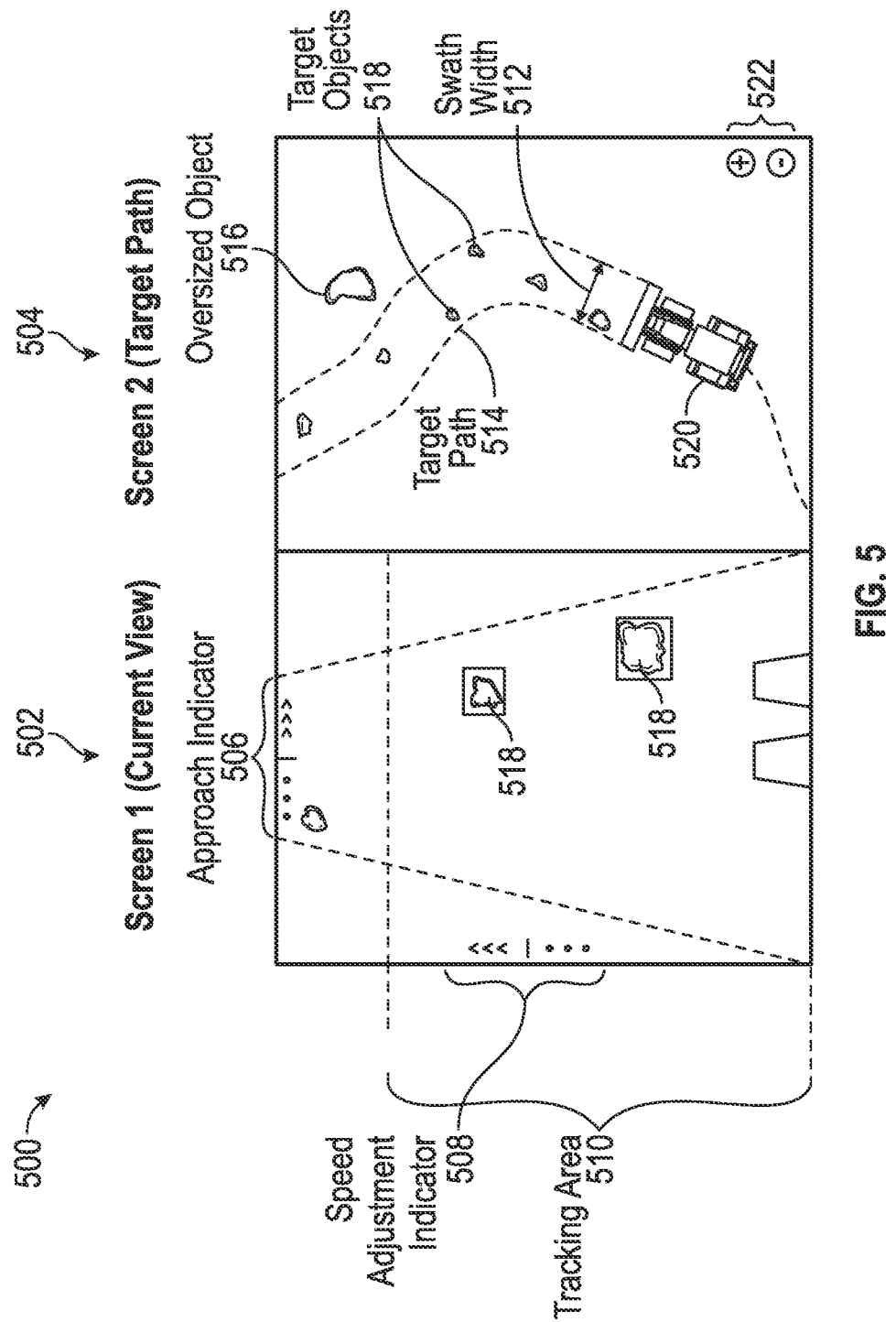
FIG. 5 is an example illustration of a display presented to a driver of the object-collection system in accordance with embodiments described herein.

In various embodiments, the object-collection system 300 also includes a user computer or display 320 (e.g., mobile user computer device 620). The display 320 presents one or more images or screens to a user of the object-collection system 300, which may be captured by camera 312. One example embodiment of such a display is shown in FIG. 5.

Figure 4A:
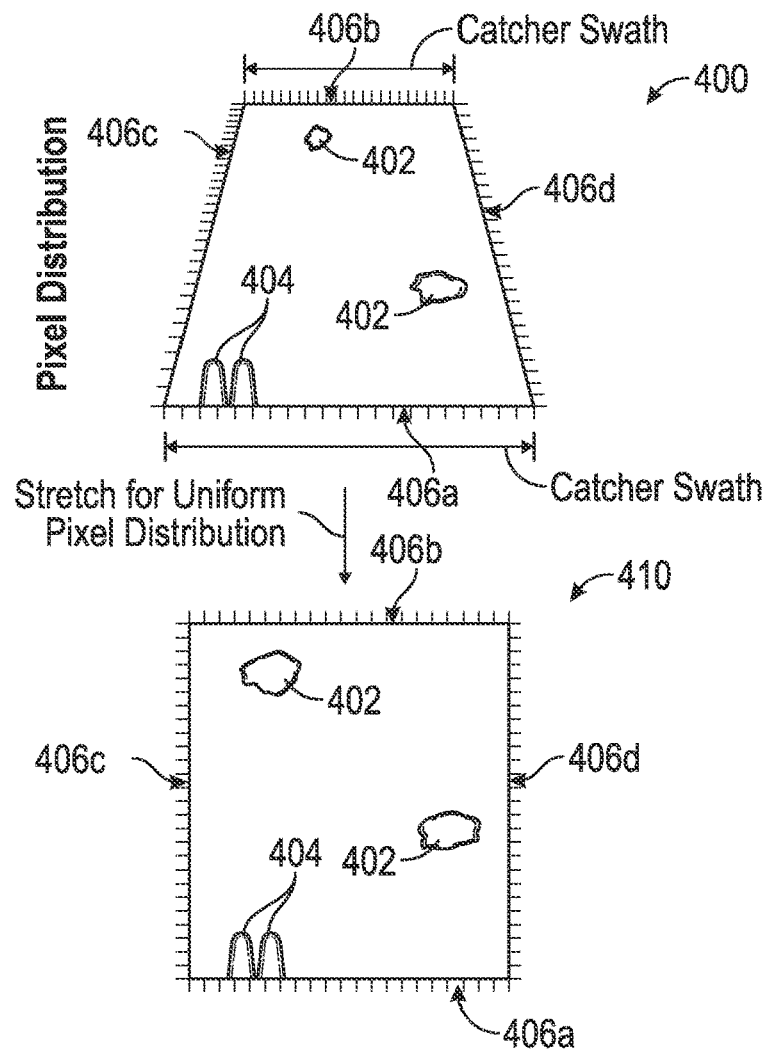
FIGS. 4A-4B are example illustrations of images captured by an object object-collection system to identify, track, and pick up objects in accordance with embodiments described herein.
Figure 4B:
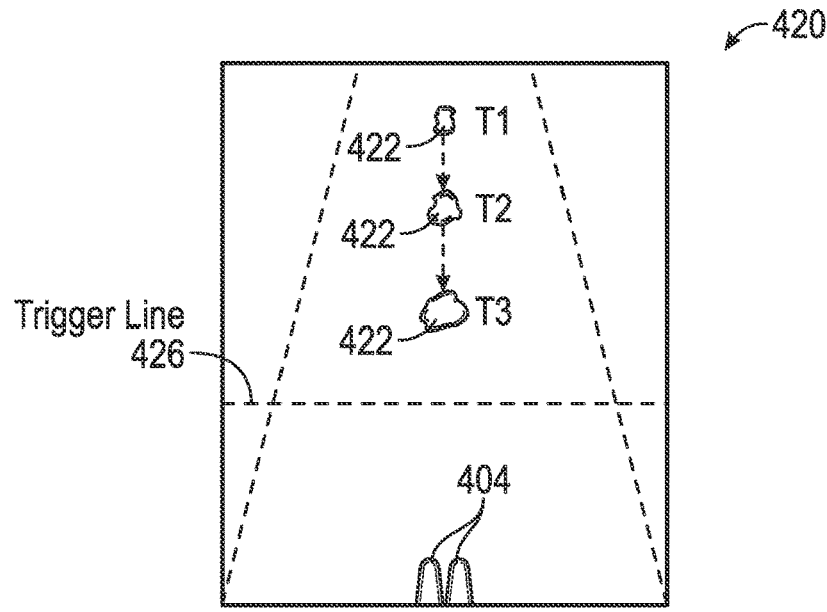

FIGS. 4A-4B are example illustrations of images captured by an object object-collection system to identify, track, and pick up objects in accordance with embodiments described herein. As described herein, the object-collection system may include one or more cameras or other sensors that capture images of a direction of travel of the object-collection system. Image 400 is one such example of an image captured from the object-collection system.

As described herein, the object-collection system may include a catcher swath in which the object-collection system can pick up an object when the object-collection system is within pick-up range of the object. This catcher swath is illustrated by a bottom 406a width and a top 406b width of the image 400. Because the camera is angled towards the ground, as shown in FIG. 3B, the top catcher swath 406b is further away from the object-collection system and is thus narrower than the bottom catcher swatch 406a, which is closer to the object-collection system. Accordingly, the image 400 is distorted with non-uniform pixel-to-distance ratios, where the ground at the top 406b has a denser distribution of pixels per ground distance unit than the bottom 406a. The change of pixel-to-distance ratio from the bottom 406a of the image 400 to the top 406b of the image 400 is also shown by the left side 406c and right side 406d of the image 400.

Image 400 also includes objects 402 and paddles 404. As described in more detail herein, the paddles 404 are one embodiment of a picker assembly for picking up and collecting the objects 402. One or more image recognition techniques may be employed on image 400 to identify the objects 402 and a position of the paddles 404 relative to the objects 402.

In various embodiments, before the objects 402 and paddles 404 are identified in the image 400, the image 400 is stretched and transformed such that there is an even and uniform pixel distribution horizontally left 406c to right 406d and from top 406b to bottom 406a, which is illustrated as image 410. In this way, objects 402 can be tracked across multiple images 410 without distortion caused by capture angle of the camera relative to the ground. With the objects 402 being tracked independent of image distortion, movement of the paddles 404 can also be tracked and aligned with the objects 402 for collection without distortion.

FIG. 4B illustrates one embodiment of tracking an object 422 throughout multiple image frames 420. It should be recognized that a plurality of image frames are captured and the object 422 is identified and its location in the image noted to track movement of the object 422 throughout the images. For ease of discussion, embodiments are often described as movement of the object being tracked. However, the object itself is not moving. Rather, the perception of the object's location is moving in the images relative to the object-collection system as the object-collection system approaches the object. In some embodiments, however, the object could be physically moving.

In the illustrated example image 420, a location of the object 422 is identified in the image 420 at three different times, T1, T2, and T3. T1, T2, and T3 may be consecutive image frames, or they may at some other image frame or time interval. As the object-collection system approaches the object 422, the paddles 404 are also moved to align with the object 422. In various embodiments, an artificial neural network may be employed to identify a position of the paddles 404 in the image 420. In other embodiments, an electromechanical measurement system may be used to determine a position of the paddles.

In some embodiments, the paddles 404 may be vertically lowered from a storage height to a pick-up height. The storage height is a position where the paddles 404 are held to avoid contact the ground. In some embodiments, the storage height is configured to maintain the paddles 404 in the image 420, while allowing the paddles to move horizontally to align with the object 422. The pick-up height is a position where the paddles 404 contact the ground or are otherwise positioned to pick-up the rock, which may be within or outside the image 420.

Because it takes time for the paddles to move from the storage height to the pick-up height, a trigger line 426 is employed to activate movement of the paddles 404 from the storage height to the pick-up height. The position of the trigger line 426 may be determined based on a speed in which the object-collection system is approaching the object 422—the faster the object-collection system is approaching the object 422, the higher in the image 420 the trigger line 426 is positioned. Accordingly, a speed at which the object-collection system appears to be approaching the object 422 is determined by tracking movement of the object 422 across the image 420. Unfortunately, this speed may vary over time due to user speed adjustments, camera movement, or other visual aspect changes. For example, if the object-collection system drives over a large rock, the capture angle of the camera itself can also change, which results in the object being in a different location in subsequent images. But this change of object location is due to the camera movement caused by the rock and not actually because of the object-collection system getting closer to the object.

Although an image-defined trigger line is utilized to activate the movement of the paddles 404 to pick up an object, embodiments are not so limited. Rather, in some embodiments, one or more other dynamic control methods based on kinematics or visual surveying may also be utilized to activate the paddles 404. For example, GPS data on the object-collection system can be analyzed over time to identify a speed and direction in which the object-collection system is moving, which may be utilized to determine when to pick up an object based on the previously determined location of the object (e.g., by determining the object location from images, as described herein).

Figure 4D:
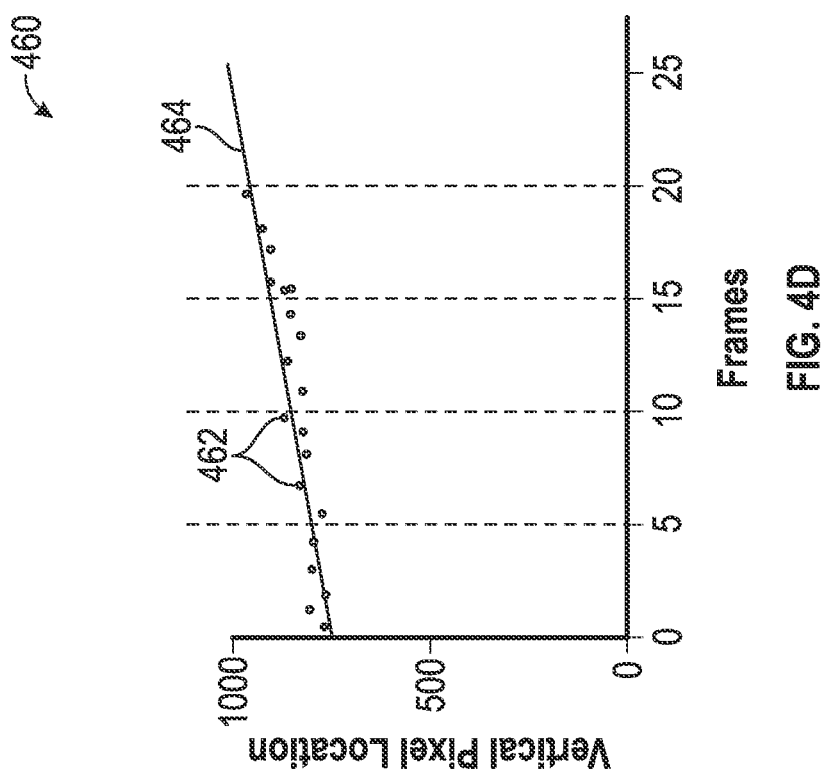
FIG. 4D is an example illustration of a graph showing the tracked speed of the object-collection system in accordance with embodiments described herein.
Figure 4C:
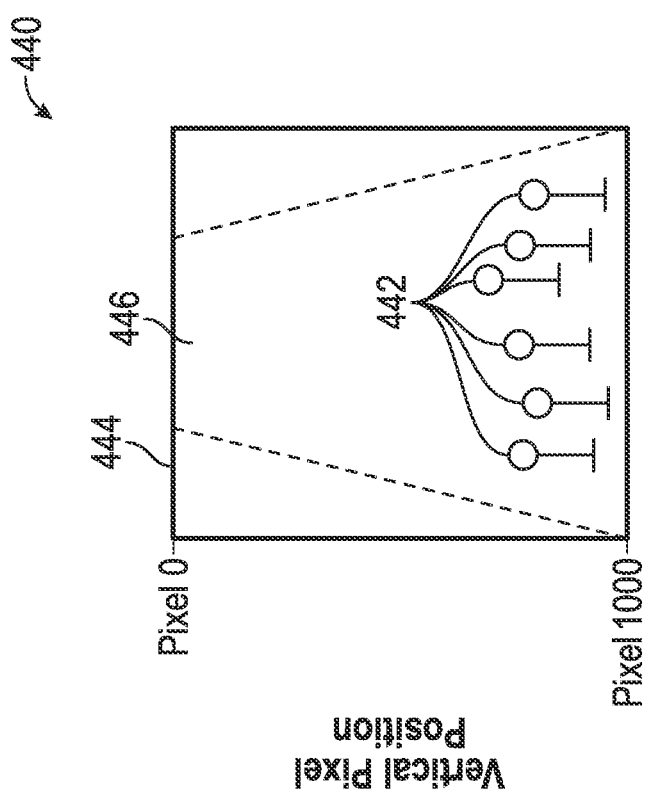
FIG. 4C is an example illustration of an image utilizing specific image areas to identify the speed of the object-collection system in accordance with embodiments described herein.

FIG. 4C is an example illustration of an image utilizing specific image areas to identify the speed of the object-collection system in accordance with embodiments described herein. As discussed above, image 440 includes a catcher swath area 446. In some embodiments, the image 440 may also include a visible area 444 outside of the catcher swath area 446.

To determine the approach speed of the object-collection system to the object, a plurality of image tracking portions 442 are identified or positioned on the image 440. The image tracking portions 442 may be positioned anywhere on the image 440, but may be more accurate when positioned near a bottom of the image within the catcher swath area 446. One or more feature characteristics are determined or identified in each image tracking portion 442. These feature characteristics are unique features to image 440 within the boundary defined by the image tracking portions 442, which may include variations in dirt color, edges or ridged features on the ground, etc. These unique features are tracked over multiple image frames using optical flow tracking. A vertical pixel location of each unique feature is captured for a select number of image frames, such as 20 frames. The vertical pixel locations per frame for each image tracking portion may be plotted on a graph, such as shown in FIG. 4D.

FIG. 4D is an example illustration of a graph 460 showing the tracked vertical pixel location 462 of a tracked feature across multiple image frames for a particular image tracking portion. Linear regression techniques may be employed on vertical pixel location 462 to identify a speed of the tracked feature, which is the number of pixels the tracked feature moved per frame for the particular image tracking portion. A separate speed may be determined for each of the plurality of image tracking portions in this way, which are then averaged to generate the current speed at which the object-collection system is approaching the object.

Returning to FIG. 4B, with the current speed and a known time of how long it takes the paddles 404 to move from the storage height to the pick-up height, a vertical pixel location of the trigger line 426 can be determined.

FIG. 5 is an example illustration of a display 500 presented to a driver of the object-collection system in accordance with embodiments described herein. In various embodiments, display 500 includes a first screen 502 and a second screen 504. In some embodiments, the first screen 502 may be on one display device and the second screen 504 may be on a second, separate display device. In other embodiments, the first screen 502 may be on a first portion of a display device and the second screen 504 may be on a second portion of the same display device. In at least one embodiment, the display device presenting the first screen 502, the second screen 504, or both may be on a mobile user computer device (e.g., mobile user computer device 130 in FIG. 1 or mobile user computer device 620 FIG. 6A).

In the illustrated example, the first screen 502 is a current view from the camera on the object-collection system, as discussed above. In this example, the first screen 502 shows three objects being approached by the object-collection system (i.e., the object-collection system is approaching the objects. In various embodiments, a tracking area 510 may be employed in which target objects 518 in the tracking area 510 are tracked using one or more neural networks, as described herein. In some embodiments, these neural networks may be trained similar to those used to identify the object in images captured from an image-collection vehicle.

In some embodiments, bounding boxes may be added to the displayed image to illustrate which objects are being tracked via trained neural networks. If an object is not being tracked then the user may be enabled to interact with the first screen 502 to add a bounding box around a currently non-tracked object. Once the user-added bounding box is added, the system may use optical flow tracking or other image tracking techniques to track movement of the object across multiple image frames. In other embodiments, the user may be enabled to interact with the first screen 502 to de-select an object from being tracked. For example, if the user determines that the object is not a pick-up eligible object, then the user can input that information into the system so that it no longer tracks the object and does not attempt to pick-up the object. In some embodiments, a flag or other indicator may be added to the object information to indicate that the object was not picked up.

The first screen 502 may also display other information to the user. For example, the first screen 502 can include a speed-adjustment indicator 508 to notify the user to speed up or slow down the movement speed of the object-collection system. This speed indicator may be based on a current speed of the object-collection system and a desired or optimal collection speed. For example, in an area with multiple objects, the user may be instructed to slow down to give the system time to pick up each object. Conversely, in an area with very few objects, the user may be instructed to speed up.

In other embodiments, the first screen 502 may display an approach indicator 506. The approach indicator 506 may instruct the user to move the object-collection system to the right or to the left to improve the object-collection system's ability to pick up an object. This approach indicator 506 may also be used to instruct the user on which way to turn the object-collection system to keep the object-collection system on the pick-up path determined to pick up the objects.

Although these indicators are described as being displayed to a user, embodiments are not so limited. In other embodiments, the indicator instructions may be provided to an autonomous control computer that is configured to automatically control the operation of the object-collection system with little or no input from the user.

Also illustrated in FIG. 5 is a second screen 504. In this illustration, the second screen 504 displays a map or aerial representation of the target geographical area. The second screen 504 may illustrate the target or pick-up path 514 in which the object-collection system is to travel to pick up the target objects 518. The width of the target path 514 may be displayed to show the swath width 512 of the object-collection system 520 (which may be an embodiment of object-collection system 618 in FIG. 6A).

In some embodiments, the second screen 504 may display oversized or non-pick-up eligible objects 516. In other embodiments, the second screen 504 may remove the visual representation of these objects. For example, the second screen 504 may include a size adjustment input 522. The size adjustment input 522 enables the user to select different sized objects that are to be picked up by the object-collection system. If the user clicks on the "plus" icon, then the object-collection system may identify, track, and pick up larger objects. If the user clicks on the "minus" icon, then the object-collection system may identify, track, and pick up smaller objects. In some embodiments, the objects 518 being shown in the second screen (and tracked in the first screen 502) may change based on the user's selection.

FIG. 6A illustrates a context diagram of a system 600A for scanning a target geographical area, identifying objects in that area, and employing an object-collection system to pick up the objects in accordance with embodiments described herein. System 600A includes an object-detection server 602, a mobile user computer device 620, an image-collection vehicle 616, an object-collection system 618, a target-area database 604, and an object-information database 606, which are operably connected and communicate via a communication network 610.

The image-collection vehicle 616 is a vehicle or system that includes a sensor array 622 for collecting images or other sensor data of a target geographical area. The image-collection vehicle 616 may be a manned or unmanned aerial vehicle, such as a helicopter, airplane, glider, kite, balloon, satellite, or other aerial flying device, which may include drone 105 in FIGS. 1A-1B. Although some embodiments describe the image-collection vehicle 616 as being an aerial-image-collection vehicle, embodiments are not so limited. In other embodiments, the image-collection vehicle 616 may be substituted, replaced, or used in conjunction with a ground-image-collection vehicle or system. The ground-image-collection vehicle may be a suitable manned or unmanned ground vehicle, such as a truck, tractor, ATV, or the like, may also be utilized to scan the a target geographical area for objects. In yet other embodiments, one or more hand-held user devices, such as a smartphone, tablet computer, theodolite, camera, etc. may be utilized. Accordingly, while some examples discussed herein include a drone being used to scan and identify objects in a target geographical area, other examples can include other types of suitable devices. The aerial-image-collection vehicle and the ground-image-collection vehicle may be generally referred to as an image-collection vehicle or image-collection system.

The image-collection vehicle 616 includes one or more sensors in a sensor array 622. Such sensors can include a camera, RAdio Detection And Ranging (RADAR), LIght Detection And Ranging (LIDAR), SOund Navigation And Ranging (SONAR), and the like. A camera can include any suitable type of camera, including a visible light camera, infrared camera, ultraviolet camera, thermographic camera, and the like. The sensor array 622 is utilized to capture images and data of a target geographical area.

The object-detection server 602 is a computing device that receives data from the image-collection vehicle 616 and employs one or more trained artificial neural networks to identify objects in the images captured by the image-collection vehicle 616. The object-detection server 602 stores information regarding the identified objects, such as a location and approximate size, in the object-information database 606. In some embodiments, the object-detection server 602 may also receive data from the object-collection system 618 and employ one or more trained artificial neural networks to identify and track objects as the object-collection system 618 approaches the objects for pick up.

The mobile user computer 620 is a computing device that presents information to a user via a graphical user interface. In various embodiments, the mobile user computer 620 is an embodiment of mobile user computer device 125 in FIG. 1A. The mobile user computer 620 can be any suitable computing device, including a tablet computer, a smartphone, laptop computer, desktop computer, wearable computer, vehicle computer, gaming device, television, and the like.

The object-collection system 618 is a system configured to maneuver across a target geographical area and pick up objects, as described herein. For example, system 300 in FIGS. 3A-3B may be an embodiment of object-collection system 618.

The object-collection system 618 can include a processor or other controller (not illustrated) that is configured to control and/or receive data from sensor array 624 and object-collector apparatus 626 to track and pick up objects, as described herein.

Additionally, in various embodiments, the controller can be configured to control and/or receive data from other components of the object-collection system, such as a vehicle (e.g., vehicle 155 in FIG. 3A) or portions thereof. For example, in some embodiments, the controller can be configured to drive an autonomous vehicle and drive an object-collector apparatus 626 of the autonomous vehicle based at least in part on data from the autonomous vehicle, the sensor array 624 and object-collector apparatus 626. In other examples, the controller can be limited to control of the object-collector apparatus 626 based at least in part on data from the object-collector apparatus 626, sensor array 624, and the like, as described in more detail herein.

While the object-collection system 618 is described as having a controller to track objects using the sensor array 624 and control movement of the object-collection system 618, embodiments are not so limited. In some embodiments, such functionality of the controller may be performed by or in conjunction with the object-detection server 602.

Accordingly, in various embodiments, one or more of the object-collection system 618, mobile user computer device 620, or object-detection server 602, or a combination thereof, can perform some or all steps of methods, functions, or operations described herein.

The object-detection server 602 can comprise various suitable systems of one or more virtual or non-virtual computing devices. In various examples, the object-detection server 602 can be remote from the mobile user computer device 620, object-collection system 618, sensor array 624, and object-collector apparatus 626. The communication network 610 can comprise any suitable wired or wireless communication network including a Wi-Fi network, Bluetooth network, cellular network, the Internet, a local area network (LAN), a wide area network (WAN), or the like.

The example system 600A of FIG. 6A is for illustrative purposes and should not be construed to be limiting. For example, in some embodiments, a plurality of image-collection vehicles 616 may be employed to scan a target geographical area. In other embodiments, a plurality of mobile user computer devices 620 can be employed to collectively present information to one or more users, as described herein. In yet other embodiments, a plurality of object-collection systems 618 may be employed to collectively collect objects from the target geographical area.

Figure 6B:
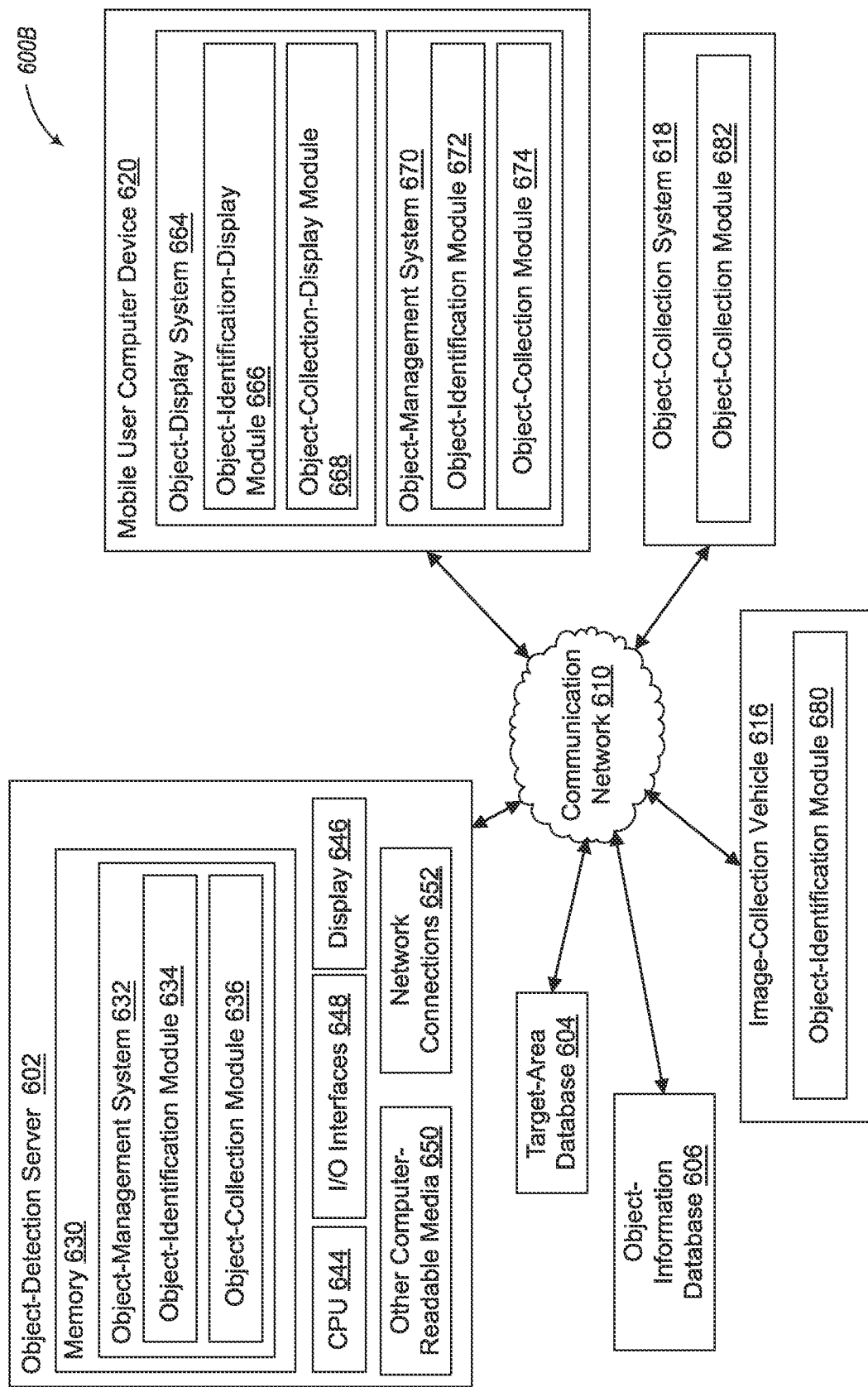
FIG. 6B shows a system diagram that describes one implementation of computing systems for implementing embodiments described herein.

FIG. 6B shows a system diagram that describes one implementation of computing systems for implementing embodiments described herein. Similar to FIG. 6A, system 600B includes object-detection server 602, mobile user computer device 620, image-collection vehicle 616, object-collection system 618, target-area database 604, and object-information database 606.

Regarding the object-detection server 602, one or more special-purpose computing systems may be used to implement object detection server 602 to train and utilize one or more artificial neural networks (or other image recognition techniques) to identify objects in images (or other sensor data) of a target geographical area, as described herein. Accordingly, various embodiments described herein may be implemented in software, hardware, firmware, or in some combination thereof.

The object detection server 602 includes memory 630, one or more central processing units (CPUs) 644, I/O interfaces 648, display 646, other computer-readable media 650, and network connections 652. The object detection server 602 may include other computing components that are not shown for ease of illustration.

Memory 630 may include one or more various types of non-volatile and/or volatile storage technologies. Examples of memory 630 may include, but are not limited to, flash memory, hard disk drives, optical drives, solid-state drives, various types of random access memory (RAM), various types of read-only memory (ROM), other computer-readable storage media (also referred to as processor-readable storage media), or the like, or any combination thereof. Memory 630 is utilized to store information, including computer-readable instructions that are utilized by CPU 644 to perform actions and embodiments described herein.

For example, memory 630 may have stored thereon object-management system 632. Object-management system 632 includes object-identification module 634 and object-collection module 636 to employ embodiments described herein. For example, the object-identification module 634 trains one or more artificial neural networks that are utilized to identify, classify, and determine a location of objects in a target geographical area based on sensor data collected from the image-collection vehicle 616. The object-collection module 636 trains one or more artificial neural networks that are utilized to identify, classify, and track a location of objects to allow an object-collection system 618 to pick up the objects.

The object-identification module 634, the object-collection module 636, or both, may interact with other computing devices, such as the image-collection vehicle 616 to collect sensor data; and mobile user computer device 620 to receive boundary information or display a representation of object locations; and object-collection system 618 to pick up the objects; and object-information database 606 to store the locations of objects; and target-area database 604 to store information regarding the target geographical area, as described herein. Although illustrated separately and on a same computing device, the functionality of the object-identification module 634 and the object-collection module 636 may be performed by a single module, or by a plurality of modules on one or more computing devices. Memory 630 may also store other programs and data to perform other actions associated with the operation of object detection server 602.

Network connections 652 are configured to communicate with other computing devices, such as mobile user computer device 620, image-collection vehicle 616, object-collection system 618, target-area database 604, object-information database 606, or other devices not illustrated in this figure, via one or more communication networks 610. In various embodiments, the network connections 652 include transmitters and receivers (not illustrated) to send and receive data as described herein. Display 646 is configured to provide content to a display device for presentation of the graphical user interface to a user. In some embodiments, display 646 includes the display device, such as a television, monitor, projector, or other display device. In other embodiments, display 646 is an interface that communicates with a display device. I/O interfaces 648 may include a keyboard, audio interfaces, video interfaces, or the like. Other computer-readable media 650 may include other types of stationary or removable computer-readable media, such as removable flash drives, external hard drives, or the like.

Mobile user computer device 620 is a computing device that receives information from the object-detection server 602 to present a graphical user interface to a user to enable the user to input boundary information or to display a representation of the target geographical area and the location of identified objects, as described herein. The mobile user computer device 620 includes a memory, CPU, I/O interfaces, display, other computer-readable media, and network connections, similar to object-detection server 602, but are not illustrated in FIG. 6B for simplicity. Accordingly, the mobile user computer device 620 may store computer instructions that when executed by a processor cause the processor to perform actions described herein.

Briefly, mobile user computer device 620 may have stored thereon object-display system 664 and an object-management system 670. The object-display system 664 may include an object-identification-display module 666 and an object-collection-display module 668. The object-identification-display module 666 presents a graphical user interface that displays a visual representation of a target geographical area and the locations of objects identified in the target geographical area. The object-collection-display module 668 presents a graphical user interface that displays images of the target geographical area as the object-collection system 618 approaches objects to be picked up and a representation of the location of the object-collection system 618 relative to the object locations. Although illustrated separately and on a same computing device, the functionality of the object-identification-display module 666 and object-collection-display module 668 may be performed by a single module, or by a plurality of modules on one or more computing devices.

The object-management system 670 may include object-identification module 672 or object-collection module 674, which may perform embodiments of object-identification module 634 and object-collection module 636, respectively, of the object-detection sever 602. In this way, the mobile user computer device 620 may perform at least some of the identification, collection, and tracking functionality locally.

The image-collection vehicle 616 captures image or sensor data of a target geographical area, as described herein. The image-collection vehicle 616 includes a memory, CPU, I/O interfaces, display, other computer-readable media, and network connections, similar to object-detection server 602, but are not illustrated in FIG. 6B for simplicity. Accordingly, the image-collection vehicle 616 may store computer instructions that when executed by a processor cause the processor to perform actions described herein. The image-collection vehicle 616 may include object-identification module 672, which may perform embodiments of object-identification module 634 of the object-detection sever 602. In this way, the image-collection vehicle 616 may perform at least some of the identification functionality locally.

The image-collection vehicle 616 captures image or sensor data of a target geographical area, as described herein. The image-collection vehicle 616 includes a memory, CPU, I/O interfaces, display, other computer-readable media, and network connections, similar to object-detection server 602, but are not illustrated in FIG. 6B for simplicity. Accordingly, the image-collection vehicle 616 may store computer instructions that when executed by a processor cause the processor to perform actions described herein. The image-collection vehicle 616 may include object-identification module 680, which may perform embodiments of object-identification module 634 of the object-detection sever 602. In this way, the image-collection vehicle 616 may perform at least some of the identification functionality locally.

The object-collection system 618 captures image or sensor data of a target objects to be picked up and picks up those objects, as described herein. The object-collection system 618 includes a memory, CPU, I/O interfaces, display, other computer-readable media, and network connections, similar to object-detection server 602, but are not illustrated in FIG. 6B for simplicity. Accordingly, the object-collection system 618 may store computer instructions that when executed by a processor cause the processor to perform actions described herein. The object-collection system 618 may include object-collection module 682, which may perform embodiments of object-collection module 636 of the object-detection sever 602. In this way, the object-collection system 618 may perform at least some of the tracking and collection functionality locally.

The target-area database 604 may store information about one or more target geographical areas, including boundary information or exclusion zones. The object-information database 606 stores information about identified objects, including a determined physical location of the identified objects.

The operation of certain aspects will now be described with respect to FIGS. 7-15. Processes 700s, 800s, 900s, 1000s, 1100s, 1200s, 1300s, 1400s, and 1500s described in conjunction with FIGS. 7-15, respectively, may be implemented by or executed via circuitry or on one or more, or a combinations of, computing devices, such as object-detection server 602, object-collection system 618, mobile user computer device 620, or image-collection vehicle 616. For example, object-detection server 602 may perform all or parts of processes 800s, 900s, 1000s, 1100s, 1200s, or 1300s; object-collection system 618 may perform all or parts of process 1500s; mobile user computer device 620 may perform all or parts of processes 700s, 800s, 900s, 1000s, or 1100s; and image-collection vehicle 616 may perform all or parts of processes 800s, 900s, 1000s, or 1100s. These examples are not to be construed as limiting; rather, various combinations of computing devices may be perform various elements of the various processes.

Figure 7:
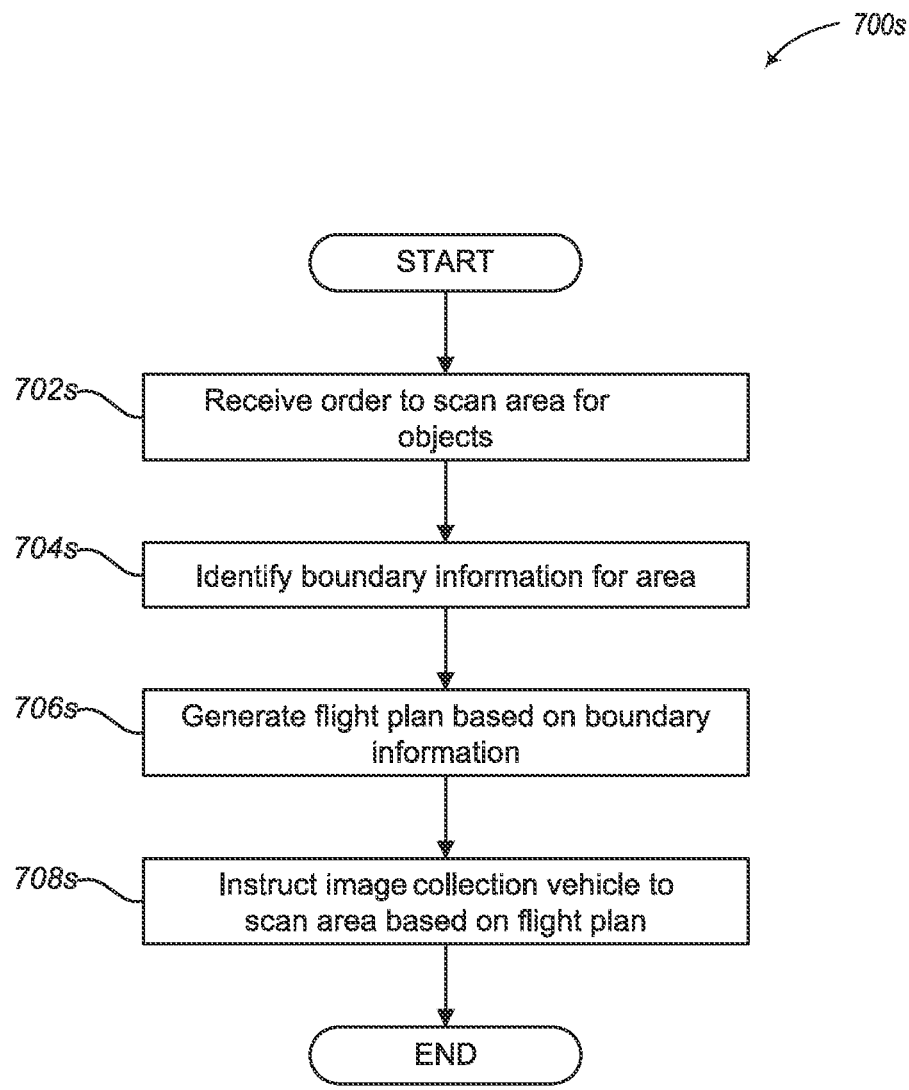
FIG. 7 illustrates a logical flow diagram showing one embodiment of a process for instructing an image-collection vehicle to scan a target geographical area in accordance with embodiments described herein.
Figure 8:
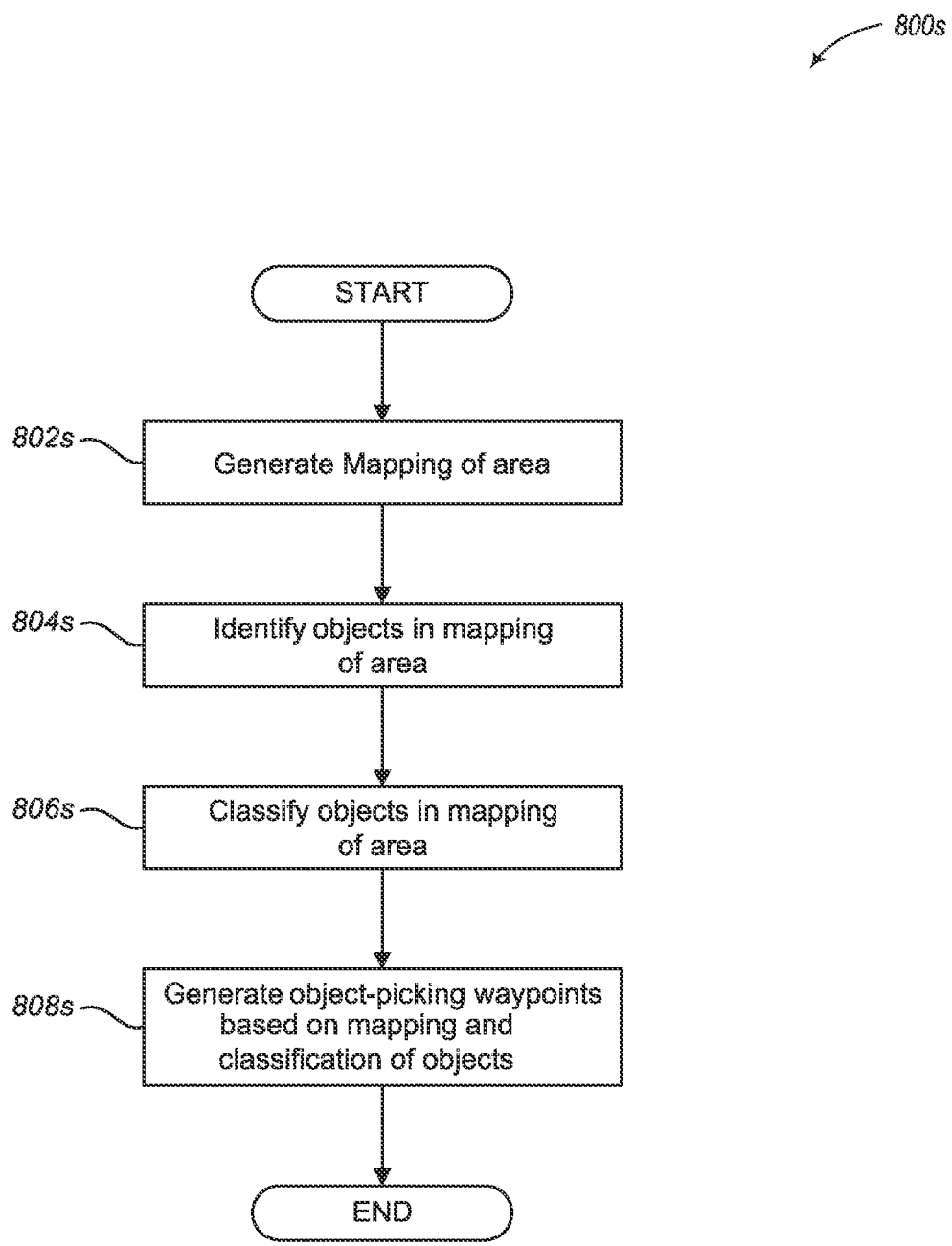
FIG. 8 illustrates a logical flow diagram showing one embodiment of a process for identifying and mapping objects in a target geographical area in accordance with embodiments described herein.
Figure 9:
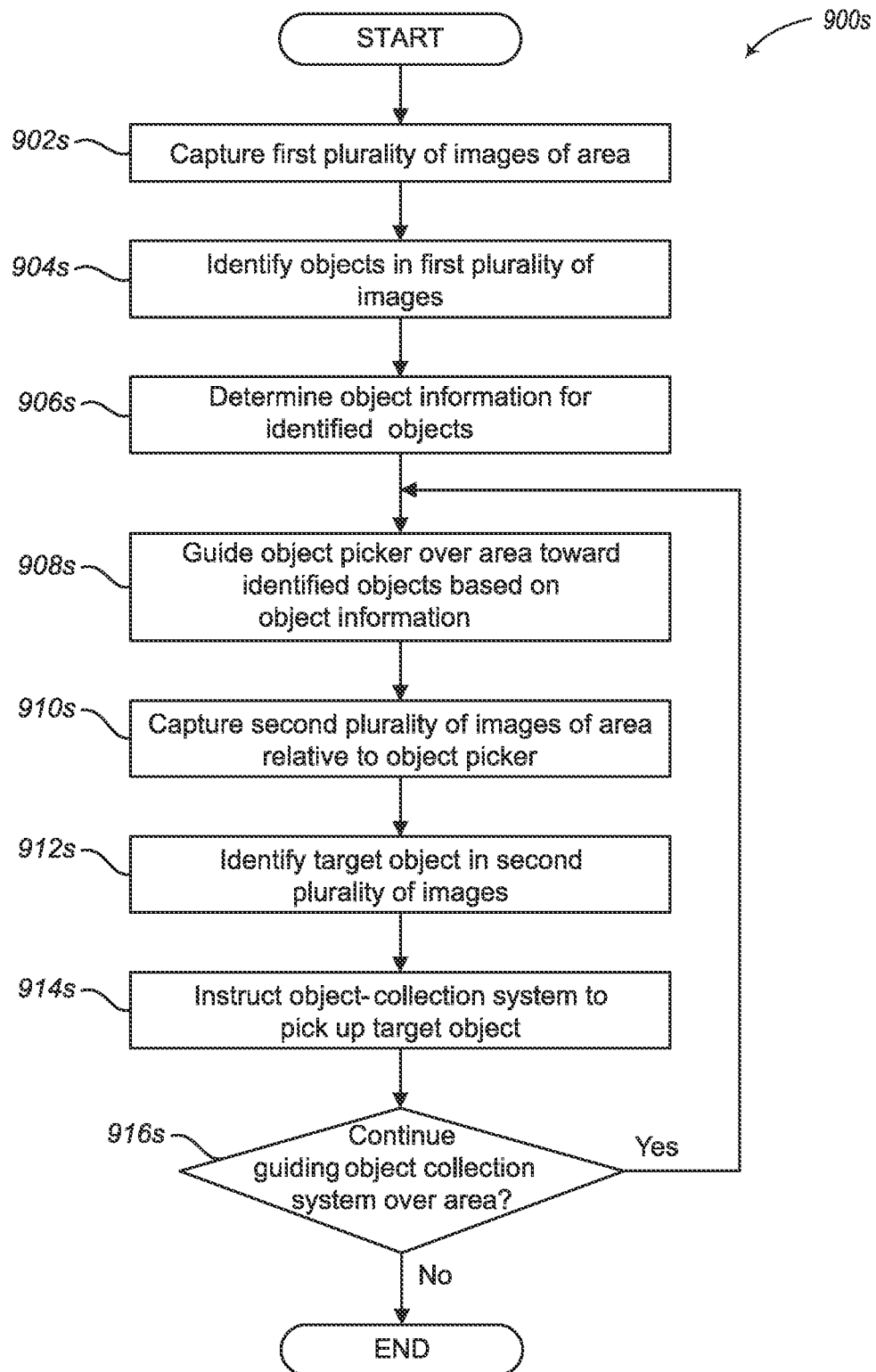
FIG. 9 illustrates a logical flow diagram showing one embodiment of a process for identifying objects and guiding an object-collection system to pick up the identified objects in a target geographical area in accordance with embodiments described herein.

FIG. 7 illustrates a logical flow diagram showing one embodiment of a process 700s for instructing an image-collection vehicle to scan a target geographical area in accordance with embodiments described herein. Process 700s begins, after a start block, at block 702s, where an order to scan or map a target geographical area for objects is received. In various embodiments, a user may input, select, or otherwise request a scan via a user computing device (e.g., mobile user computer 620).

In some embodiments, the user may also input or select a type of image-collection vehicle (e.g., image-collection vehicle 616 in FIG. 6A or drone 105 in FIG. 1A) or the type of sensors to be utilized during the scan. For example, the user may indicate that the image-collection vehicle is to utilize both thermal imaging and visual spectrum imaging. As another example, the user may indicate that the image-collection vehicle is to execute a first scan at a first height above the ground to identify possible areas of objects and a second scan at a second height (e.g., lower than the first height) above the ground to identify objects within the possible areas of objects. The use of different scan heights may be to reduce the total amount of processing being performed, to improve accuracy for areas of interest, accommodate for different resolutions, utilize different sensors that may operate more efficiently at different heights, or other factors.

In yet other embodiments, one or more scanning passes may be utilized, which may be at a same height or at different heights. For example, in some embodiments, an image-collection vehicle may be employed to identify areas-of-interest within the target geographical area as possibly containing one or more objects. At some later time, a ground-image-collection vehicle (e.g., a tractor or autonomous rover) may be employed to re-scan the areas-of-interest.

In at least one embodiment, the user may also input various parameters or conditions associated with the target geographical area. For example, the user can input an expected type of object to be found in the geographical area (e.g., a rock or specific type of rock, a specific type of fruit, a human, etc.), a type of crop being planted at the target geographical area, a status of the crop (e.g., not planted, planted but not sprouted, plant clearing the ground by 2 cm, etc.), a time of year, current or expected weather at the time when the image-collection vehicle is to scan the target geographical area, an expected type or amount of non-cultivated vegetation (e.g., a type or density of weeds, possibility of trees or shrubs, etc.), or other conditions that may alter, change, or effect the ability to identify objects.

Process 700s proceeds to block 704s, where boundary information for the geographical target area is identified. In various embodiments, a user can select or input the boundary information, such as by entering a legal property address, entering GPS coordinates, utilizing a graphical user interface to draw or place borders on an image, or other information that identifies the target geographical area.

In various embodiments, the user may also input one or more exclusion zones. In some embodiments, the user can utilize a graphical user interface to draw, identify, define, or place borders of the exclusion area on an image. The exclusion zones further define areas not to be scanned by the image-collection vehicle. Accordingly, the boundary information may indicate an area to be scanned or it may indicate an outside or exterior boundary and one or more internal boundaries that are not to be scanned.

Process 700s continues at block 706s, where a flight plan (or travel plan) is generated based on the boundary information. The flight plan may be any suitable "auto-pilot" or preprogramed instructions designed for the image-collection vehicle to maneuver over the target geographical area. In various embodiments, the flight plan includes a plurality of waypoints within the target geographic area in which the image-collection vehicle is to follow. The flight plan may also include a designated height in which the image-collection vehicle is to fly. Such height may be a height above takeoff, or it may be a set height above the ground. As described herein, the flight height may be set based on the desired image resolution of the images captured by the image-collection vehicle.

Process 700s proceeds next at block 708s, where the image-collection vehicle is instructed to scan the target geographical area based on the flight plan. In some embodiments, the flight plan is uploaded or otherwise installed on the image-collection vehicle. In some embodiments, the flight plan may be modified or manipulated mid-scan based on missed areas, changes, in weather, or for other reasons.

After block 708s, process 700s terminates or otherwise returns to a calling process to perform other actions.

FIG. 8s illustrates a logical flow diagram showing one embodiment of a process for identifying and mapping objects in a target geographical area in accordance with embodiments described herein. Process 800s begins, after a start block, at block 802s, where a mapping of the target geographical area is generated. This mapping may be the scanning or capturing of sensor data of the target geographical area. For example, as discussed herein, in some embodiments, a drone 105 can scan a field 110.

Process 800s proceeds to block 804s, where objects are identified in the mapping (images or scan data) of the target geographical area. In various embodiments, computer vision or artificial intelligence, or some combination thereof, can be used in analyzing portions of the mapping to identify objects within the target geographical area. For example, in various embodiments an identification algorithm (or artificial neural network) can be trained using training mappings, images, or other data where users have specifically identified "objects" or "not objects." In further examples, training mappings can be generated based on generated mappings of previous target geographical areas and on data obtained while picking up objects in the previous target geographical area. In some embodiments, the identification of an object in the mappings may also include a confidence score for such an identification.

In various embodiments, identifying objects can also include identifying one or more characteristics of identified objects. Such characteristics can include, but are not limited to, an estimated object volume or volume range; an estimated object mass or mass range; an estimated object height above the ground or height range; an object shape type; and the like. For example, object shape types can include, spherical, ovoid, planar, elongated, irregular, polished, rough, and the like. In various embodiments, the size or volume of the identified objects may be determined based on a number of image pixels associated with the objects, which is described in more detail herein.

Moreover, as described in more detail herein, a location of the objects in the target geographical area may also be determined.

Process 800s continues at block 806s, where the identified objects are classified. Classification of identified objects can be based on one or more other characteristics, which may be performed during the identification process. These classification characteristics can include a classification of "pick-up eligible" or "not pick-up eligible," a specific type of object, etc.

For example, in various embodiments, it can be desirable to remove any objects from a field that may interfere with activities in the field, such as tilling, planting, irrigation, pruning, weeding, spraying, harvesting, and the like. In such examples, objects can have characteristics such that they would not interfere with certain activities in the field 110 and therefore need not be picked up; can have characteristics such that they would interfere with certain activities in the field 110 and therefore should be picked up, if possible; can have characteristics such that they can be picked up by an object-collection system (e.g., object-collection system 618); can have characteristics such that they cannot be picked up by the object picking system; and the like. Accordingly, where a given object would interfere with certain field activities and was capable of being picked up by the object-collection system, the object can be classified as "pick-up eligible." On the other hand, if a given object is incapable of being picked up by the object-collection system or has characteristics where it would not interfere with certain field activities, then the object can be classified as "not pick-up eligible."

In at least one embodiment, a user may set or select the characteristics that define a pick-up eligible object from a not pick-up eligible objects. For example, a user can utilize a graphical user interface to set a target threshold size such that object larger than the threshold size are not pick-up eligible and objects smaller than the threshold size are pick-up eligible. In some embodiments, the user may set a second, lower threshold size such that an object that is smaller than the second threshold is not pick-up eligible. In at least one embodiment, the graphical user interface presented to the user may display representations of all identified objects, pick-up eligible objects (e.g., those that meet the user's threshold size), not pick-up eligible, etc., which may be based on user preferences or selections.

In some other embodiments, classification of the identified objects may also include indicating a type of object. For example, in some embodiments, the mapping (e.g., image or sensor data) of the target geographical area may be analyzed by each of plurality of artificial neural networks, where each artificial neural network is trained to identify different types of objects. Accordingly, the identified objects may be classified as rocks, human, animal, or some other trained classification.

Process 800s proceeds next to block 808s, where one or more object-picking waypoints are generated based on the mapping and classification of objects. In some embodiments, the object-picking waypoints may be determined as the location of the objects. For example, the location of objects classified as "pick-up eligible" can be included as an object-picking waypoint. Additionally, in some examples, an object-picking waypoint can comprise a plurality of objects. For example, where a plurality of objects are clustered together (e.g., such that the plurality of objects can be picked up by the object-collection system without further moving the object-collection system), then a given object-picking-waypoint can comprise a plurality of objects.

In other embodiments, the object-picking waypoints may be various points or locations within the target geographical area (which may be at the object locations or not) in which the object-collection system can maneuver to run over or come across the object for pick up. These object waypoints can be utilized as data points or travel waypoints in a pick-up path or route to instruct or guide an object-collection system to the objects in the target geographical area for pick up, as described herein.

After block 808s, process 800s terminates or returns to a calling process to perform other actions.

FIG. 9s illustrates a logical flow diagram showing one embodiment of a process 900s for identifying objects and guiding an object-collection system to pick up the identified objects in a target geographical area in accordance with embodiments described herein. Process 900s begins, after a start block, at block 902s, where a first plurality of images of a target geographical area are captured. As described herein, an image-collection vehicle may capture images using one or more cameras or sensors. In some embodiments, the first plurality of images are visual spectrum images. In other embodiments, the first plurality of images are captured using other sensors (e.g., thermal images, infrared images, etc.).

The first plurality of images may be captured at preset or selected time or distance intervals such that they are consecutive or adjacent images that include a partially overlapping area of the target geographical area. In some embodiments, image processing techniques may be employed to determine if there are non-overlapping images such that portions of the target geographical area are missed by the scanning process. In at least one such embodiments, the image-collection vehicle may be instructed to re-traverse over the target geographical area to capture images of the missed area.

Although embodiments described herein generally refer to the first plurality of images as being captured from the air, embodiments are not so limited. In other embodiments, one or more cameras or sensors held by a person or mounted on a ground-operated vehicle (e.g., a tractor, all-terrain vehicle, truck, etc.) may also be used to capture the first plurality of images.

Process 900s proceeds to block 904s, where one or more objects are identified in the first plurality of images. In various embodiments, the first plurality of images are analyzed by one or more artificial neural networks that are trained to identify (and classify) objects, which is described in more detail herein. Briefly, for example, one artificial neural network may be utilized on one subset of the first plurality of image and a second artificial neural network may be utilized on a second subset of the plurality of images. These two artificial neural networks may be trained to identify different objects, trained to identify objects in different conditions, etc. The subsets of images may be groups of images based on location (e.g., search zones), groups of images based on conditions, alternatingly captured images, etc.

In various embodiments, it may be desirable to have each image include a uniform relationship between the number of image pixels and the corresponding ground distance, e.g., 15 pixels corresponds to approximately 101.6 mm (four inches). This uniformity may improve the efficiency of the artificial neural networks and the identifications of object. In some instances, however, one or more of the first plurality of images may not have such uniformity due to inconsistencies in the slope of the ground, tilt of the image-collection vehicle, or other visual effects. Accordingly, in some embodiments, the first plurality of images may be modified to remove such distortion. An example embodiment of one process for removing the distortion and identifying a location of objects in an image is described below in conjunction with FIG. 10.

Although embodiments described herein refer to the analysis of images to identify object, embodiments are not limited to the analysis of whole images. Rather, in some embodiments, each captured image may be segmented into a plurality of tiles. Each tile can then be processed through an artificial neural network, or other vison recognition techniques or algorithms, to identify objects. In some embodiments, the size of each tile may be selected based on the processing size of the neural network. Moreover, the selected tiles may overlap a selected percentage or number of pixels.

Process 900s continues at block 906s, where object information for the identified objects is determined. The object information of each identified object may include an approximate physical location of that corresponding object, an approximate size of the corresponding object, a type of the corresponding object, a pickability classification of the corresponding object, etc., such as described elsewhere herein.

Briefly, the physical location of an object may be determined based on the pixel location of the object within an image and the location of the image, which may be based on the physical location and telemetry data of the image-collection vehicle when the image was captured. The size of the object may be determined, for example, by analyzing the number of pixels that include or make up the object in the images. In some embodiments, duplicate identified object may be determined and removed or ignored, such as shown in FIGS. 2A-2C and discussed in conjunction with FIG. 11.

In various embodiments, the object information for each identified object is stored in a database, such as object-information database 606 in FIG. 6A. As described herein, the object information can be used to present a graphical user interface to a user showing a representation of the location (or size or pickability) of each identified object. The object information can also be used to generate an object density heat-map, as well as routing information in which to guide an object-collection system to pick up the objects.

Process 900s proceeds next to block 908s, where an object-collection system is guided over the target geographical toward the identified objects based on the object information. In some embodiments, the object waypoints described above may be utilized to guide the object-collection system.

In various embodiments, a pick-up path algorithm is utilized to determine a path across the target geographical area in which traverse to pick up the objects in a most efficient or quickest manner. As described herein, the pick-up path may be a best or optimal path to pick up the objects, a suboptimal or close to optimal path, and may be determined utilizing one or more clustering or path planning algorithms. In at least one embodiment, a user can input or select one or more pick-up parameters, which indicate which objects are to be picked up. This information can be used to label identified objects as being "tagged" for pick up or "ignored." The object information for the tagged object can then be utilized to determine the pick-up path of the object-collection system.

In some embodiments, guiding the object-collection system along the pick-up path may include displaying a map or visual instructions to a user to manually drive or maneuver the object-collection system over the target geographical area towards the objects, such as illustrated in FIG. 5. In other embodiments, the pick-up path may include GPS coordinates or travel waypoints that can be used by an autonomous vehicle to travel across the target geographical area.

Process 900s continues next at block 910s, where a second plurality of images of the target geographic area are captured relative to the object-collection system while the object-collection system is being guided over the target geographical area. In various embodiments, the second plurality of images are captured from one or more cameras or sensors mounted on the object-collection system. For example, a visual spectrum camera can be mounted on the front of the object-collection system and capture images in front of and in the travel path of the object-collection system, such as illustrated in FIG. 4B. The second plurality of images can be captured as the object-collection system is traversing over the target geographical area to monitor the ground in front of the object-collection system.

Process 900s proceeds to block 912s, where one or more target objects are identified in the second plurality of images. In various embodiments, block 912s may employ embodiments similar to block 904s to identify objects in the images. An object identified in an image of the second plurality of images may be referred to as the target object. In at least one embodiment, the artificial neural networks utilized in block 912s may be trained using different training data than used to train the artificial neural networks utilized in block 904s because of the different camera angles. In other embodiments, however, the same artificial neural networks may be utilized.

When a target object is identified in an image of the second plurality of images, the target object is tracked through multiple images as the object-collection system approaches the identified object, which is illustrated in and discussed in conjunction with FIGS. 4A-4D.

Process 900s continues at block 914s, where the object-collection system is instructed to pick up the target objects. In various embodiments, instructing the object-collection system includes an object collector apparatus that moves to be in position with the target object, pick up the target object, and place the target object in a holding bin for removal from the target geographical area. Example systems and apparatuses for picking up objects are discussed in more detail below in conjunction with FIGS. 16-40.

Process 900s proceeds next to decision block 916s, where a determination is made whether to continue to guide the object-collection system over the target geographical area. As discussed herein, the object-collection system may be guided by a pick-up path of multiple travel waypoints across the target geographical area. Accordingly, the determination of whether to continue to guide the object-collection system may be based on additional travel waypoints in the pick-up path. In other embodiments, the determination may be based on whether there are additional target objects in the second plurality of images. If the object-collection system is guided further over the target geographical area, then process 900s loops to block 908s; otherwise, process 900s terminates or otherwise returns to a calling process to perform further actions.

Figure 10A:
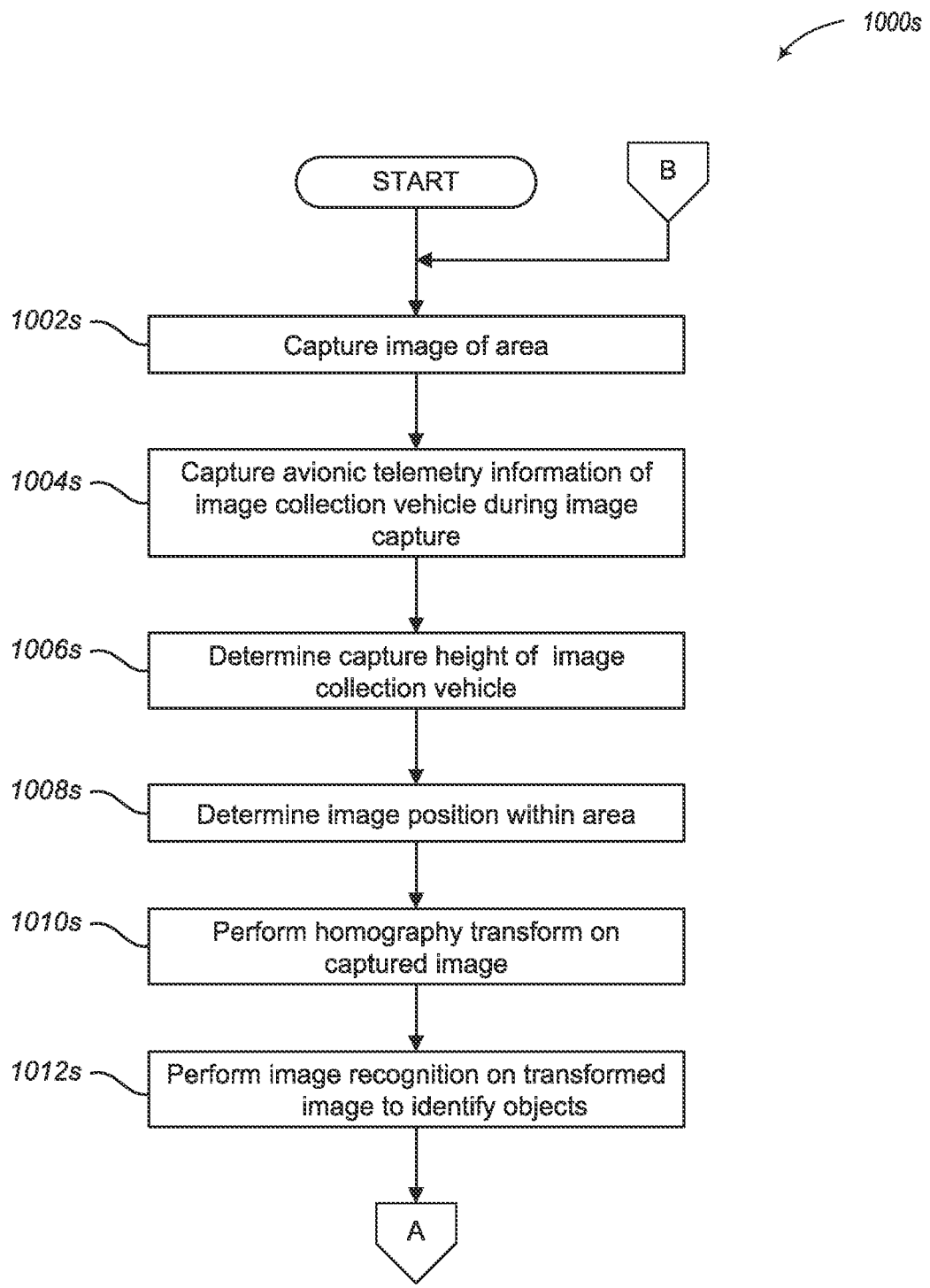
FIGS. 10A-10B illustrate a logical flow diagram showing one embodiment of a process for modifying captured images to enable identification of objects in accordance with embodiments described herein.
Figure 10B:
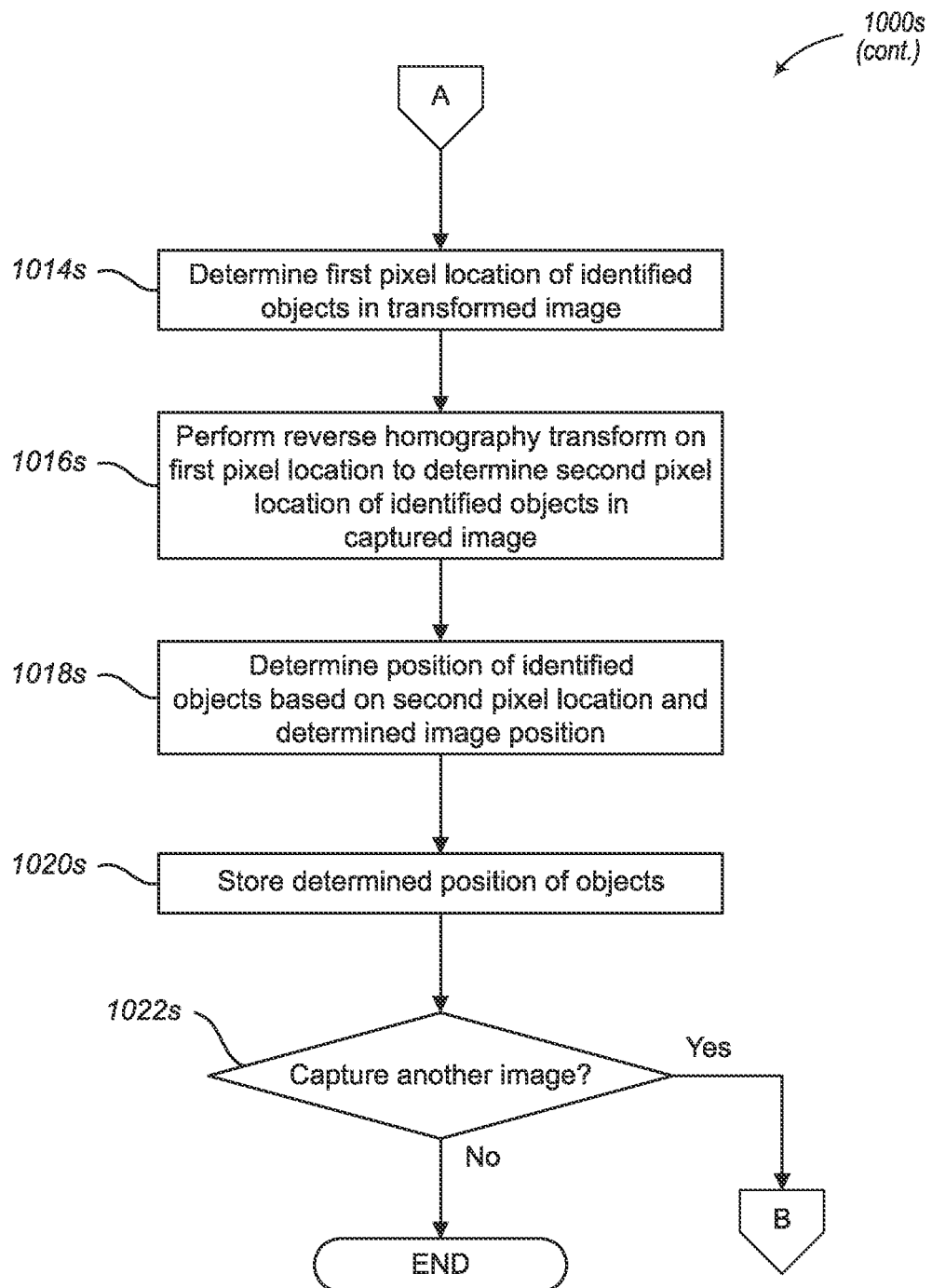

FIGS. 10A-10B illustrate a logical flow diagram showing one embodiment of a process 1000s for modifying captured images to enable identification of objects in accordance with embodiments described herein. Process 1000s begins, after a start block in FIG. 10A, at block 1002s, where an image of the target geographical area is captured. In various embodiments, block 1002s may employ embodiments similar to those described in conjunction with block 902s in FIG. 9 to capture an image of a target geographical area in which to identify objects. In some embodiments, process 1000s may be performed on the image-collection vehicle. In other embodiments, process 1000s may be performed by another computing device, such as the object-detection server 602 or mobile user computer device 620 in FIG. 6A, and the captured images may be received from the image-collection vehicle.

Process 1000s proceeds to block 1004s, where avionic telemetry information of the image-collection vehicle is captured during image capture. The avionic telemetry information may include GPS location of the image-collection vehicle, pitch of the image-collection vehicle, roll of the image-collection vehicle, yaw of the image-collection vehicle, heading of the of the image-collection vehicle, inertial measurements, altitude, or other information indicating the positioning and movement of the -image-collection vehicle. As mentioned above, process 1000s may be performed by another computing device, such as the object-detection server 602 or mobile user computer device 620 in FIG. 6A, and the avionic telemetry information may be received from the image-collection vehicle.

Process 1000s continues at block 1006s, where a capture height of the image-collection vehicle is determined. The capture height may also be referred to as the ground sample distance (GSD). In various embodiments, a LIDAR or other sensor may be employed on the image-collection vehicle to determine the height of the image-collection vehicle above the ground at the time the image is captured. If the target geographical area is flat, then other sensor data, such as altitude or height above takeoff may also be used to determine the height of the image-collection vehicle at the time of image capture.

Process 1000s proceeds next to block 1008s, where an image position within the target geographical area is determined. In various embodiments, the avionic telemetry information of the image-collection vehicle and the capture height is utilized to determine a physical position of the image. For example, the roll, pitch, yaw, and heading of the image-collection vehicle can determine an orientation and angle of capture from the image-collection vehicle relative to the ground. The orientation and angle of capture, height above ground, and GPS location of the image-collection vehicle can be utilized, along with trigonometric calculations, to determine an actual position of the captured image. This image position may be determined relative to a center of image. In other embodiments, the image position may be determined for a particular corner of the captured image.

Process 1000s continues next at block 1010s, where a homography transform is performed on the captured image. The homography transform stretches and converts the image into an image with uniform pixel distribution per ground unit. The homography transform removes image distortion caused by variations in ground slope and shape and the angle of capture from the image-collection vehicle. In various embodiments, a desirable transformed image may result in 15 pixels equating to approximately 101.6 mm (or approximately four inches) of ground distance.

Process 1000s proceeds to block 1012s, where image recognition is performed on the transformed image to identify one or more objects. In various embodiments, block 1012s may employ embodiments similar to embodiments described in block 904s in FIG. 9 to identify one or more objects in the transformed image.

Process 1000s continues at block 1014s in FIG. 10B, where a first pixel location of each identified object in the transformed image is determined. The first pixel of a corresponding object may be a mathematical center pixel of the corresponding object. For example, during object identification, a bounding box may be generated to enclose the features used to identify the object. The center of the bounding box may be set as the first pixel location of the corresponding object within the transformed image.

Process 1000s proceed next to block 1016s, where a reverse homography transform is performed on each first pixel location to determine a second pixel location of each identified object in the original image. The reverse homography transform converts each corresponding first pixel location in the transformed image into a corresponding second pixel location in the original image, which reverses the stretching and image distortion corrections performed in block 1010s in FIG. 10A. In various embodiments, each corresponding second pixel location may be referred to as a center position of each corresponding object in the originally captured image.

Process 1000s continues next at block 1018s, where a position of each identified objects is determined based on the corresponding second pixel location and the determined image position. In various embodiments, a distance and orientation may be calculated between the determined image position and the corresponding second pixel location to determine a GPS or other physical location of the corresponding object.

Process 1000s proceeds to block 1020s, where the determined position of the identified objects is stored. In some embodiments, the determined position of each identified object may be sent to and stored on a remote database, such as object-information database.

Process 1000s continues at decision block 1022s, where a determination is made whether another image is captured. In some embodiments, a plurality of images may be captured as the image-collection vehicle is scanning the target geographical area, as described herein. In some embodiments, process 1000s may be performed as images are being captured or received. In other embodiments, process 1000s may be performed post scan. If another image was captured, process 1000s loops to block 1002s in FIG. 1A; otherwise, process 1000s terminates or otherwise returns to a calling process to perform other actions.

Figure 11:
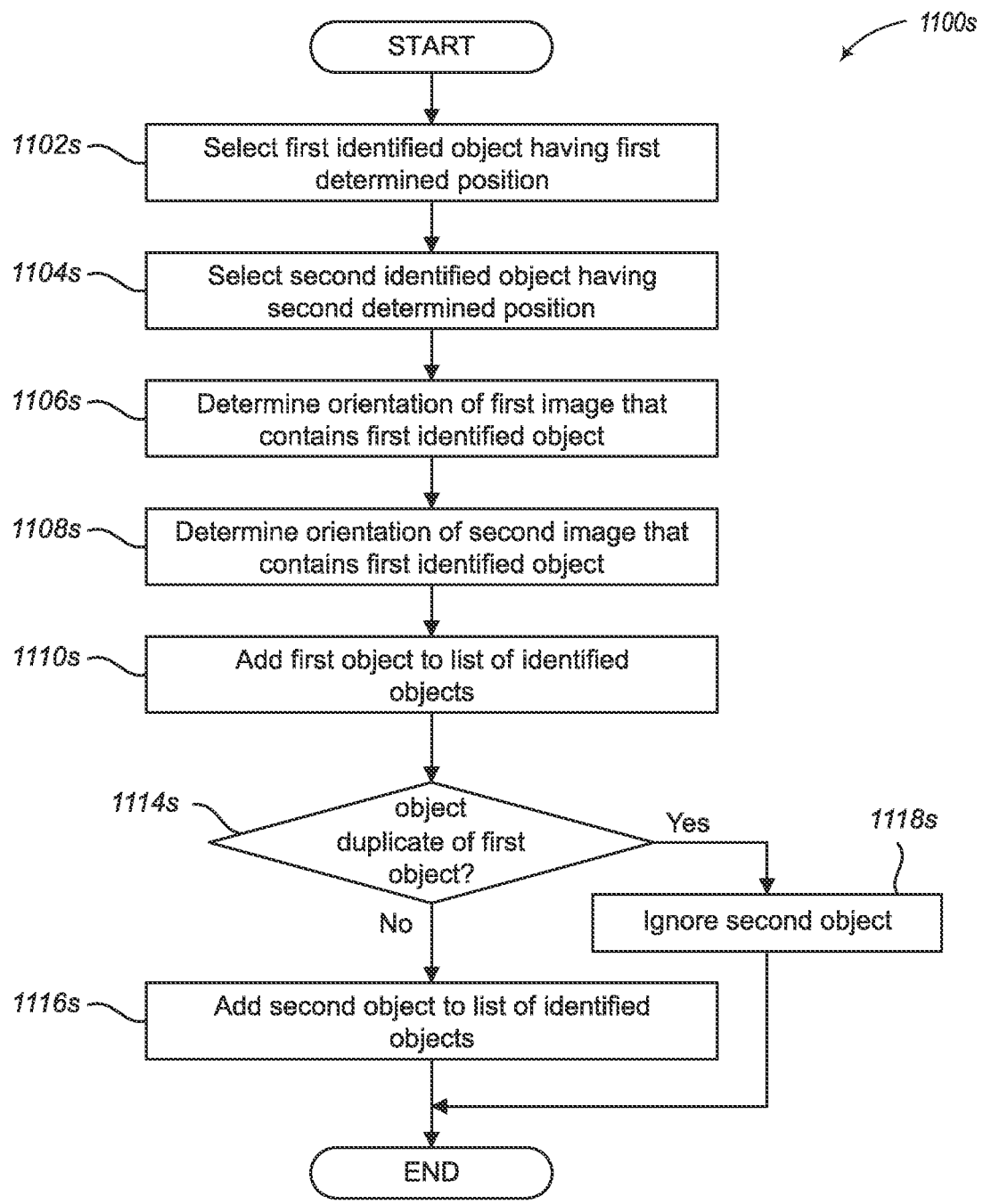
FIG. 11 illustrates a logical flow diagram showing one embodiment of a process for removing duplicative identifications of objects in accordance with embodiments described herein.

FIG. 11 illustrates a logical flow diagram showing one embodiment of a process 1100s for removing duplicative identifications of objects in accordance with embodiments described herein. Process 1100s begins, after a start block, at block 1102s, where a first identified object having a first determined position is selected. As described herein, a plurality of objects may be identified in an image captured by the image-collection vehicle, with a physical location of each identified object also being determined. The first identified object may be selected from the plurality of identified objects.

Process 1100s proceeds to block 1104s, where a second identified object having a second determined position is selected. In various embodiments, the second identified object may be a second identified object from the plurality of identified objects, similar to block 1102s.

Process 1100s continues at block 1106s, where an orientation of a first image that contains the first identified object is determined. In various embodiments, the orientation of the first image may be based on the heading of the image-collection vehicle when the first image was captured by the image-collection vehicle, such as when the avionic telemetry information is captured at block 1004s in FIG. 10A.

Process 1100s proceeds next to block 1108s, where an orientation of a second image that contains the second identified object is determined. In various embodiments, the orientation of the second image may be based on the heading of the image-collection vehicle when the second image was captured by the image-collection vehicle, similar to block 1106s. In some embodiments, blocks 1106s and 1008s may be optional and may not be performed when the duplication determination at decision block 1114s is based solely on a distance between the identified objects.

Process 1100s continues next at block 1110s, where the first object is added to a list of identified objects in the target geographical area. In various embodiments, the list of identified objects may be a list of object that are positively identified as being unique objects in the target geographical area.

Process 1100s proceeds to decision block 1114s, where a determination is made whether the second object is a duplicate of the first object based on the image orientations and the determined positions of the first and second identified objects. In various embodiments, one or more distance thresholds may be utilized to determine if the second identified object is a duplicate of the first identified object.

In various embodiments, if a distance between the first determined position of the first identified object exceeds a first threshold distance from the second determined position of the second identified object, then the second identified object is not a duplicate of the first identified object. Conversely, if the distance between the first determined position of the first identified object is below a second threshold distance from the second determined position of the second identified object, then the second identified object is a duplicate of the first identified object.

If, however, the distance between the first determined position of the first identified object is below the first threshold distance and exceeds the second threshold distance, then the image orientations may be utilized to determine if the second identified object is a duplicate of the first identified object. For example, assume the first and second images are taken side-by-side, with the second image being on the right side of the first image, and both images have a same orientation. If the second determined position of the second identified object is closer to the second image than the first determined position of the first identified object, then the second identified object may not be a duplicate of the first identified object. Conversely, if the second determined position of the second identified object is closer to the first image than the first determined position of the first identified object, then the second identified object may be a duplicate of the first identified object.

In some embodiments, if a determination of whether the second identified object is a duplicate of the first identified object cannot be determined, such as if the distance between the identified objects is between the two thresholds, then a flag may be stored with the first identified object to indicate a possible cluster of multiple objects.

In some other embodiments, pattern or shape matching may also be utilized, alone or in combination with object locations, to determine if the second identified object is a duplicate of the first identified object. For example, in some embodiments a first shape of the first identified object and a second shape of the second identified objects are determined using one or more image recognition techniques. The first shape is rotated or aligned with the second shape based on the orientations of the first and second images. If the aligned shapes first shape resembles (e.g., matching borders) the second shape within a threshold amount, then the second identified object is determined to be a duplicate of the first identified object.

If the second identified object is a duplicate, process 1100s flows to block 1118s where the second object is ignored; otherwise, process 1100s flows to block 1116s where the second object is added to the list of identified objects.

After block 1118s and block 1116s, process 1100s terminates or otherwise returns to a calling process to perform other actions.

Figure 12:
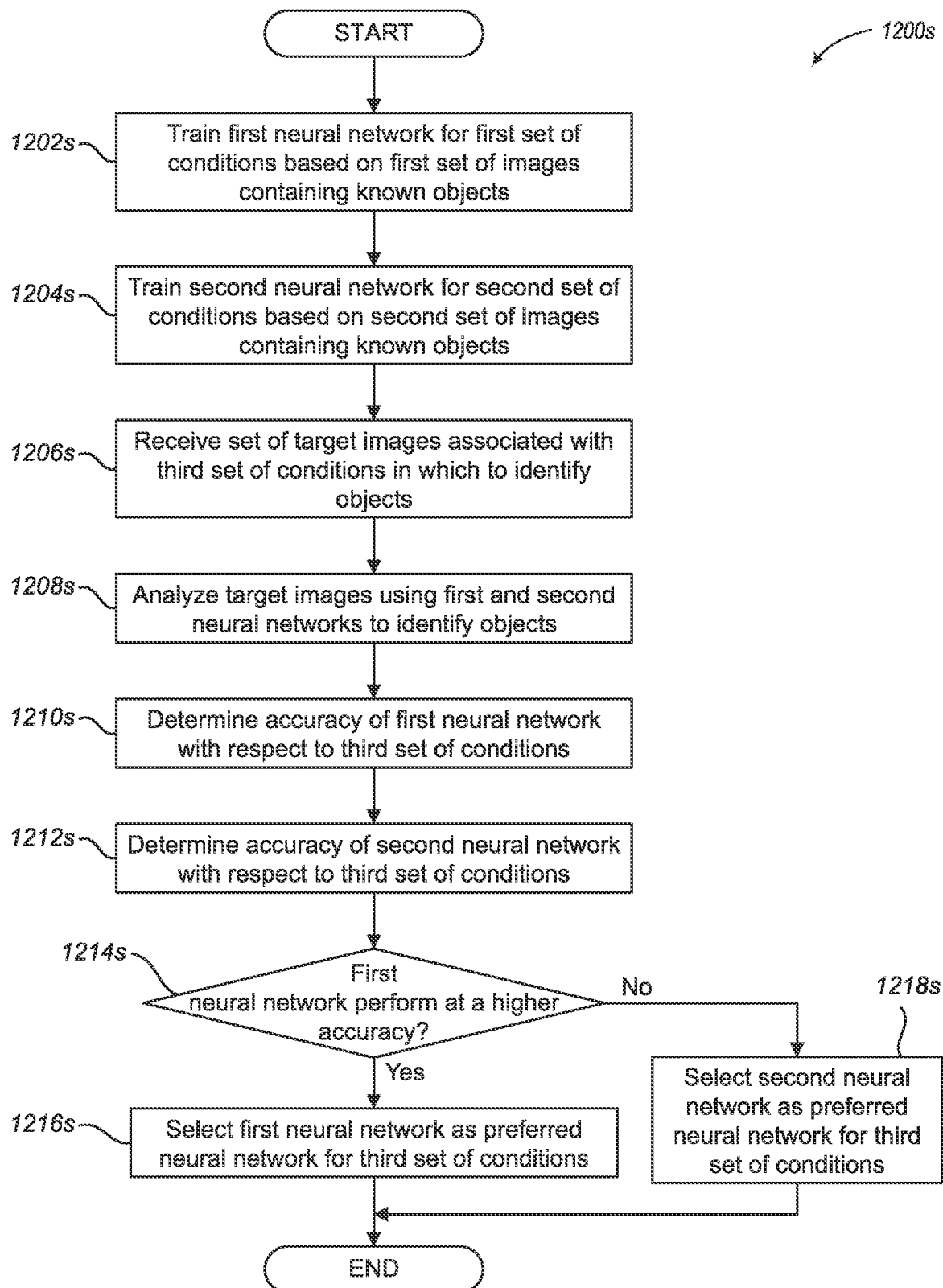
FIG. 12 illustrates a logical flow diagram showing one embodiment of a process for employing multiple artificial neural network to select a preferred neural network in accordance with embodiments described herein.

FIG. 12 illustrates a logical flow diagram showing one embodiment of a process 1200s for employing multiple artificial neural network to select a preferred neural network in accordance with embodiments described herein. Although embodiments are described with respect to employing artificial neural networks, embodiments are not so limited and other computer vision algorithms or technique may be used, as discussed above.

Process 1200s begins, after a start block, at block 1202s, where a first neural network for a first set of conditions is trained based on a first set of images containing known objects.

In various embodiments, the first set of images is selected as each including the first set of conditions and at least one object. The first set of conditions may include one or more conditions. Examples, of such conditions include, but are not limited to, a type of object (e.g., a rock or specific type of rock, a specific type of fruit, a human, etc.), a type of crop, a status of the crop (e.g., not planted, planted but not sprouted, plant clearing the ground by 2 cm, etc.), a time of year, specific weather, an amount of non-cultivated vegetation (e.g., a type or density of weeds, possibility of trees or shrubs, etc.), or other conditions that may alter, change, or effect the ability to identify objects.

In various embodiment, the known object may have been previously identified and marked in the first set of images. For example, humans may be tasked with identifying and marking known objects in the first set of images. Once the known objects are marked, the first set of images are input to a learning process of an artificial neural network, such as a deep neural network or other machine learning algorithm for processing images, resulting in the first neural network.

The resulting trained first neural network may include one or more weights or parameters files or datasets that implicitly represent characteristics of the marked known objects.

Process 1200s proceeds to block 1204s, where a second neural network for a second set of conditions is trained based on a second set of images containing known objects. In various embodiments, block 1204s may employ embodiments of block 1202s to train the second neural network, but with a different set of images for a different set of conditions. The second set of conditions may be a completely different set of conditions from the first set of conditions, or the second set of conditions may include at least one different condition from the first set of conditions (but may share some of the same conditions).

Process 1200s continues at block 1206s, where a set of target images in which to identify objects is received. The target images are associated with a third set of conditions that include at least one condition that is different from the first and second sets of conditions. In some embodiments, the set of target images may be received during a scan of a target geographical area, such as at block 902s in FIG. 9 or at block 910s in FIG. 9. Accordingly, the third set of conditions may be those of the specific target geographical area (or a search zone within the target geographical area) during the scan. In other embodiments, the set of target images may be associated with a desirable set of conditions for a future scan. For example, the first set of conditions may be for a field of wheat that is two inches tall, the second set of conditions may be for a field with no visible crop, and the third set of conditions may be for a field of corn that is one inch tall.

Process 1200s proceeds next to block 1208s, where the target images are analyzed using the first and second neural networks to identify objects. In various embodiments, block 1208s may employ embodiments of block 904s in FIG. 9 to identify objects using the first and second neural networks.

In some embodiments, all target images are first analyzed using the first neural network, and all target images are subsequently re-analyzed using the second set of neural networks. In other embodiments, the target images may be alternatingly analyzed using the first and second neural networks. For example a first image from the target images may be analyzed using the first neural network, a second image from the target images may be analyzed using the second neural network, a third image from the target images may be analyzed using the first neural network, a fourth image from the target images may be analyzed using the second neural network, and so on. Although this example alternates the analysis for every other image, embodiments are not so limited. Rather, the analysis may alternate every n number of images, where n may be selected by an administrator or user.

Process 1200s continues next at block 1210s, where an accuracy of the first neural network with respect to the third set of conditions is determined. In some embodiments, a human may be utilized to check each identified object to determine if each identified object is a correct positive identification. In other embodiments, a human may check every image (or spot check select images) for objects not identified by the first neural network. In yet other embodiments, the accuracy of the first neural network may be based on an average or aggregate confidence factor calculated from a confidence factor assigned to each identified object by the first neural network.

Process 1200s proceeds to block 1212s, where an accuracy of the second neural network with respect to the third set of conditions is determined. In various embodiments, block 1212s may employ embodiments similar to those of block 1210s to determine an accuracy of the second neural network. In some other embodiments, the accuracy of the first and second neural networks may be determined by comparing the objects identified using the first neural network with the objects identified using the second neural network. Differences between the identified objects may then be checked by a human reviewer for accuracy.

Process 1200s continues at decision block 1214s, where a determination is made whether the first neural network performed at a higher accuracy than the second neural network. In some embodiments, the higher accuracy may be the neural network that resulted in the higher number or percentage of correct positive identifications of objects. In other embodiments, the higher accuracy may be the neural network that resulted in the lower number or percentage of false positives or false negatives, or some combination thereof. In yet another embodiment, the higher accuracy may be the neural network that resulted in a highest aggregate confidence factor for the identified objects. If the first neural network performed at a higher accuracy than the second neural network, then process 1200s flows to block 1216s; otherwise, process 1200s flows to block 1218s.

At block 1216s, the first neural network is selected as a preferred neural network for the third set of conditions.

At block 1218s, the second neural network is selected as the preferred neural network for the third set of conditions.

After block 1216s and after block 1218s, process 1200s terminates or otherwise returns to a calling process to perform other actions.

Figure 13:
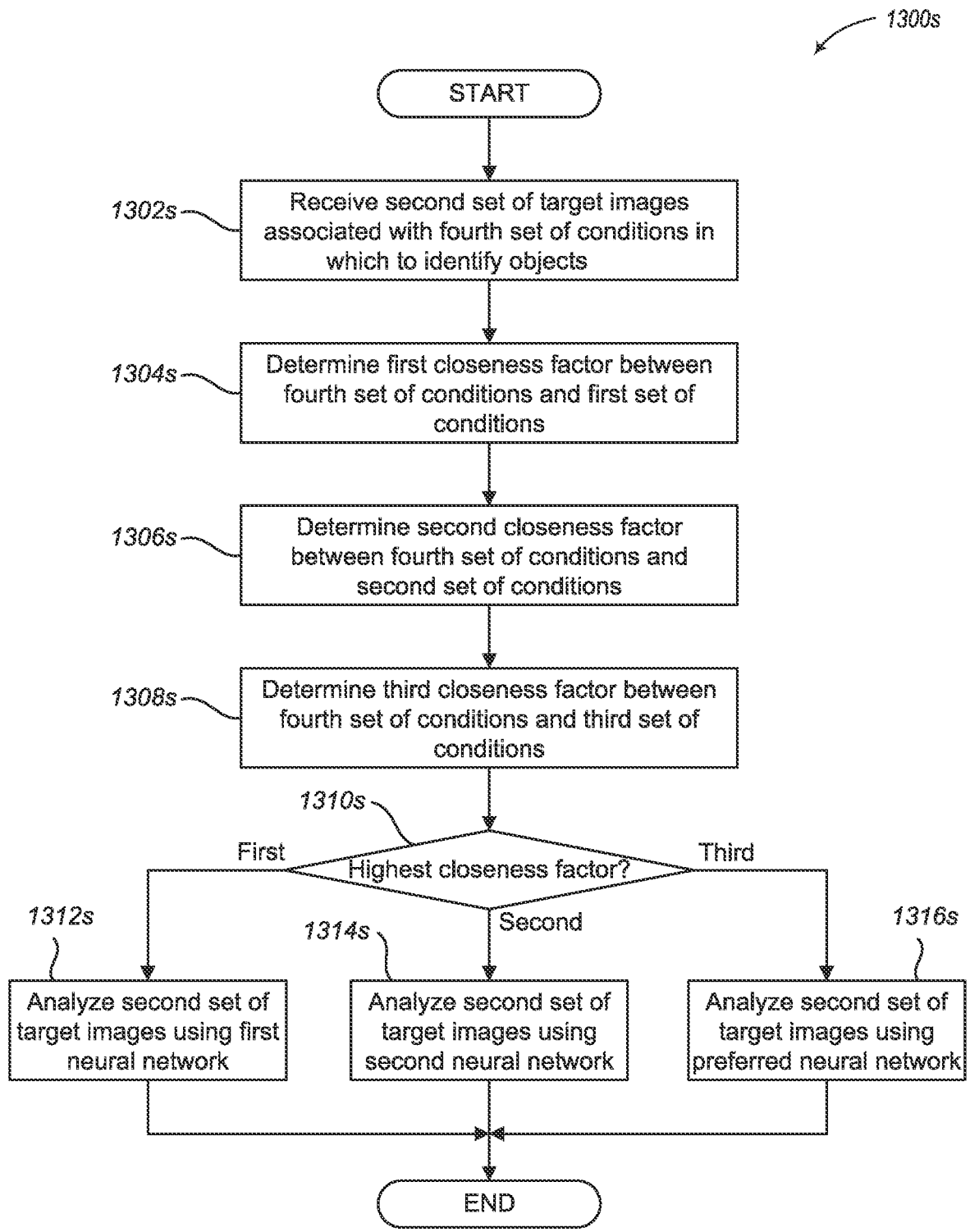
FIG. 13 illustrates a logical flow diagram showing one embodiment of a process for predicting and selecting an artificial neural network to use based on specific conditions of the target geographical area and the expected objects in accordance with embodiments described herein.

FIG. 13 illustrates a logical flow diagram showing one embodiment of a process 1300s for predicting and selecting an artificial neural network to use based on specific conditions of the target geographical area and the expected objects in accordance with embodiments described herein. In some embodiments, process 1300s may be performed subsequent to process 1200s in FIG. 12.

Process 1300s begins, after a start block, at block 1302s, where a second set of target images in which to identify objects is received. The second set of target images are associated with a fourth set of conditions. In various embodiments, block 1302s may employ embodiments similar to block 1206s in FIG. 12 to receive the second set of target images.

Process 1300s proceeds to block 1304s, where a first closeness factor is determined between the fourth set of conditions and the first set of conditions. In some embodiments, the first closeness factor may be a number (or percentage) of conditions that are the same or shared between the first and fourth sets of conditions. In other embodiments, one or more conditions may have an assigned weight based on how much the corresponding condition effects the results of the neural network analysis. For example, the height of the crop may have more of an impact than the weather. In this example, the crop height condition may have a higher weight compared to the weather condition. Accordingly, the closeness factor may be determined based on the number or percentage of similar conditions but modified based on the assigned weights.

Process 1300s continues at block 1306s, where a second closeness factor is determined between the fourth set of conditions and the second set of conditions. In various embodiments, block 1306s may employ embodiments similar to block 1304s to determine the closeness factor between the fourth and second sets of conditions. Process 1300s proceeds next to block 1308s, where a third closeness factor is determined between the fourth set of conditions and the third set of conditions. In various embodiments, block 1308s may employ embodiments similar to block 1304s to determine the closeness factor between the fourth and third sets of conditions.

Process 1300s continues next at decision block 1310s, where a determination is made whether the first, second, or third closeness factors is the highest. In various embodiments, the first, second, and third closeness factors may be compared to determine the highest closeness factor. If the fourth set of conditions matches one of the first, second, or third sets of conditions, then the correspondingly matched set of conditions has a highest closeness factor. If the first closeness factor is highest, then process 1300s flows to block 1312s where the second set of target images are analyzed using the first neural network. If the second closeness factor is highest, then process 1300s flows to block 1314s where the second set of target images are analyzed using the second neural network. And if the third closeness factor is highest, then process 1300s flows to block 1316s where the second set of target images are analyzed using the preferred neural network selected in FIG. 12.

After blocks 1312s, 1314s, and 1316s, process 1300s terminates or otherwise returns to a calling process to perform other actions.

Figure 14:
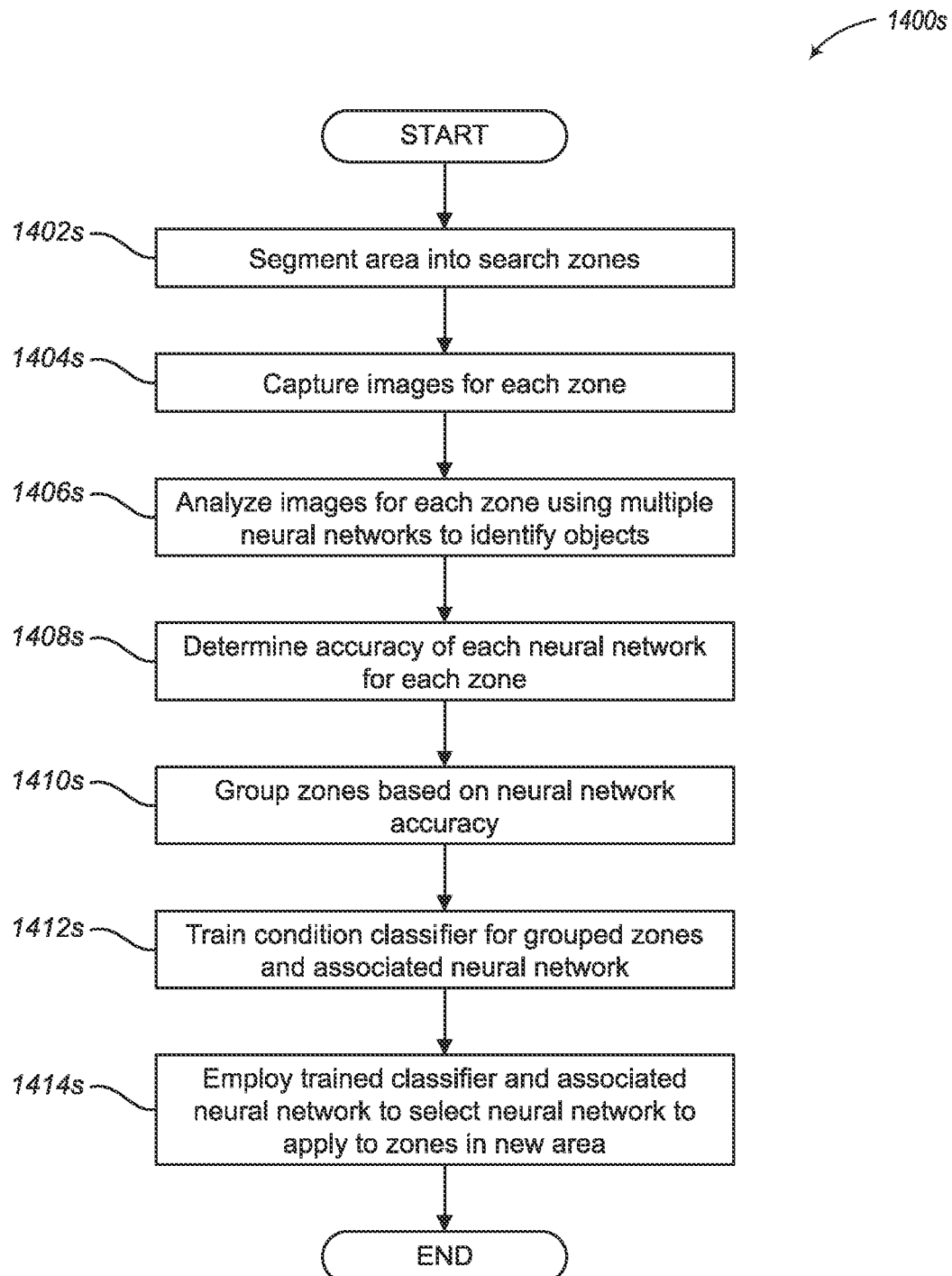
FIG. 14 illustrates a logical flow diagram showing one embodiment of a process for selecting an artificial neural network to employ on zones of a target geographical area to identify objects in accordance with embodiments described herein.

FIG. 14 illustrates a logical flow diagram showing one embodiment of a process 1400s for selecting an artificial neural network to employ on zones of a target geographical area to identify objects in accordance with embodiments described herein. Process 1400s begins, after a start block, at block 1402s, where a target geographical area is segmented into a plurality of search zones. In some embodiments, the search zones may be a user selected or predetermined size. In other embodiments, the search zones may be based on an even distribution of the target geographical area.

Process 1400s proceeds to block 1404s, where images for each search zone are captured. In various embodiments, block 1404s may employ embodiments similar to block 902s of FIG. 9 to capture images of the target geographical area with the images grouped based on their associated zone.

Process 1400s continues at block 1406s, where images for each search zone are analyzed using multiple neural networks to identify objects. In various embodiments, block 1406s may employ embodiments similar to block 1208s in FIG. 12 to analyze the captured images using multiple neural networks. In some embodiments, the images for each search zone may be further divided into sub zones that are analyzed using the plurality of neural networks.

Process 1400s proceeds next to block 1408s, where an accuracy for each neural network is determined for each zone (or sub zone). In various embodiments, block 1408s may employ embodiments similar to block 1210s to determine an accuracy of each neural network, but with the accuracy of each neural network being separately determined for each search zone. Accordingly, each corresponding search zone includes a separate accuracy for each of the plurality of neural networks.

Process 1400s continues next at block 1410s, where the search zones are grouped based on the neural network accuracy. In various embodiments, a highest accuracy neural network for each search zone is selected for that corresponding zone. The search zones that share the same highest accuracy neural network are grouped together for that associated neural network. In other embodiments, for each neural network, a select number of highest accuracy search zones for that associated neural network are selected. In this way, the search zones are grouped based on the neural network that identified objects the best.

Process 1400s proceeds to block 1412s, where a condition classifier is trained for each group of search zones and the associated neural network. Accordingly, the conditions for each group of search zones are determined and the best neural network for those conditions is determined.

Process 1400s continues at block 1414s, where the trained condition classifier and associated neural network are employed to select a neural network to apply to zones in a new target geographical area. In various embodiments, the new target geographical area is segmented into search zones. The trained condition classifier is then employed for each corresponding search zone to identify the conditions of the corresponding search zone. The neural network associated with the identified conditions is then utilized to identify objects in that corresponding search zone, as described herein.

The use of search zones enables the system to detect changes in the conditions across a target geographical area and modify which neural network is being utilized to identify objects as the conditions change.

Figure 15:
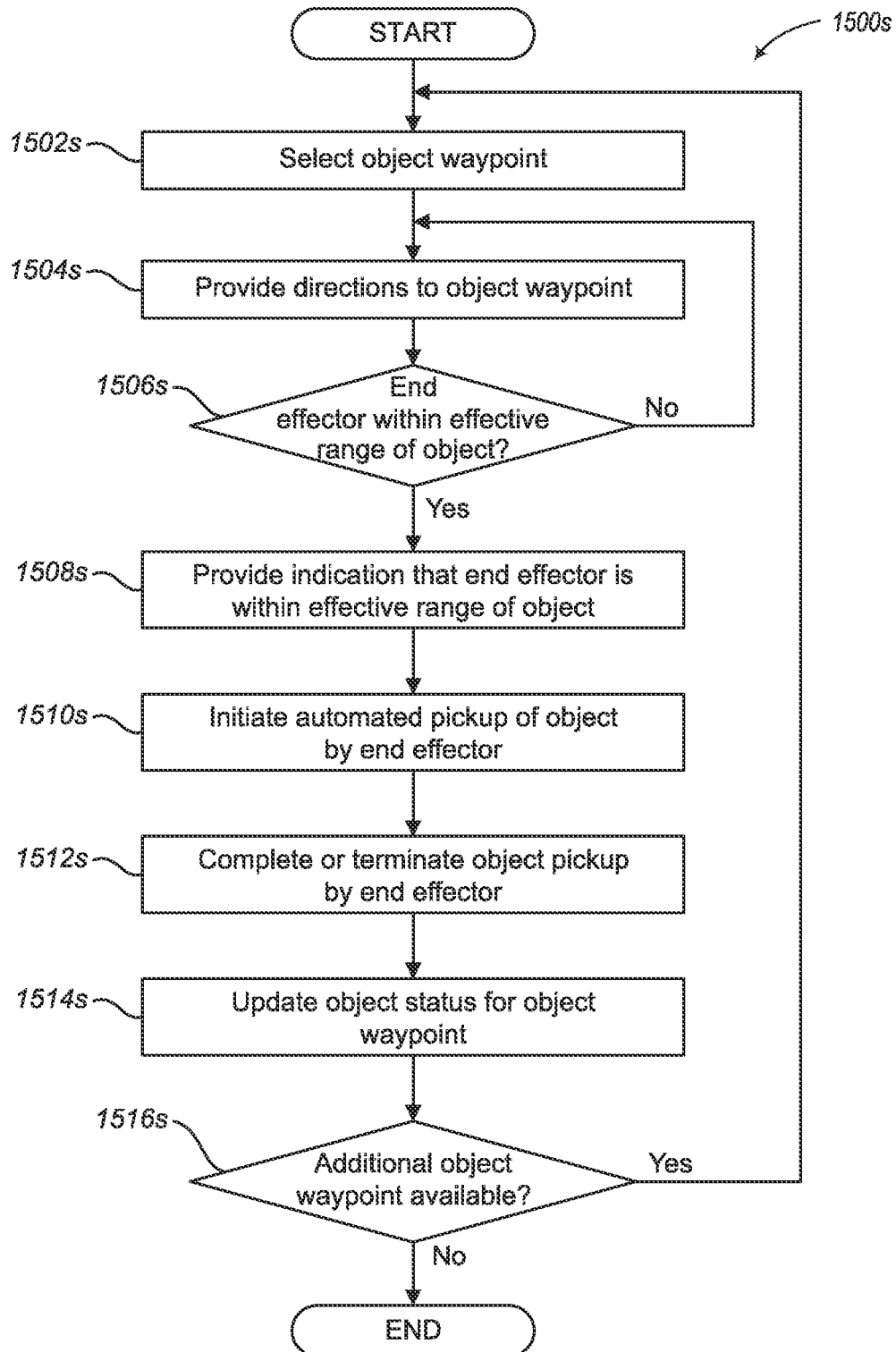
FIG. 15 illustrates a logical flow diagram showing one embodiment of a process for guiding an object object-collection system to pick up previously identified objects in a target geographical area in accordance with embodiments described herein.

FIG. 15 illustrates a logical flow diagram showing one embodiment of a process 1500s for guiding an object object-collection system to pick up previously identified objects in a target geographical area in accordance with embodiments described herein. Process 1500s begins, after a start block, at block 1502s, where an object waypoint is selected. For example, as discussed herein, a mapping or scanned images of a field or target geographical area can be analyzed to identify objects and determine their location. As discussed herein, an object-picking waypoint can be selected based at least in part on the location of one or more of the objects identified in the target geographical area. In various embodiments, the selected waypoint may be selected from a pick-up path that is determined as a preferred or optimal pack for collecting identified objects in the target geographical area. In some embodiments, the pick-up path may be updated or modified as the object-collection system is picking up objects based on a number of new objects identified by a user or previously identified objects being de-selected by the user, a number or percentage of successful collections of objects, etc.

Process 1500s proceeds at block 1504s, where directions to the object waypoint are provided. For example, in an embodiment where a user drives the object-collection system (e.g., object-collection system 606 in FIG. 6A), the user can be presented with directions for driving or guiding the object-collection system to the selected waypoint. In at least one embodiment, a current location of the object-collection system may be determined, such as via GPS coordinates of the object-collection system. The directions for driving the object-collection system may then be determined from the current location to the object waypoint.

In various embodiments, the directions may be provided to the user via a mobile user device, such as mobile user computer device 620 in FIG. 6A. The directions may be visual, audible, or tactile. For example, in some embodiments, directions or an indication of which direction the object-collection system is to move toward an object may be displayed to the user. This display may include a map of the target geographical area, including the location of the object-collection system or object picking assembly, or both, relative to the identified objects or selected waypoint, such as illustrated in FIG. 5.

Although some examples relate to a human user driving object-collection system to one or more object waypoints along a pick-up path, some examples can include an automated system or vehicle that automatically travels to one or more object waypoints based on the current location of the object-collection system and the next pick-up waypoint. In some examples, providing directions to the object waypoint may include providing automatic travel instructions to a motor-control system that autonomously controls the object-collection system to the location of the next target object.

Process 1500s continues at decision block 1506s, where a determination is made whether the end effector or object-collector assembly is within effective range of a target object. In various embodiments, determining whether the end effector is within an effective range of one or more objects at the selected object waypoint can be based on data from one or more camera, such as sensor array 624 in FIG. 6A. For example, one or more of GPS data, visual data from a camera, distance data from one or more sensors, direction data from a compass, and the like can be used to determine whether the end effector is within an effective range of one or more objects at the selected object waypoint.

In one example, location data and direction data (e.g., GPS and compass data) can be used to determine that the end effector is within an effective range of one or more objects at the selected object waypoint and that the end effector is at an operative orientation relative to the one or more objects at the waypoint such that the end effector can engage and pick up the one or more objects. In other words, with a range of motion, robotic kinematics and/or degrees of freedom of an object picking assembly being known, a determination of whether the object picking assembly is within an effective range of an object at the selected object waypoint can be determined based on a presumed, known or determined location of the object relative to the object picking assembly.

In some embodiments, a visual system (e.g., a camera) or range finding system can identify the position of an object relative to object picking assembly. For example, in various embodiments, a plurality of images are captured from one or more cameras or sensors on the object-collection system, similar to block 910s in FIG. 9. These images may be captured in a direction of movement of the object-collection system along the pick-up path or toward the selected waypoint, or towards a direction of collection by the object picking assembly, such as described above in conjunction with FIGS. 4A-4D.

One or more target objects may be identified in the plurality of images based on a dataset of known-object features, similar to what is described above in conjunction with block 912s in FIG. 9. The movement of the target objects may be tracked through the plurality of images. The distance, and approach speed, of the target object away from the object picking assembly based on the tracked movement. In some embodiments, the approach speed of the object-collection system towards the target object may be determined based on a tracked movement speed of feature characteristics in a plurality of image tracking portions, similar to what is shown and described in conjunction with FIGS. 4A-4D.

If the end effector is within effective range of a target object, then process 1500s flows to block 1508s; otherwise process 1500s loops to block 1504s to continue to the object waypoint.

At block 1508s, an indication that the end effector is within effective range of the target object is provided. In some embodiments, this indication may be a visual or audible indicator to a user via a graphical user interface. In various embodiments, block 1508s may be optional and may not be performed.

Process 1500s proceeds next to block 1510s, where automated pick up of the target object by the end effector is initiated. In various embodiments, automated pick up of an object can be initiated by a user or automatically by a computing system, and a control device can use feedback data from the object picking assembly, the sensor array and/or position data (e.g., associated with the object or portions of the object picking assembly) to drive the object picking assembly to attempt to pick up the object.

Process 1500s continues next at block 1512s, where object pick up by the end effector is completed or terminated. Completion or termination of picking up the object may be completed or terminated based on whether the object can be successfully removed from the target geographical area to an object-holding unit of the object-collection system (e.g., the cavity of a bucket). For example, in some embodiments, the attempt to pick up the object can be unsuccessful or terminate where the object is unable to be moved from the position on the target geographical area to the object-holding unit of the object-picking system. Examples of scenarios where object pick up is terminated may include the object picking assembly inappropriately engaging the object; the object is too heavy to be lifted by the object picking assembly; the object is of a shape and/or size such that the object picking assembly cannot appropriately engage the object; the object-collection system cannot locate the object such that the object picking assembly is unable to engage the object; the object picking assembly experiences an error; aborted by a user; and the like.

Process 1500s proceeds to block 1514s, where object status for the object waypoint is updated. In some embodiments, where the object waypoint is not the determined location of an object, but rather a travel waypoint, the object status for of an object may be updated based on a match between the GPS location of the object-collection system and a previously identified object.

An object status for the object that was the being picked up can be updated in various suitable ways. For example, where the pick up of the object is determined to be successful, the status of the object can be changed to "picked up" and the subject object can be removed from the graphical user interface display or representation of the target geographical area to indicate a successful pick up of the object.

Where the pick up of the object is not successful, the status of the object can be changed to "unsuccessful pick up," "pick-up error," "not possible to pick up," "not an object," "too heavy," "incompatible shape," "eligible for new pick-up attempt," "ineligible for new pick-up attempt," "user inspection required," "object position changed," and the like. For example, where data from the attempt to pick up the subject object indicates that the object may be substantially larger or heavier than initially projected (e.g., a large buried object with a small portion exposed on the surface of the ground), that status of the object can be updated to indicate that the object cannot be picked up due to being too large or unmovable, and the object can be indicated as ineligible for another pick-up attempt. In another example, where an attempt to pick up the object indicates that the object is not an object (e.g., it is a dirt clod, stump, or the like), the status of the object can be updated accordingly.

Process 1500s continues at decision block 1516s, where a determination is made whether an additional object waypoint is available. In various embodiments, as described herein, a pick-up path may include a plurality of object waypoints. If another object waypoint is available, process 1500s loops to block 1502s to select another object waypoint; otherwise, process 1500s terminates or otherwise returns to a calling process to perform other actions.

Figure 16A:
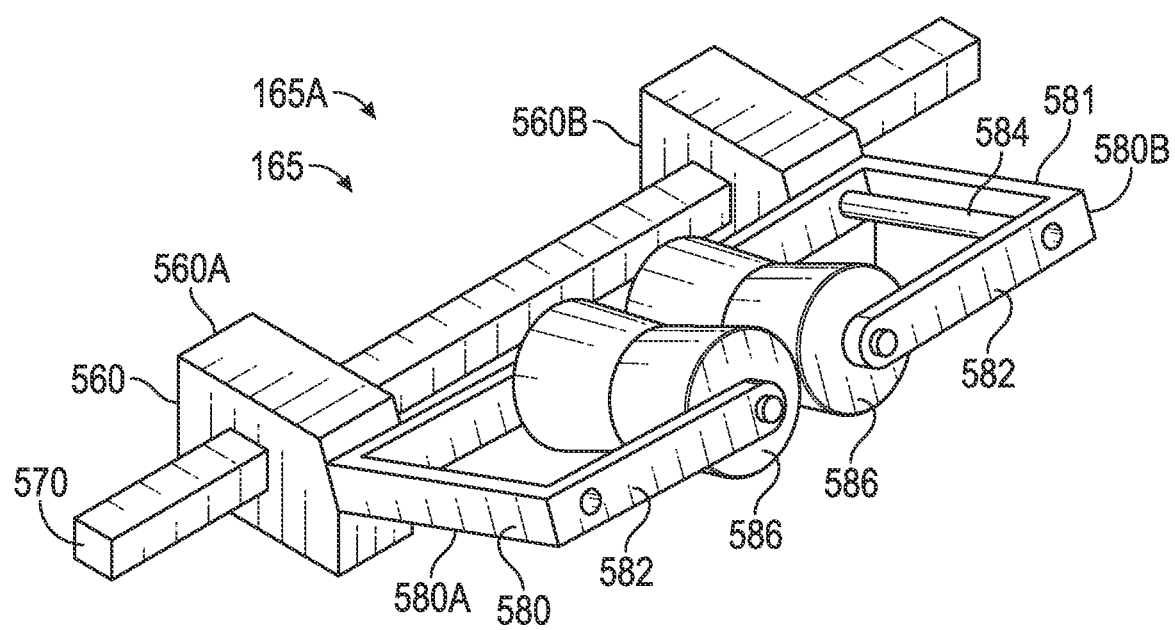
FIG. 16A illustrates a perspective view of an object picking assembly that includes a pair of travelers that move along a rail, with each traveler respectively associated with a head assembly.
Figure 16C:
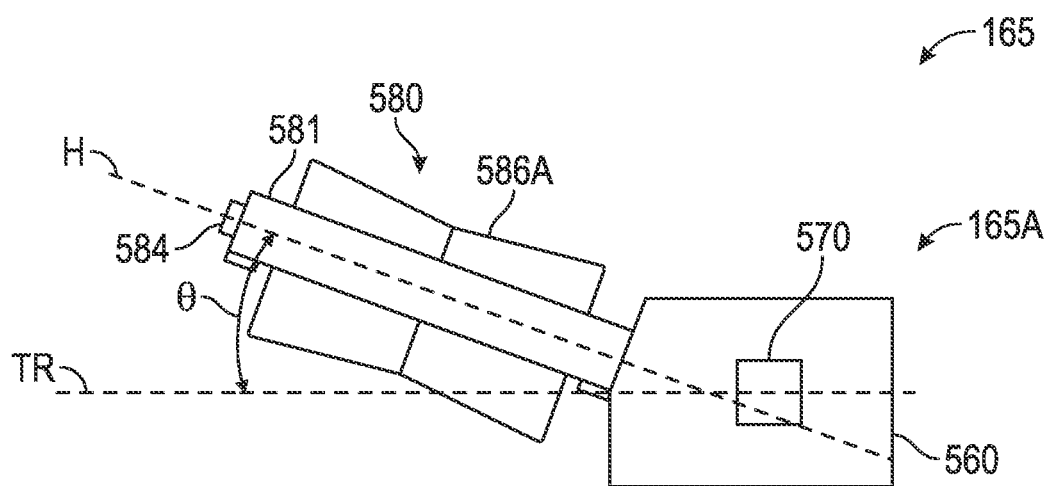
FIG. 16C illustrates a side view of an object picking assembly that includes a pair of travelers that move along a rail, with each traveler respectively associated with a head assembly.

Turning now to FIGS. 16A-16C, which illustrate various example embodiments of object picking assembly 165. Object picking assembly 165 can have various suitable forms and may be an embodiment of object picking assembly 365 in FIG. 3A. For example, FIGS. 16A, 16B and 16C illustrate one example embodiment 165A of an object picking assembly 165 that comprises a pair of travelers 560 that move along a rail 570, with each traveler 560 respectively associated with a head assembly 580. More specifically, a first traveler 560A is coupled with a first head assembly 580A and a second traveler 560B is coupled with a second head assembly 580B. In various embodiments, the movement of the travelers 560 along the rail 570 can be actuated in various suitable ways including via electric motors, and the like.

The head assemblies 580 comprise a web 581 with a pair of arms 582 extending from the web 581. In this example, an internal arm 582I and external arm 582E are shown extending from the web 581. An axel 584 extends from the traveler 560 with the arms 582 and web 581 rotatably coupled to the axel 584. A roller 586 is rotatably disposed between distal ends of the arms 582 opposing the web 581 and axel 584. In various embodiments, the rotation of the heads 580 and rotation of the rollers 586 can be actuated in various suitable ways including via electric motors, and the like.

In various embodiments, the head assemblies 580 can be disposed at an angle relative to an axis of the travelers 560 and rail 570. For example, as shown in FIG. 16C, an axis H of the heads 580 can be at an angle θ relative to an axis TR of the travelers 560 and rail 570. However, in further examples, the angle of the heads 580 relative to the travelers 560 and rail 570 can be any suitable angle.

Figure 17A:
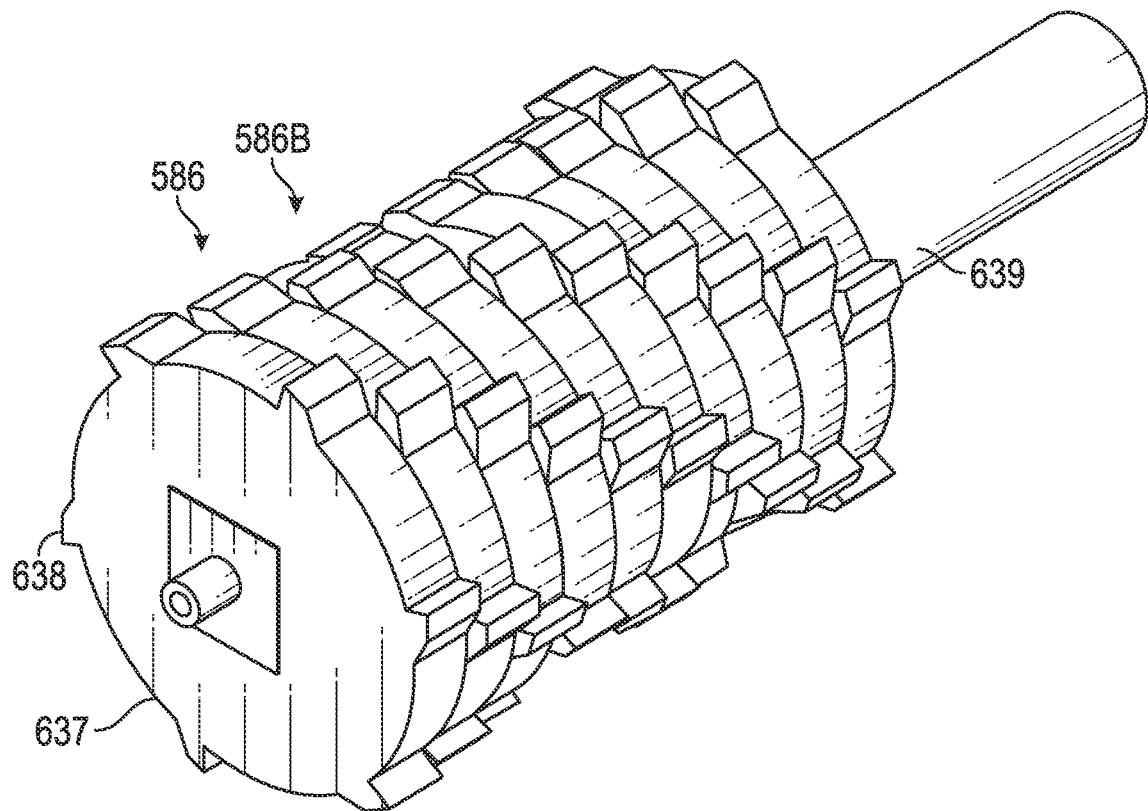
FIG. 17A illustrates a perspective view of rollers that are generally cylindrical with a taper from the edges of the rollers toward a central portion of the rollers.

The rollers 586 can have various suitable configurations. For example, as shown in FIGS. 16A-16C, in one embodiment 586A, the rollers 586 can be generally cylindrical with a taper from the edges of the rollers 586 toward a central portion of the rollers 586. In another embodiment 586B as shown in FIGS. 17A-17C and 18A-18C, the rollers 586 can comprise a plurality plates 637 having teeth 638 about edges of the plates 637, with the plates 637 being disposed on a shaft 639. As shown in FIG. 17A, the rollers 586 can taper from the edges of the rollers 586 toward a central portion of the rollers 586 with the teeth 638 being offset between plates 638 to generate a spiral configuration of the teeth 638 about the face of the rollers 586.

Turning to FIGS. 17B, 17C, 18A, 18B, and 18C, an example method of picking up an object 120 disposed in a field 110 via a second embodiment 165B of an object picking assembly 165 is illustrated. As shown in FIGS. 17B, 17C, 18A, 18B and 18C, the second embodiment 165B of the object picking assembly 165 can comprise a first and second head assembly 580A, 580B disposed on a rail 570, which can be associated with an object-collection system 618 (see e.g., FIG. 6A).

The head assemblies 580 can comprise at least one arm 582 extending from an axel 584 that is configured to rotate the one or more arms 582. A roller 586 can be rotatably disposed at a distal end of the arm 582 opposing the axel 584. In various embodiments, the rotation of the head assemblies 580 and rotation of the rollers 586 can be actuated in various suitable ways including via electric motors, and the like.

Figure 17B:
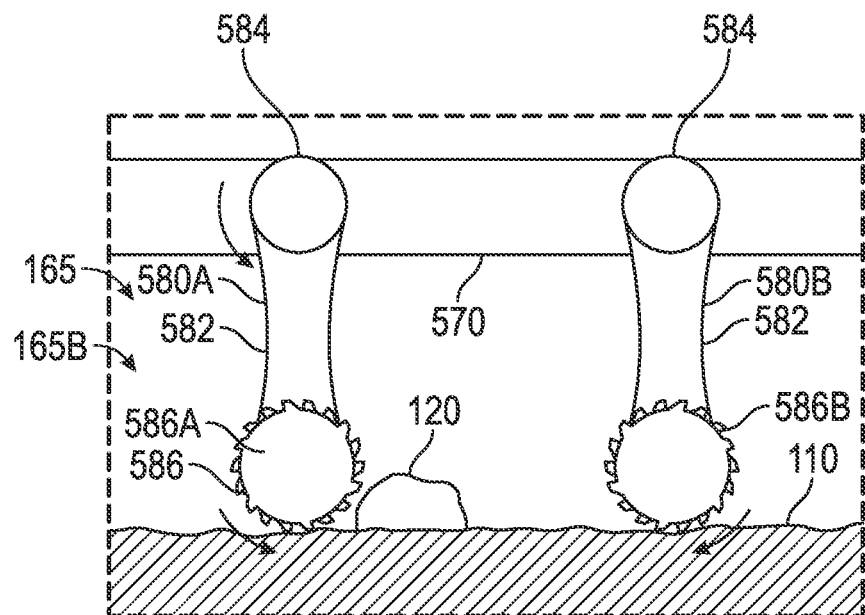
FIG. 17B illustrates another embodiment of the object picking assembly positioned over an object such that the object is between the head assemblies which have the respective arms and rollers.
Figure 17C:
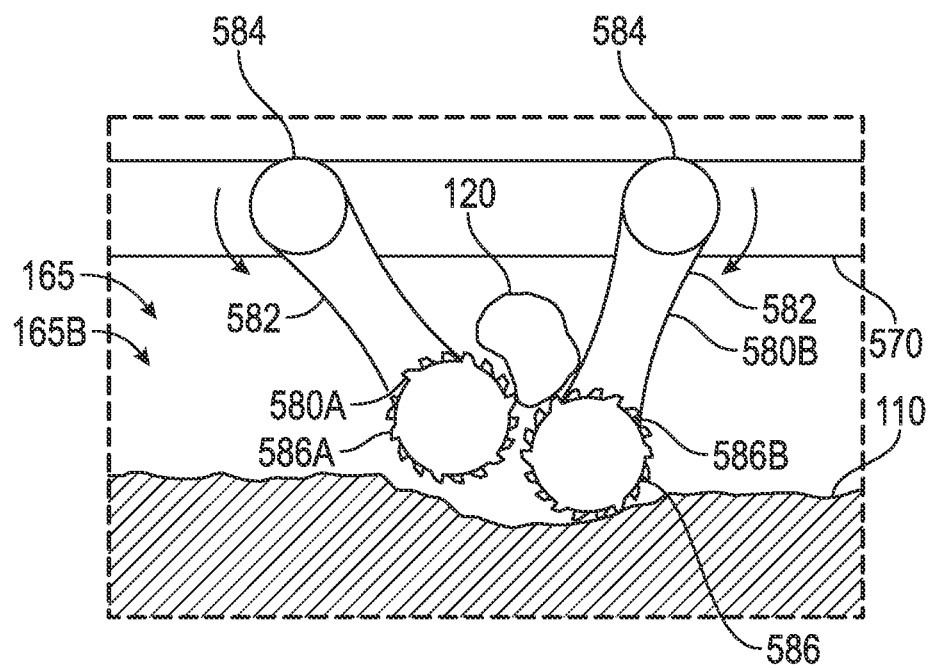
FIG. 17C illustrates the embodiment of FIG. 17B, wherein the head assemblies are rotated inward toward the object, such that the rollers engage the object and lift the object from the field and between the arms.
Figure 18A:
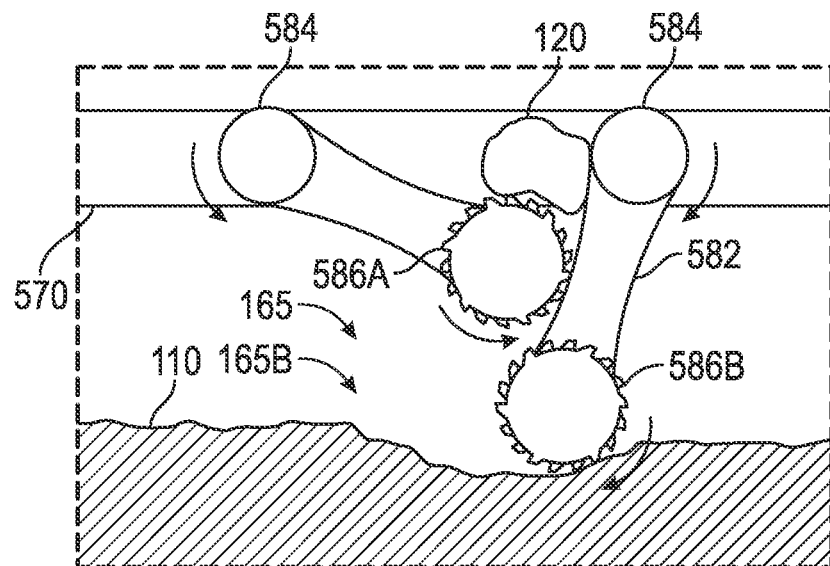
FIG. 18A illustrates the embodiment of FIG. 17B, wherein the rollers continue engaging the object and lifting the object between the arms.
Figure 18B:
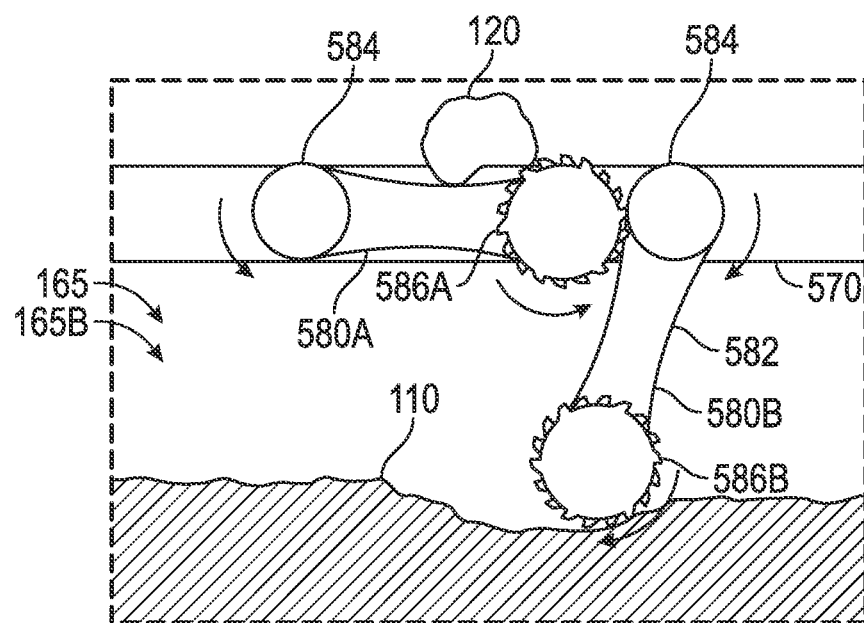
FIG. 18B illustrates the embodiment of FIG. 17B, wherein the rollers continue engaging the object and lifting the object between the arms and into the bucket.
Figure 18C:
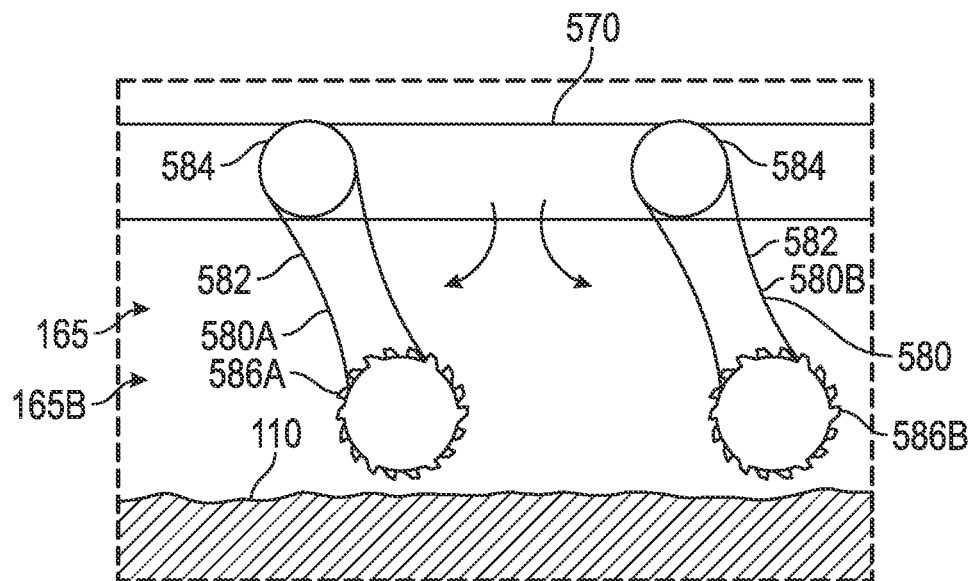
FIG. 18C illustrates the embodiment of FIG. 17B, wherein the rollers finish depositing the object into the bucket and return to their initial positions.

Turning to FIG. 17B, an object 120 can be disposed in a field 110 and the object picking assembly 165 can be positioned about the object 120 such that the object 120 is between the head assemblies 580, including between the respective arms 582 and rollers 586. As shown in FIG. 17B, the rollers 586 can be spun inward (i.e., the first roller 586A is spun counter-clockwise and the second roller 586B is spun clockwise). The head assemblies 580 can be rotated inward toward the object 120, such that the rollers 586 engage the object 120 and lift the object 120 from the field 110 and between the arms 582 as shown in FIG. 17C. As illustrated in FIGS. 17C, 18A and 18B, in some examples, the second head assembly 580B can remain in generally the same position as the first head assembly 580A is rotated upward to move the object 120 upward toward the axles 584. The object can then be deposited in a container (e.g., into a bucket 160 or other suitable container). The head assemblies 580 can then be rotated down as shown in FIG. 18C to put the head assemblies 580 in position to engage another object 120.

Various embodiments of an object picking assembly 165 can operate as the example embodiment 165B shown in FIGS. 17B, 17C and 18A-18C. For example, the embodiment 165A shown in FIGS. 16A-16C can operate to pick up objects 120 in a similar manner. Accordingly, in various embodiments, picking up objects 120 can comprise moving head assemblies 580 away from each other and/or toward each other via travelers 560 or other suitable structures.

FIGS. 19A, 19B, 19C, 20A and 20B illustrate another example embodiment 165C of an object picking assembly 165 that comprises a pair of travelers 810 that move along a rail 820, with each traveler 810 respectively coupled with a paddle assembly 830 via an arm 831. More specifically, a first traveler 810A is coupled with a first paddle assembly 830A and a second traveler 810B is coupled with a second paddle assembly 830B. In various embodiments, the movement of the travelers 810 along the rail 820 can be actuated in various suitable ways including via electric motors, and the like. As shown in this example embodiment 165C, the rail 820 can be coupled to a bucket 160 below a front edge 162 of the bucket 160 and the paddle assemblies 830 can be configured to pick up objects 120 and deposit the objects 120 into a cavity 161 of the bucket 160.

The arms 831 can be coupled to a respective paddle 832, with the arms configured to move the paddles 832 in various suitable ways, including rotation, tilting, and the like. The paddles 832 can comprise a belt 836 that is rotatably disposed about an external edge of the paddles 832 with the belts 836 being configured to rotate clockwise and/or counter-clockwise about the paddles 832. In various embodiments, the rotation of the belts 836, movement of the arms 831 and/or movement of the travelers 810 can be actuated in various suitable ways including via electric motors, a pneumatic system, a hydraulic system, or the like.

The paddle assemblies 830 can be disposed relative to each other to define a cavity 850, with the size and shape of the cavity 850 configured to be changed by moving the paddles 832 relative to each other. For example, the travelers 810 can move the paddle assemblies 830 to widen and/or narrow the cavity 850 (see e.g., FIGS. 19B and 19C). Additionally, while FIG. 19A illustrates the paddles 832 defining cavity 850 having a generally consistent width along a length of the cavity 830, in various embodiments, the paddles 832 can be rotated to define a cavity 850 that is narrower at a bottom end of the cavity 850 and/or narrower at a top end of the cavity 850.

Figure 19A:
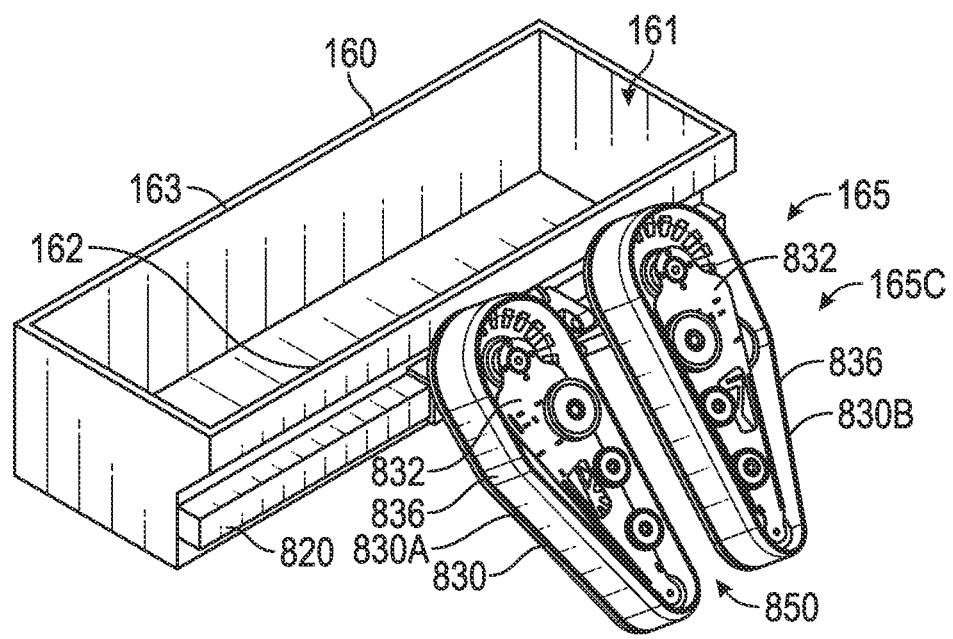
FIG. 19A illustrates a perspective view of another embodiment of the object picking assembly that includes a pair of travelers that move along a rail, with each traveler respectively coupled with a paddle assembly via an arm.
Figure 19B:
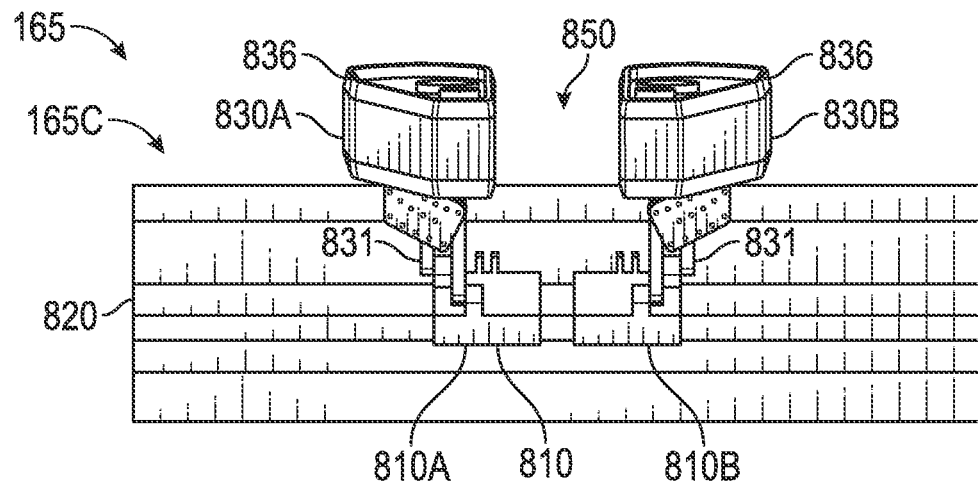
FIG. 19B illustrates an end view of another embodiment of the object picking assembly that includes a pair of travelers that move along a rail, with each traveler respectively coupled with a paddle assembly via an arm, wherein the travelers move the paddle assemblies to narrow the cavity.
Figure 19C:
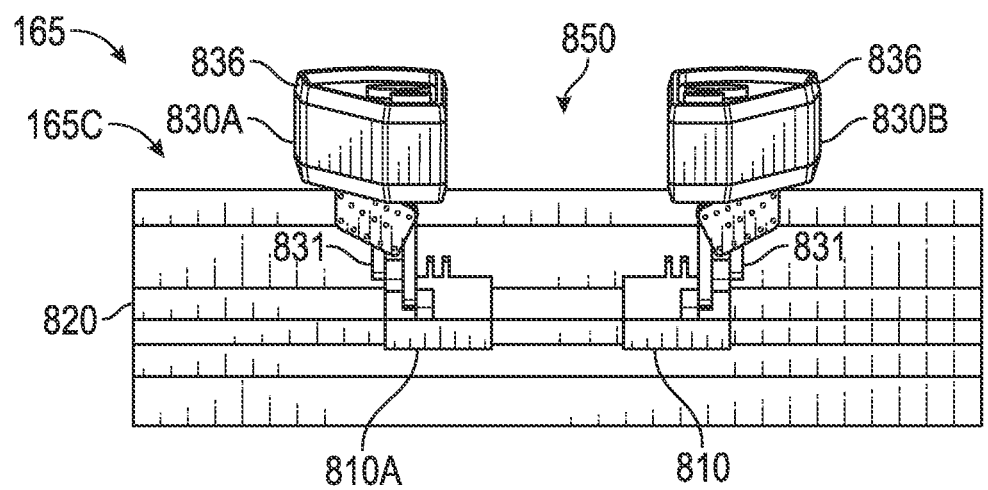
FIG. 19C illustrates an end view of another embodiment of the object picking assembly that includes a pair of travelers that move along a rail, with each traveler respectively coupled with a paddle assembly via an arm, wherein the travelers move the paddle assemblies to widen the cavity.
Figure 20A:
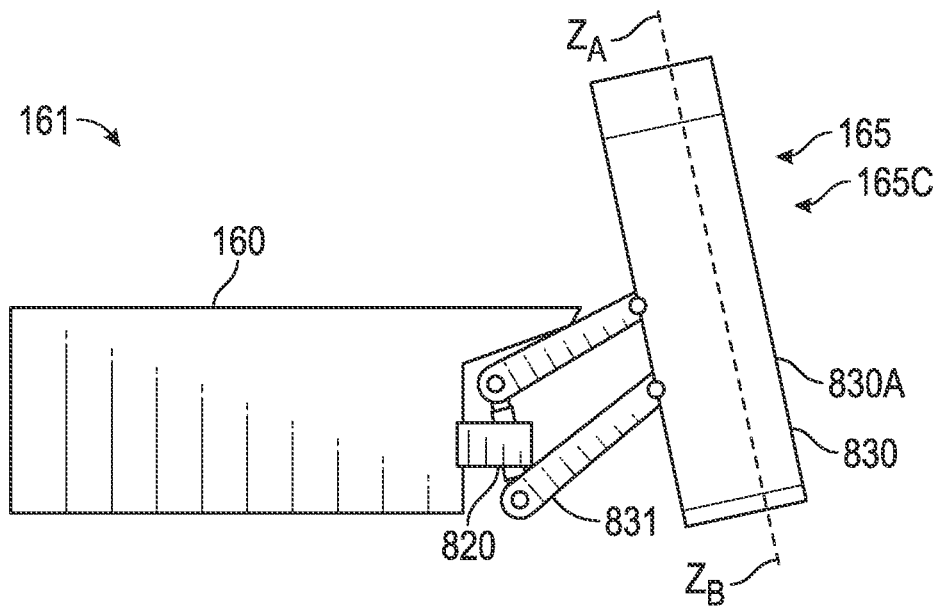
FIG. 20A illustrates a side view of another embodiment of the object picking assembly that includes paddle assemblies coupled to a bucket via a rail coupled to a front end of the bucket, and two or more paddle assemblies coupled to a bucket in a more upright orientation.
Figure 20B:
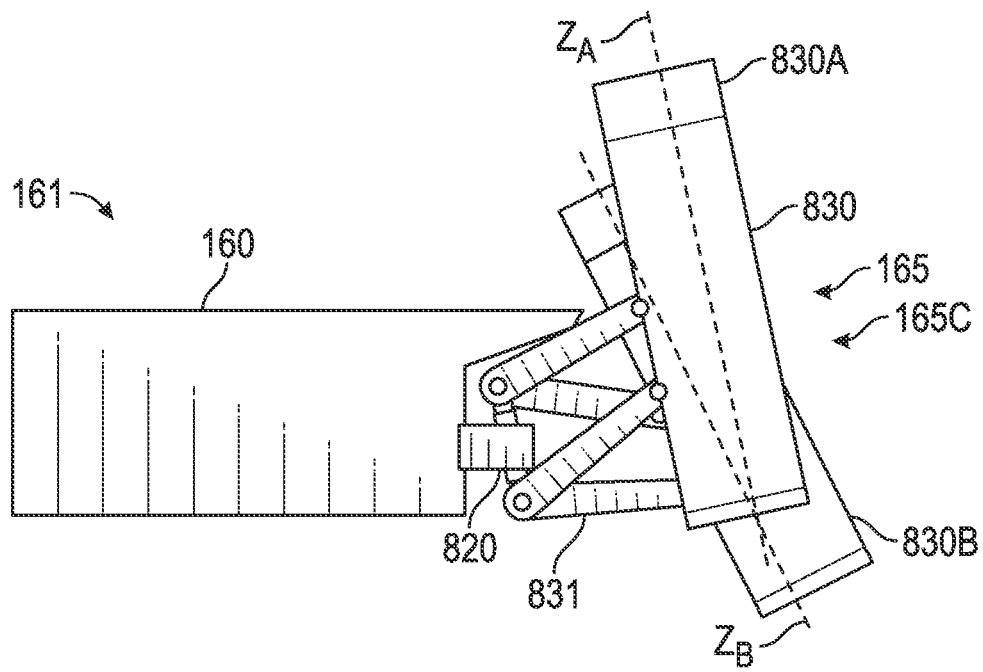
FIG. 20B illustrates a side view of another embodiment of the object picking assembly that includes paddle assemblies coupled to a bucket via a rail coupled to a front end of the bucket, and two or more paddle assemblies coupled to a bucket in a more reclined orientation.

Also, while FIGS. 19A, 19B and 19C illustrate the paddles 832 disposed in a common plane, in various embodiments, the paddles 832 can be actuated (e.g., via the arms 831) to be disposed in different planes. For example, FIG. 20A illustrates a first and second paddle assembly 830A, 830B disposed in a common place where axis $Z_A$ of the first paddle assembly 830A is disposed in the same plane as axis $Z_B$ of the second paddle assembly 830B. In contrast, FIG. 20B illustrates the first and second paddle assembly 830A, 830B disposed in different plane where axis $Z_A$ of the first paddle assembly 830A is disposed in a different plane as axis $Z_B$ of the second paddle assembly 830B.

In various embodiments, the paddle assemblies 830 can be used to pick up objects 120 by positioning an object within the cavity 850 between the paddles 832 such that the rotating belts 836 engage the object 120 and pull the object 120 from a base end of the cavity 850 to a top end of the cavity 850 such that the object 120 can be deposited in the cavity 161 of the bucket 160. The size and shape of the cavity 850 can be configured to accommodate different sizes of objects 120 and to facilitate picking up the objects 120 and depositing the objects 120 into the bucket 160.

Figure 21A:
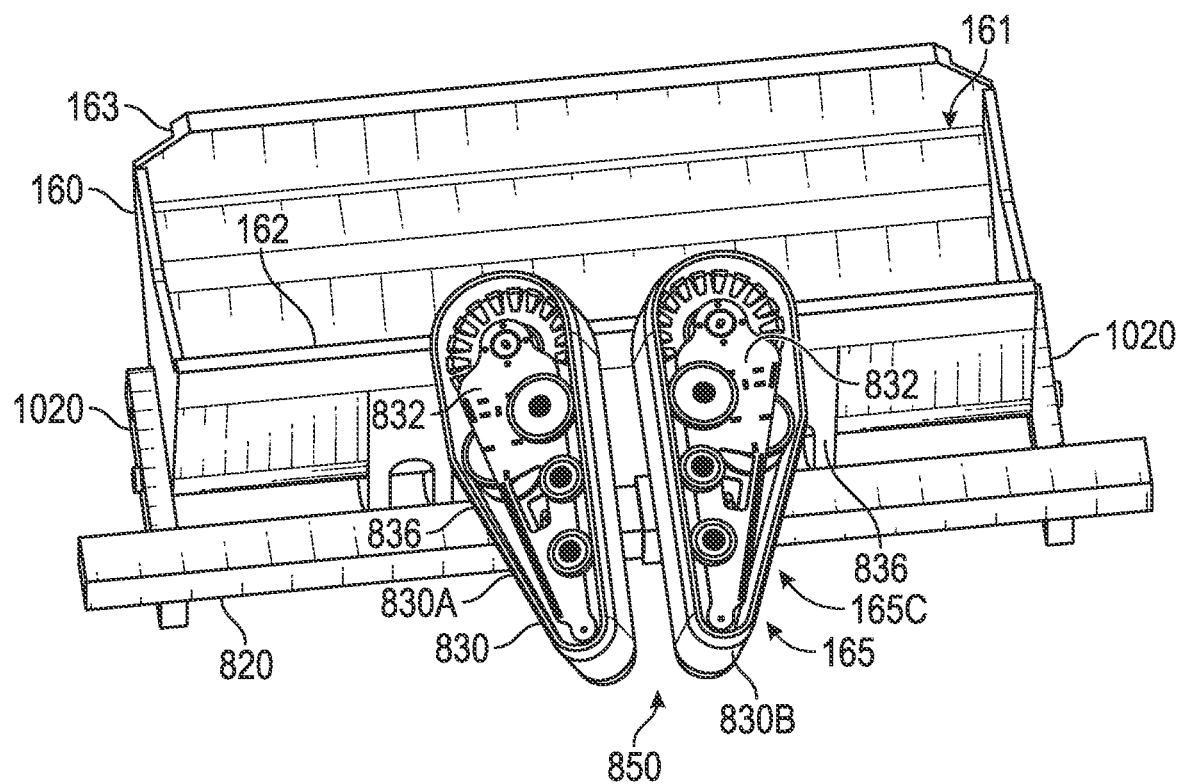
FIG. 21A illustrates a perspective view of another embodiment of the object picking assembly that includes paddle assemblies coupled to a rail, with the rail being offset from and coupled to the bucket via bars coupled to sidewalls of the bucket.
Figure 21B:
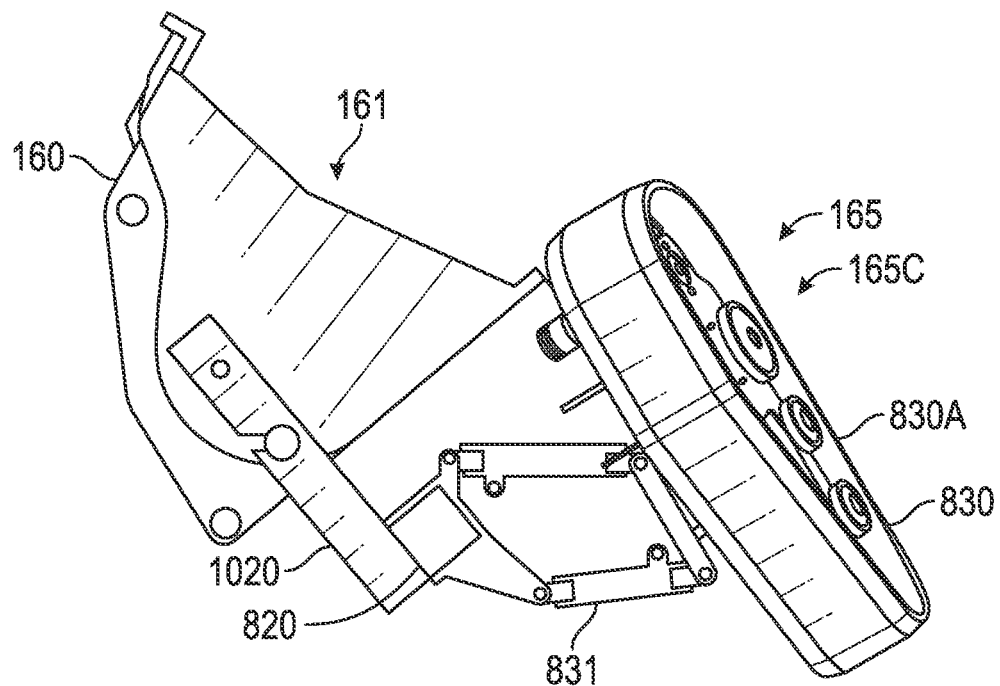
FIG. 21B illustrates a side cutaway view of another embodiment of the object picking assembly that includes paddle assemblies coupled to a rail, with the rail being offset from and coupled to the bucket via bars coupled to sidewalls of the bucket.

While FIGS. 19A-19C and 20A-20C illustrate one example of an object picking assembly 165 having paddle assemblies 830 coupled to a bucket 160 via a rail 820 coupled to a front end of the bucket 160, further embodiments can include two or more paddle assemblies 830 coupled to a bucket 160 in various suitable ways. For example, FIGS. 21A and 21B illustrate paddle assemblies coupled to a rail 820, with the rail 820 being offset from and coupled to the bucket 160 via bars 1020 coupled to sidewalls of the bucket 160.

In another example embodiment 165D, as shown in FIGS. 22A, 22B, 22C, 23A and 23B, an object picking assembly 165 can comprise a first and second paddle assembly 830 coupled to a single traveler 810, which can move along a rail 820 that is suspended above and forward of the front edge 162 of a bucket 160. As shown in this example embodiment 165D, a bar assembly 1120 can extend from sidewalls of the bucket 160 to hold the rail 820 above and forward of the front edge 162 of a bucket 160.

Figure 22A:
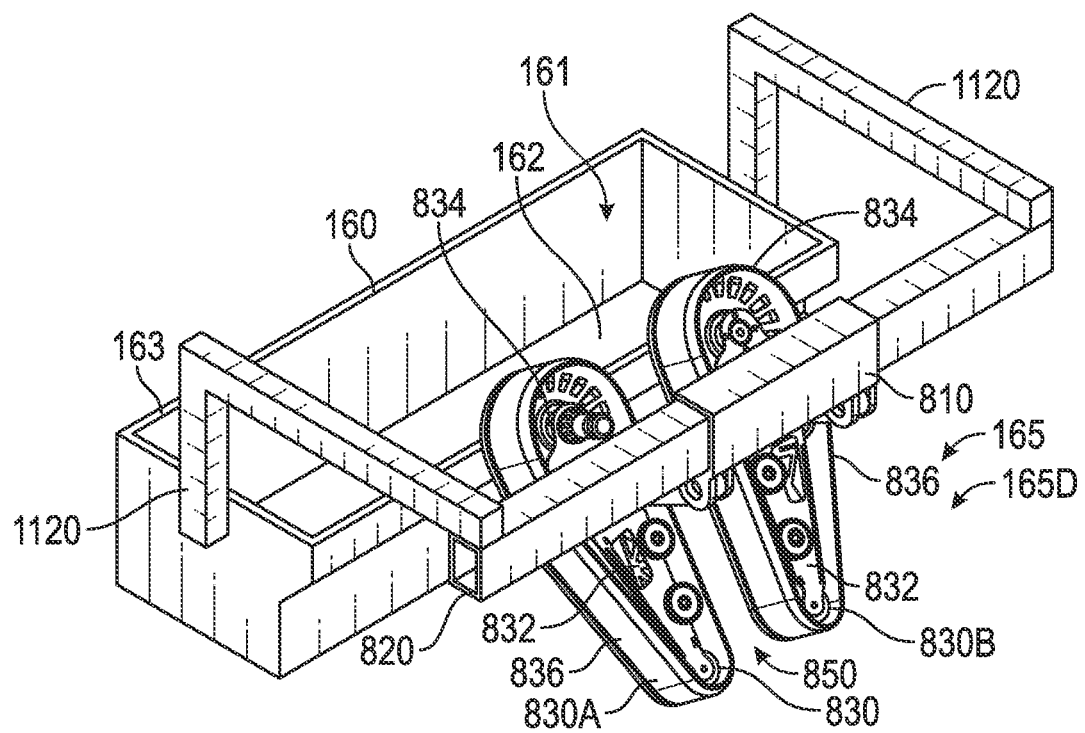
FIG. 22A illustrates a perspective view of another embodiment of the object picking assembly that includes a first and second paddle assembly coupled to a single traveler, which can move along a rail that is suspended above and forward of the front edge of a bucket.
Figure 22B:
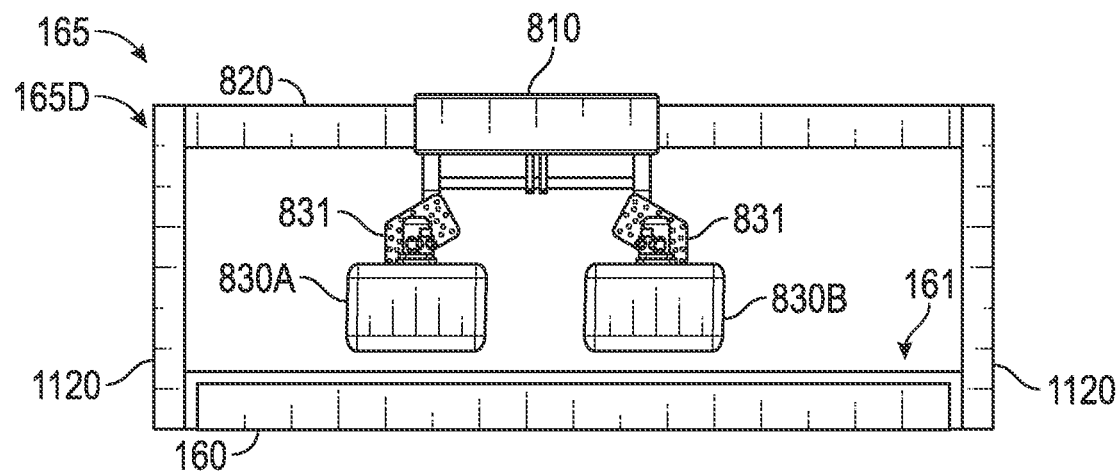
FIG. 22B illustrates an end view of another embodiment of the object picking assembly that includes a first and second paddle assembly coupled to a single traveler, which can move along a rail that is suspended above and forward of the front edge of a bucket.
Figure 22C:
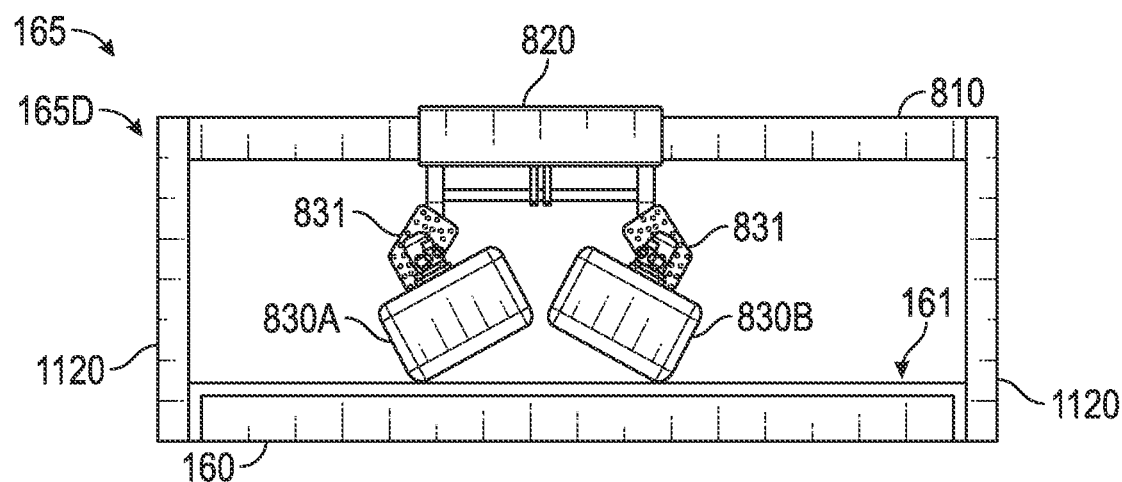
FIG. 22C illustrates an end view of another embodiment of the object picking assembly that includes a first and second paddle assembly coupled to a single traveler, which can move along a rail that is suspended above and forward of the front edge of a bucket with the paddle assemblies tilted.
Figure 23A:
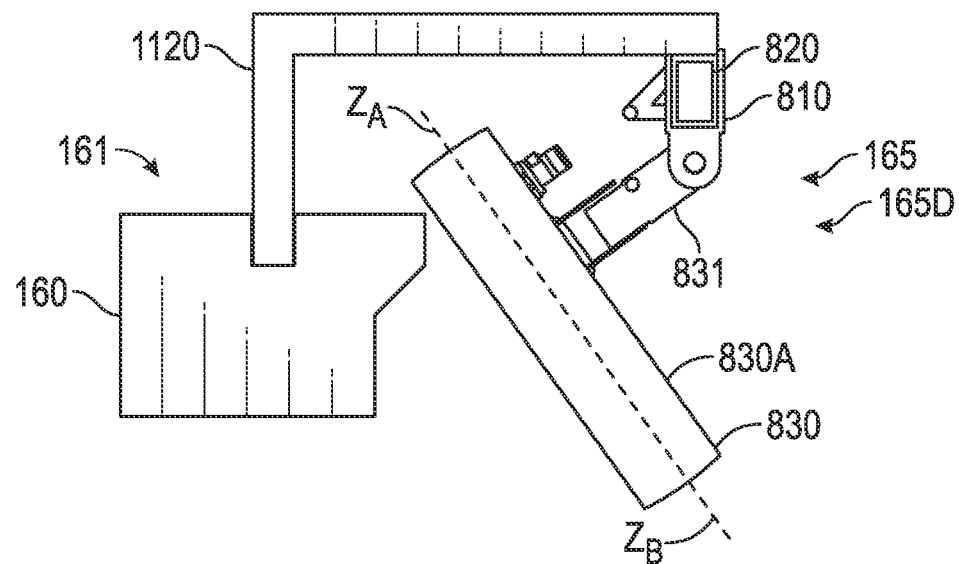
FIG. 23A illustrates a side view of another embodiment of the object picking assembly that includes a first and second paddle assembly coupled to a single traveler, which can move along a rail that is suspended above and forward of the front edge of a bucket.
Figure 23B:
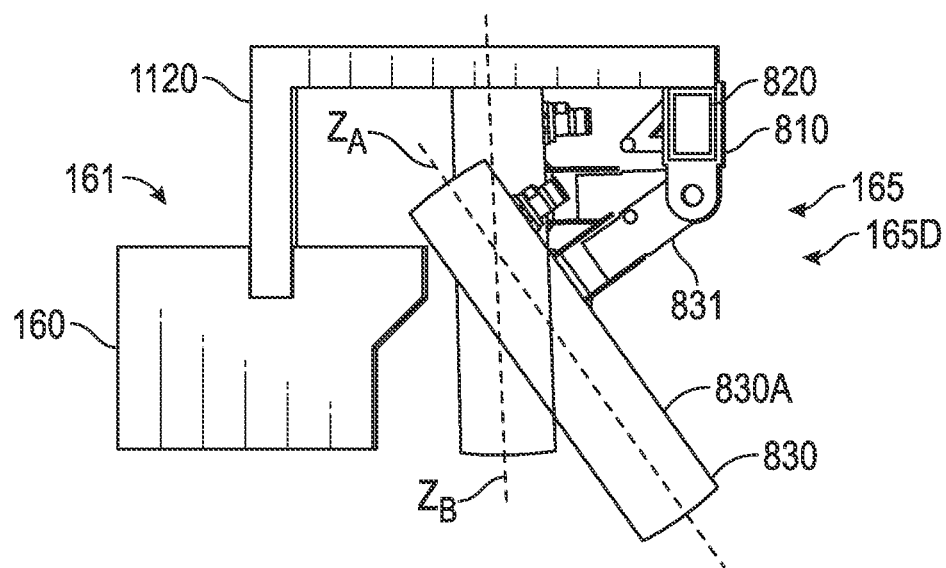
FIG. 23B illustrates a side view of another embodiment of the object picking assembly that includes a first and second paddle assembly coupled to a single traveler, which can move along a rail that is suspended above and forward of the front edge of a bucket with the paddle assemblies tilted.

As shown in FIGS. 22B and 22C, in various embodiments the paddle assemblies 830 can be configured to be tilted to change the shape of the cavity 850 between the paddle assemblies 830. It should be clear that such a capability can be present in any suitable embodiment (e.g., 165A, 165B, 165C, and the like) and should not be construed to be limited to this example embodiment 165D.

Also, while this example embodiment 165D illustrates a first and second paddle assembly 830 disposed on a single traveler 810, such that the first and second paddle assemblies travel together on the single traveler 810, in some embodiments, the paddle assemblies 830 can be disposed on separate respective travelers 810 (e.g., as shown in embodiments 165A, 165C, and the like). Similarly, further embodiments can include a plurality of paddle assemblies 830, head assemblies 580, or the like, disposed on a single traveler 810, 560. Accordingly, it should be clear that any suitable aspects of any example embodiments herein can be applied to other example embodiments, and that the specific configurations shown in the present example embodiments should not be construed to be limiting on the numerous suitable configurations that are within the scope and spirit of the present invention. Also, while various embodiments discuss travelers 810, 560 as being configured to move or travel along a rail 820, 570 or other structure, in some embodiments, travelers can be fixed in position and inoperable to move or travel along a structure.

Additionally, while various embodiments illustrate an object picking assembly 165 comprising a pair of paddle assemblies 830, head assemblies 580, and the like, further embodiments can include any suitable plurality of paddle assemblies 830, head assemblies 580 or other suitable elements. For example, some embodiments can comprise three paddle assemblies 830 disposed on three separate travelers 810 that can move along a rail 820. In such embodiments, the three paddle assemblies 830 can define a first and second cavity 850 between respective paddle assemblies 830 and objects 120 can be picked up via the first and/or second cavities 850. Further embodiments can include a 4, 5, 10, 15, 25, 50 or other suitable number of paddle assemblies 830, head assemblies 580, and the like.

Figure 24A:
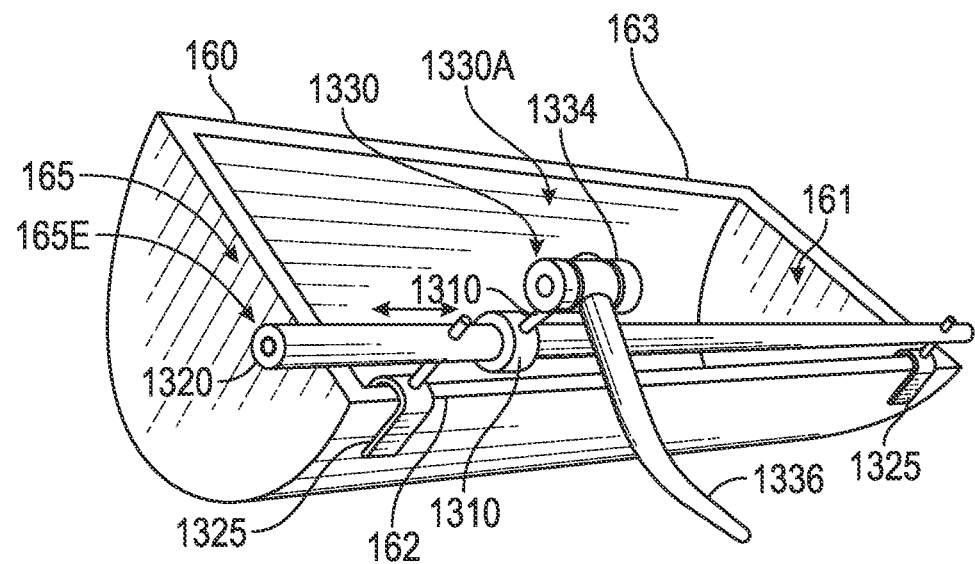
FIG. 24A illustrates another embodiment of an object picking assembly that includes a rail coupled to a front edge of a bucket via a pair of clamps, such that the rail is offset from the front edge of the bucket, and a tine assembly is coupled to the rail via a rail cuff.

Object picking assemblies 165 can be configured in further suitable ways and can have other suitable structures for picking up or moving objects 120. For example, FIG. 24A illustrates another example embodiment 165E of an object picking assembly 165 that comprises a rail 1320 coupled to a front edge 162 of a bucket 160 via a pair of clamps 1325, such that the rail 1320 is offset from the front edge 162 of the bucket 160. A tine assembly 1330 can be coupled to the rail 1320 via a rail cuff 1310, and in some examples the rail cuff 1310 can be configured to rotate about the rail 1320 and/or translate along the rail 1320 to actuate and move the tine assembly 1330.

As shown in FIG. 24A, in one embodiment 1330A, a tine assembly 1330 can comprise an arm 1332 that extends from the rail cuff 1310 to a tine head 1334 that is coupled to a tine 1336 extends from the tine head 1334. In various examples, the tine head 1332 can be configured to rotate the tine 1336. Elements such as the rail cuff 1310 and/or tine head 1332 can be actuated in various suitable ways including via an electric motor, a pneumatic system, a hydraulic system, and the like.

Figure 24B:
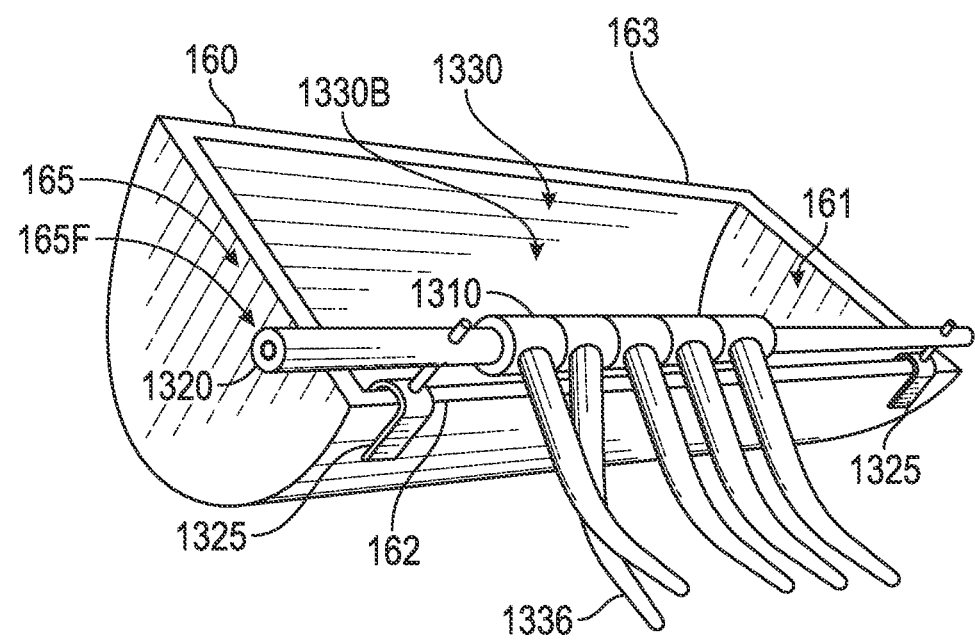
FIG. 24B illustrates another embodiment of an object picking assembly that includes a rail coupled to a front edge of a bucket via a pair of clamps, such that the rail is offset from the front edge of the bucket and a tine assembly is coupled to the rail via a rail cuff, the tine assembly including a plurality of tines.
Figure 25A:
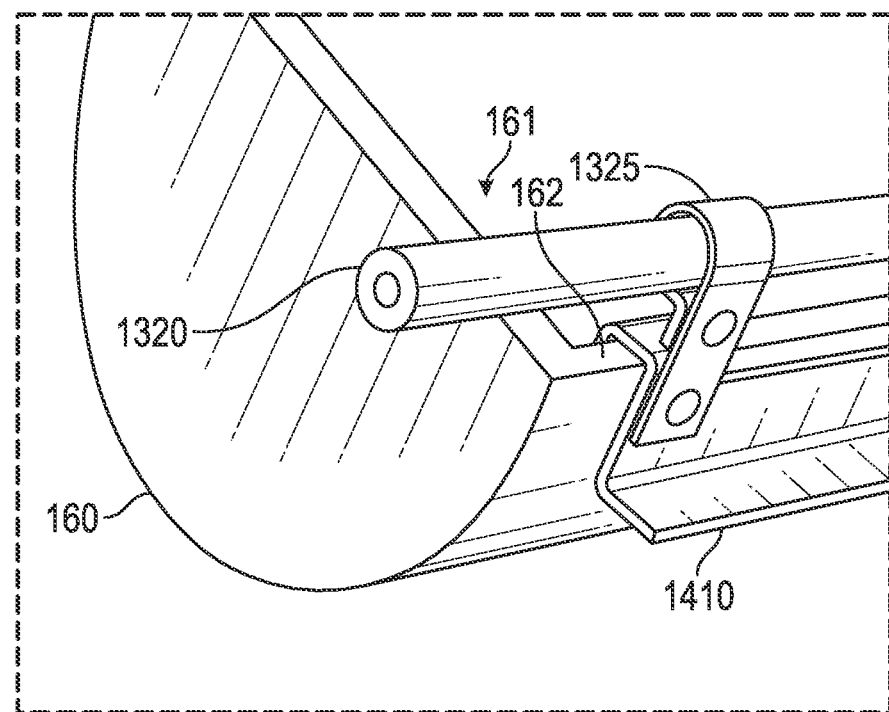
FIG. 25A illustrates a perspective view of another embodiment of an object picking assembly that includes a rail coupled to a front edge of a bucket via a pair of clamps, wherein a given rail cuff is associated with a plurality of tines that define a tine unit, including cross bars that couple one or more of the tines of the tine unit.
Figure 25B:
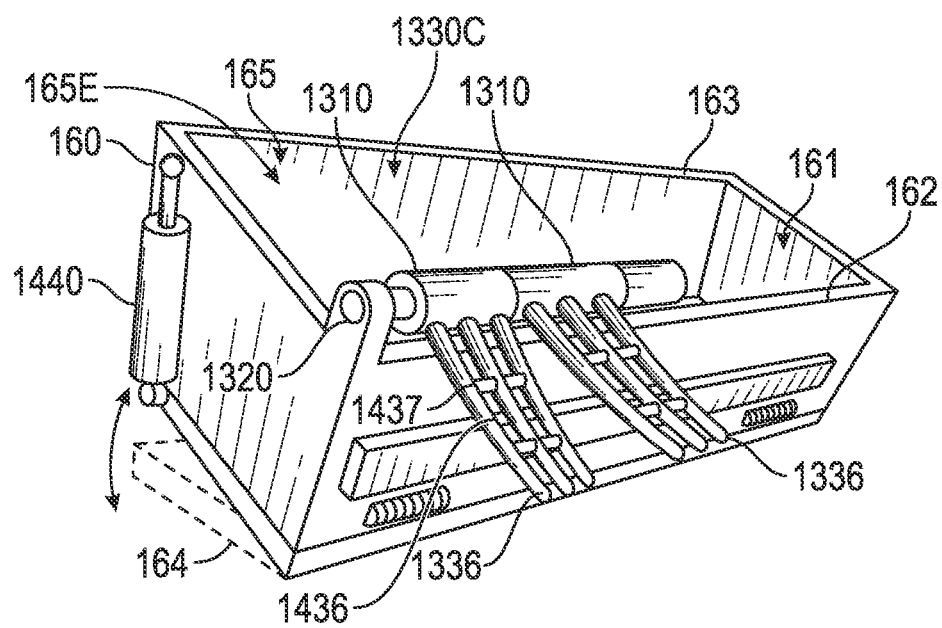
FIG. 25B illustrates a perspective view of another embodiment of a rotating object picking assembly that includes a rail coupled to a front edge of a bucket via a pair of clamps, wherein a given rail cuff is associated with a plurality of tines that define a tine unit, including cross bars that couple one or more of the tines of the tine unit.
Figure 26A:
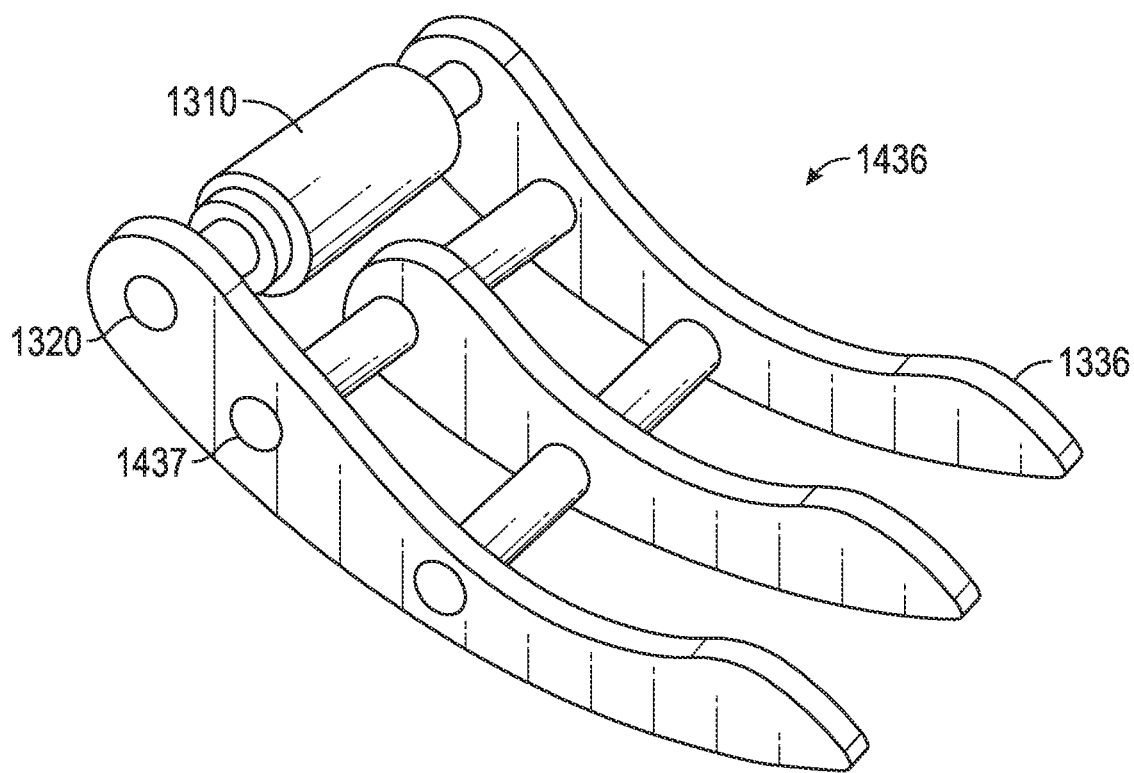
FIG. 26A illustrates a perspective view of another embodiment of rail cuff associated with a plurality of tines that define a tine unit, including cross bars that couple one or more of the tines of the tine unit.

As shown in FIG. 24B, in another embodiment 1330B, a tine assembly 1330 can comprise a plurality of rail cuffs 1310 having one or more tines 1336 extending from the respective rail cuffs 1310. For example, FIG. 24B illustrates one embodiment 1330B where each rail cuff 1310 is associated with a respective single tine 1336. In another example embodiment 1330C, as shown in FIGS. 25B and 26A, a given rail cuff 1310 can be associated with a plurality of tines 1336 that define a tine unit 1436 which can include cross bars 1437 that couple one or more of the tines 1336 of the tine unit 1436. In some examples, the rail cuff 1310 can be configured to rotate about the rail 1320 and/or translate along the rail 1320 to actuate and move the tines 1336 and/or tine unit 1436.

Figure 26B:
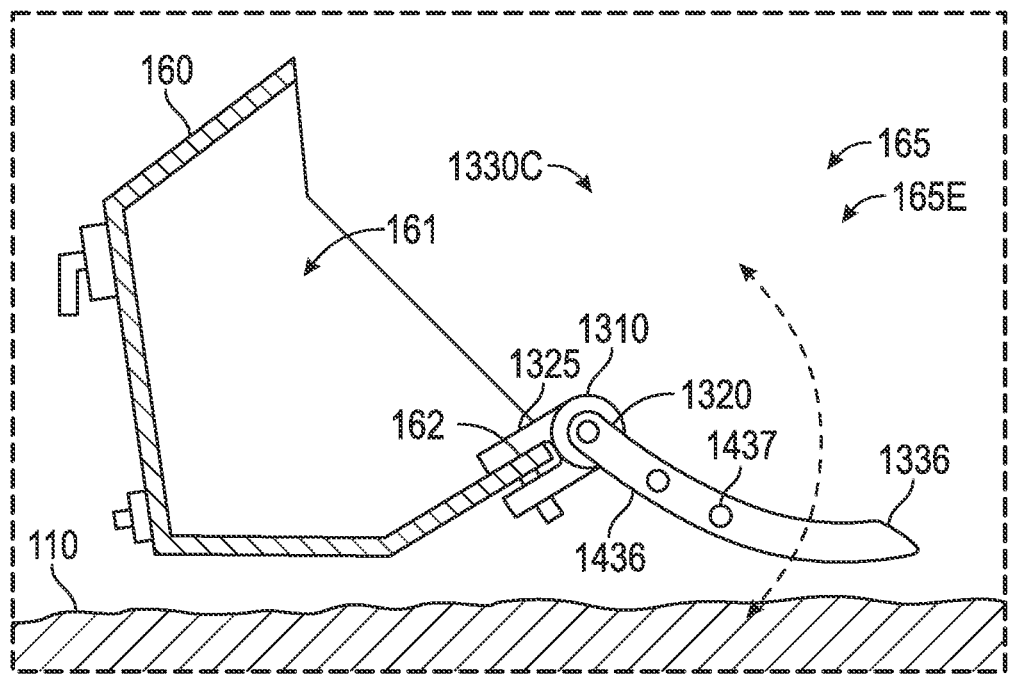
FIG. 26B illustrates a side view of another embodiment of an object picking assembly that includes a rail coupled to a front edge of a bucket via a pair of clamps, wherein the tine unit is coupled at the front edge of a bucket via a clamp, and the rail cuff can be configured to rotate the tine unit, which can be desirable for scooping objects from a field and depositing them in the cavity of the bucket.

For example, as shown in FIG. 26B, a tine unit 1436 can be coupled at the front edge 162 of a bucket 160 via a clamp 1325, and the rail cuff 1310 can be configured to rotate the tine unit 1436, which can be desirable for scooping objects 120 from a field 110 and depositing them in the cavity 161 of the bucket 160 as discussed herein. In some examples, a tine assembly 1330 can comprise a single rail 1320 that one or more tines 1336 and/or tine units 1436 can travel along and/or rotate about. However, in further embodiments, each of a plurality of tines 1336 and/or tine units 1436 can travel along and/or rotate about separate rails 1320.

Figure 27A:
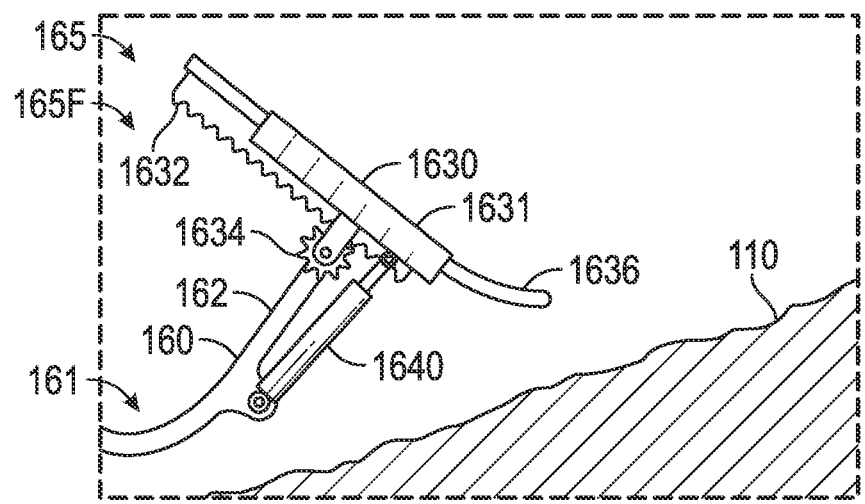
FIG. 27A illustrates a side view of another embodiment of an object picking assembly that includes a tine assembly having a sleeve disposed about a rack and pinion with one or more tines disposed at a front end of the rack, wherein the tines are retracted.
Figure 27B:
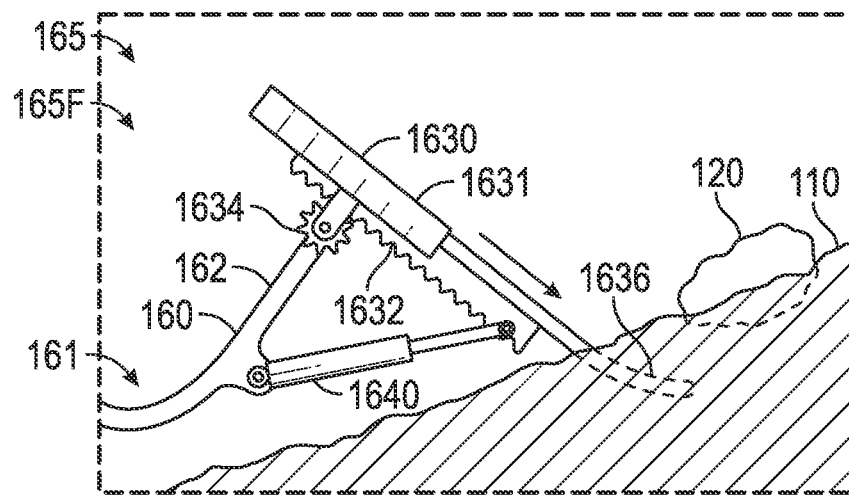
FIG. 27B illustrates a side view of another embodiment of an object picking assembly that includes a tine assembly having a sleeve disposed about a rack and pinion with one or more tines disposed at a front end of the rack, wherein the tines are extended to scope and pick up an object.
Figure 27C:
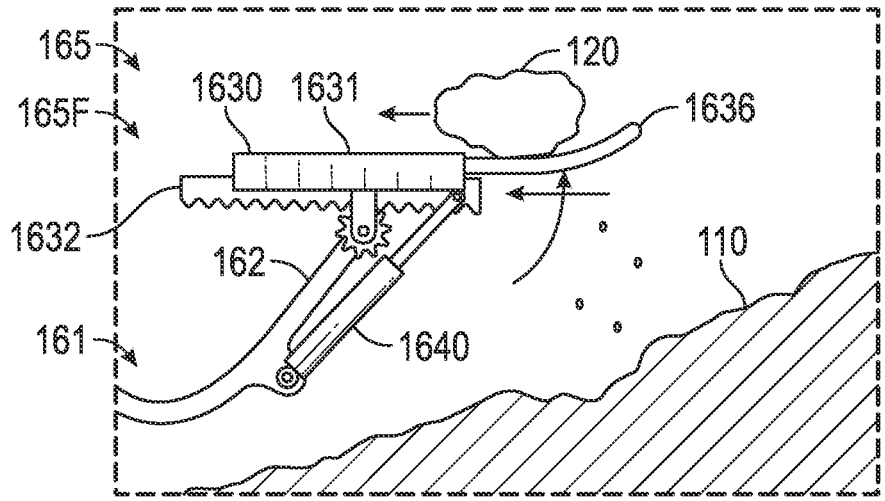
FIG. 27C illustrates a side view of another embodiment of an object picking assembly that includes a tine assembly having a sleeve disposed about a rack and pinion with one or more tines disposed at a front end of the rack, wherein the tines are retracted after scoping and picking up an object.

Turning to FIGS. 27A-27C, another example embodiment of an object picking assembly 165F is illustrated that comprises a tine assembly 1630 having a sleeve 1631 disposed about a rack 1632 and pinion 1634 with one or more tines 1636 disposed at a front end of the rack 1632. The tine assembly 1630 can be coupled to the front edge 162 of a bucket 160 with a cylinder 1640 coupled to the bucket 160 and a front end of the rack 1632.

By actuating the cylinder 1640, rack 1632 and/or pinion 1634, the tine assembly 1630 can be configured to extract objects 120 from a field 110 and deposit the objects 120 into the cavity 161 of the bucket 160. For example, FIG. 27A illustrates the object picking assembly 165 in a first configuration with the rack 1632 and cylinder 1640 in a first contracted configuration, and FIG. 27B illustrates the object picking assembly 165 in a second configuration with the rack 1632 and cylinder 1640 in an extended configuration in preparation for engaging an object 120 disposed in a field 110. As shown in FIG. 27C, the rack 1632 can then assume a contracted configuration with the cylinder 1640 in an extended configuration, which can lift the object 120 from the field 110 and deposit the object 120 into the cavity 161 of the bucket 160.

In various embodiments, it can be desirable to configure an object picking assembly 165 to react to immovable objects that the object picking assembly 165 may encounter during operation. For example, FIGS. 28A and 28B illustrate two example embodiments 165G, 165H of an object picking assembly 165 having a tine assembly 1730 configured to react to contacting an immovable object, which in these examples is a large object 120 disposed within a field 110 with only a small portion of the object 120 visible from the surface.

Figure 28A:
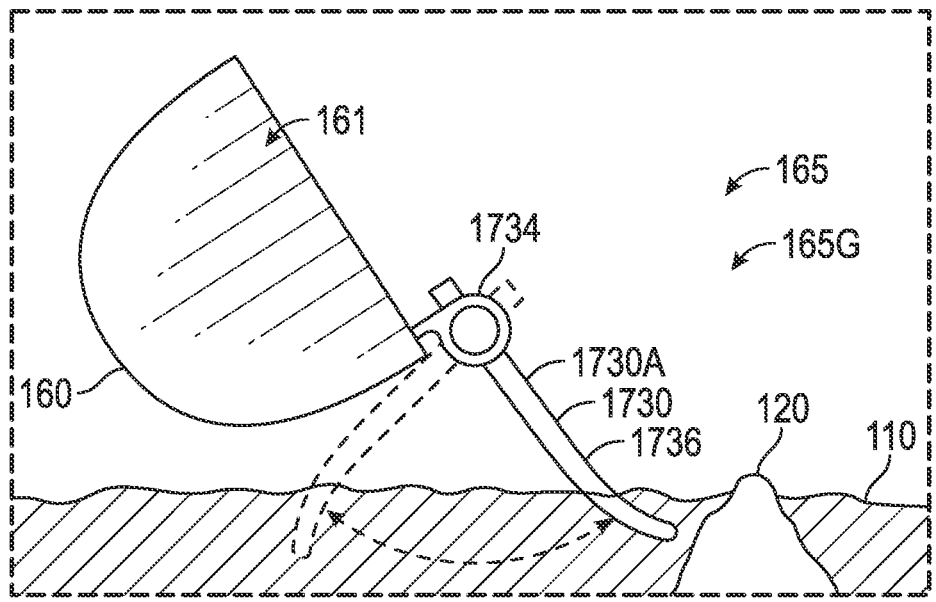
FIG. 28A illustrates a side view of another embodiment of an object picking assembly that includes an object picking assembly in a ready position having a tine assembly configured to react to contacting an immovable object, which in a large object disposed within a field with only a small portion of the object visible from the surface.

In the example of FIG. 28A the tine assembly 1730A can be configured in a forward "ready position" with the tine 1736 of the tine assembly 1730A engaging the immovable object 120 and then assuming a "breakaway" position in response to engaging the immovable object 120 by rotating backward about an axle 1734. In some embodiments, the movement from the "ready position" to the "breakaway" position can be triggered mechanically; based on data from one or more sensors (e.g., a force sensor, camera, or the like). Additionally, rotation from the "ready position" to the "breakaway" position can generated in various suitable ways (e.g., via a return spring, a motor, a pneumatic system, a hydraulic system, or the like).

Figure 28B:
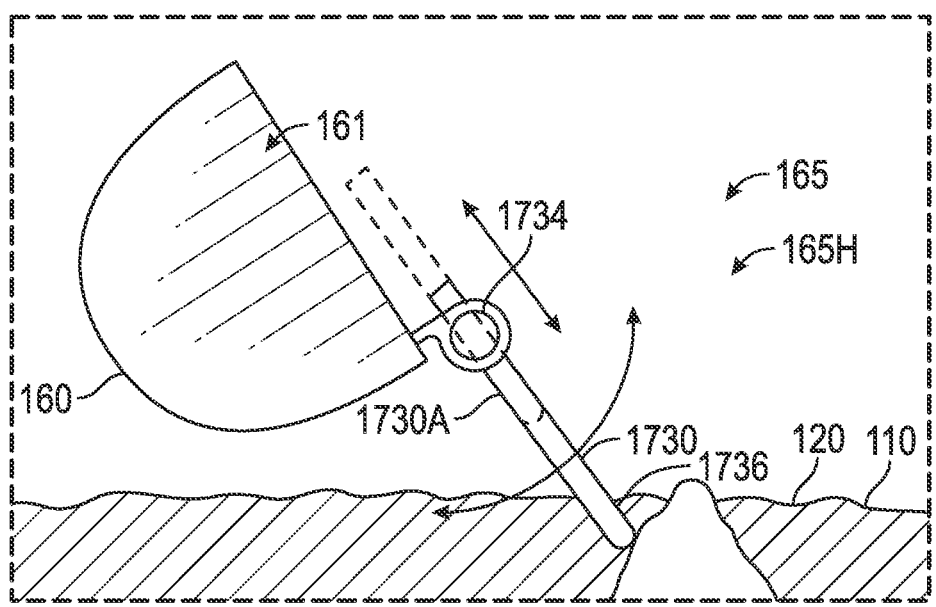
FIG. 28B illustrates a side view of another embodiment of an object picking assembly that includes an object picking assembly in an extended position having a tine assembly configured to react to contacting an immovable object, which in a large object disposed within a field with only a small portion of the object visible from the surface.

In the example of FIG. 28B, the tine assembly 1730B can be configured in an extended position with the tine 1736 of the tine assembly 1730B engaging the immovable object 120 and then assuming a retracted position in response to engaging the immovable object 120 by retracting the tine 1736 away from the object 120. In some embodiments, the movement from the extended to retracted position can be triggered mechanically, based on data from one or more sensors (e.g., a force sensor, camera, or the like). Additionally, movement from the extended to retracted position can be generated in various suitable ways (e.g., via a return spring, a motor, a pneumatic system, a hydraulic system, or the like).

Figure 29A:
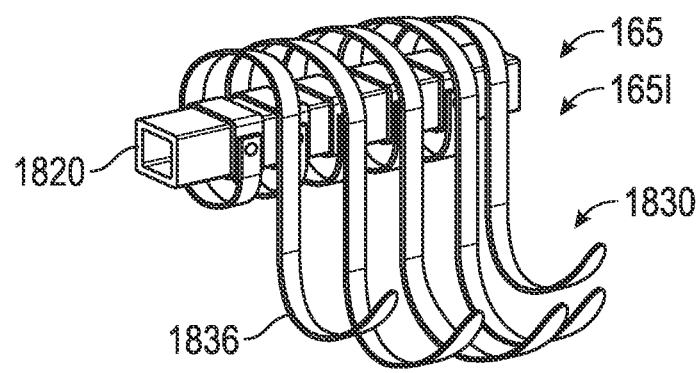
FIG. 29A illustrates a perspective view of another embodiment of an object picking assembly that includes a tine assembly having a plurality of tines which spirally encircle and are coupled to a rail.
Figure 29B:
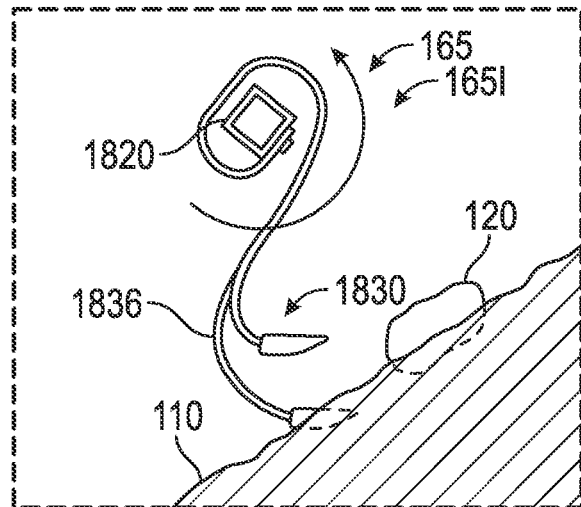
FIG. 29B illustrates a side view of another embodiment of an object picking assembly that includes a tine assembly having a plurality of tines which spirally encircle and are coupled to a rail with rotation enabling deposition of the object.
Figure 29C:
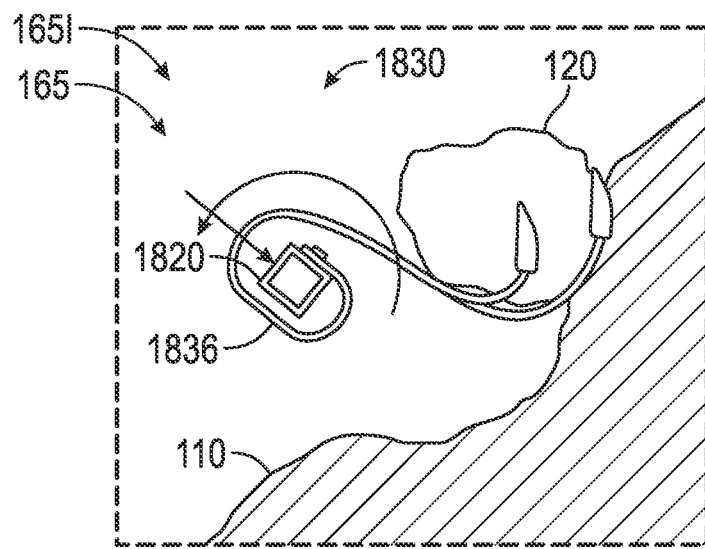
FIG. 29C illustrates a side view of another embodiment of an object picking assembly that includes a tine assembly having a plurality of tines which spirally encircle and are coupled to a rail with further rotation enabling deposition of the object.

Turning to FIGS. 29A-29C, another example embodiment 1651 of an object picking assembly 165 is illustrated that includes a tine assembly 1830 comprising a plurality of tines 1835 which spirally encircle and are coupled to a rail 1820. In this example, the tines 1836 are shown having different lengths with the tines 1836 becoming successively longer from the edges of the tine assembly 1830 toward the center of the tine assembly 1830, which can generate a U-shape or V-shape. However, in further examples, the tines 1836 can have various suitable lengths to generate various suitable profiles for a tine assembly 1830 (e.g., flat, undulating, or the like). As illustrated in FIGS. 29B and 29C, the tine assembly 1830 can be configured to pick up an object 120 in a field 110 by rotating the rail 1820 such that the object 120 engages and is held within the tine assembly 1830, with further rotation enabling deposition of the object 120 to a container (e.g., a cavity 161 of a bucket 160).

Figure 30A:
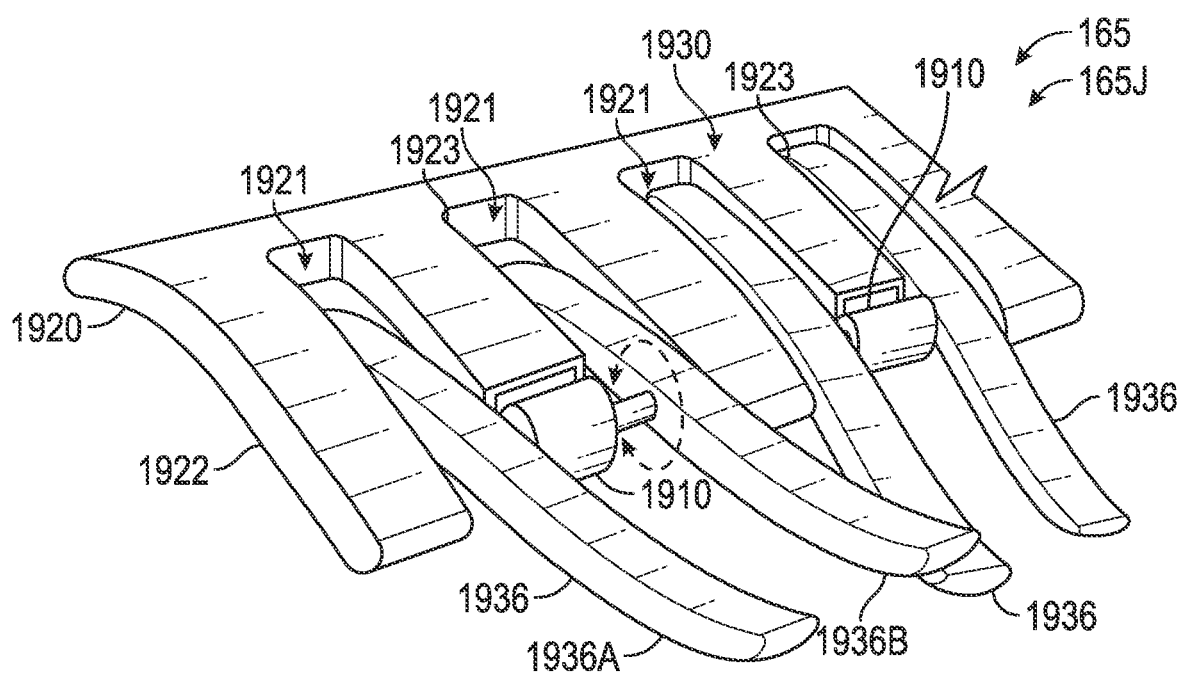
FIG. 30A illustrates a perspective view of another embodiment of an object picking assembly that includes a rim that defines slots via alternating flanges along the length of the rim.
Figure 30B:
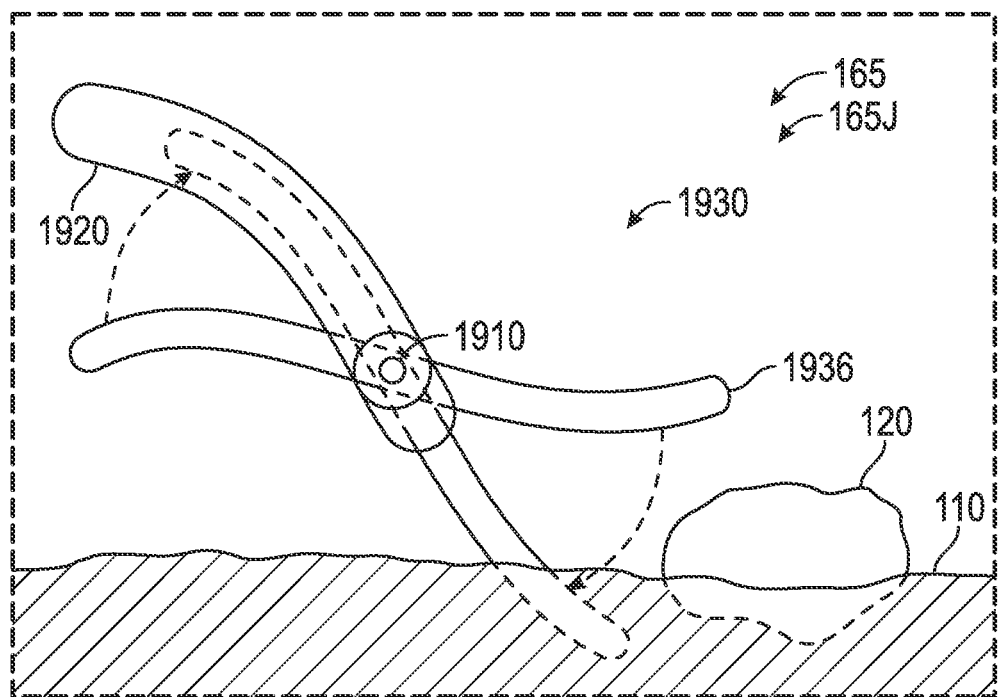
FIG. 30B illustrates a side view of another embodiment of an object picking assembly that includes a rim that defines slots via alternating flanges along the length of the rim, with one or more tines configured to engage an object in a field.

Turning to FIGS. 30A and 30B, another example embodiment 165J of an object picking assembly 165 is illustrated that includes a rim 1920 that defines slots 1921 via alternating flanges 1922, 1923 along the length of the rim 1920. Tines 1936 can be rotatably disposed within the slots 1921 with one or more tine assemblies 1930 being defined by pairs of tines 1936A, 1936B coupled to and rotatably actuated by an actuator 1910 disposed at the end of every other flange 1923. In some examples, the pair of tines 1936A, 1936B can be independently actuated or actuated in unison by the actuator 1910. As shown in FIG. 30B, one or more tines 1936 can be configured to engage an object 120 in a field 110, which can direct the object 120 into a container (e.g., a cavity 161 of a bucket 160).

In further examples, an object picking assembly 165 having a rim 1920 and tines 1936 can be configured in various suitable ways. For example, in some embodiments, tines 1936 can be individually actuated or more than two tines 1936 can be actuated as a unit. Additionally, tines 1936 can be actuated in various suitable ways including via a motor, pneumatic system, a hydraulic system, or the like.

For example, FIGS. 31A, 31B, 31C, and 32A illustrate various examples where tines or a tine assembly are actuated via one or more cylinder (e.g., a pneumatic or hydraulic cylinder). In the example embodiment 165K of FIG. 31A, an object picking assembly 165 includes a tine assembly 2030 coupled to a front edge 162 of a bucket 160 via an axel 2020, with one or more tines 2036 of the tine assembly 2030 being actuated via a cylinder extending between the tine assembly 2030 and the bucket 160.

Figure 31A:
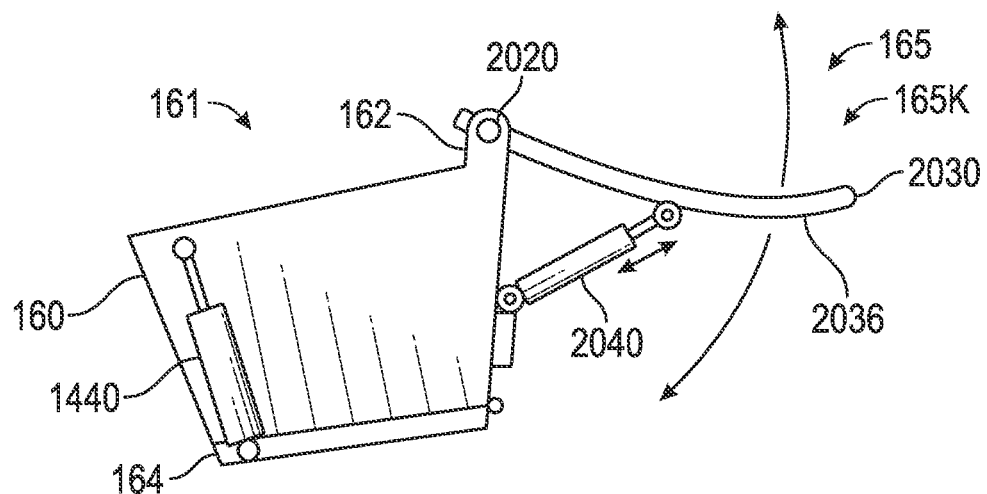
FIG. 31A illustrates a side view of another embodiment of an object picking assembly that includes a tine assembly having a plurality of tines that are actuated via one or more cylinders.

Additionally, the example of FIG. 31A illustrates a bucket 160 having a dumping mechanism that includes a cylinder 1440 configured to actuate a movable base of the bucket 160, which can operate to dump objects 120 disposed within the cavity 161 of the bucket 160. For example, FIG. 31A illustrates the movable base in a closed position and FIG. 25B illustrates the movable base of a bucket 160 in an open position.

Figure 31B:
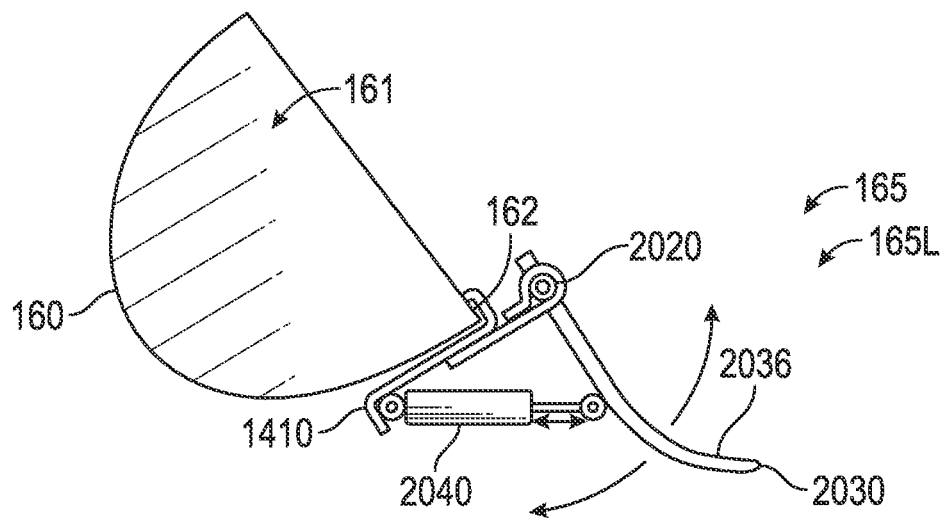
FIG. 31B illustrates a side view of still another embodiment of an object picking assembly that includes a tine assembly having a plurality of tines that are actuated via one or more cylinders.
Figure 31C:
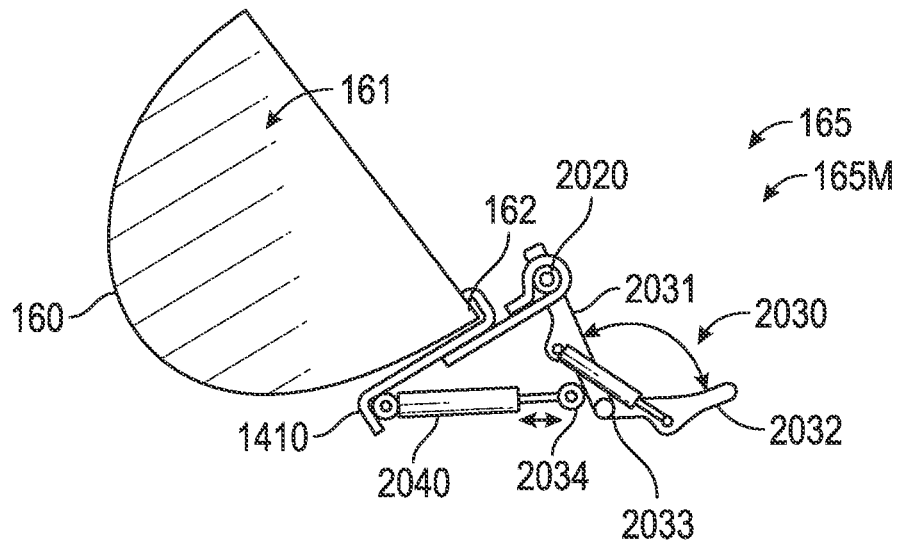
FIG. 31C illustrates a side view of yet another embodiment of an object picking assembly that includes a tine assembly having a plurality of tines that are actuated via one or more cylinders.

FIG. 31B illustrates another example embodiment 165L of an object picking assembly 165 coupled to a front edge 162 of a bucket 160 via a clamp architecture 1410 (see also FIG. 25A), with a cylinder 2040 extending between the clamp architecture 1410 and one or more tines 2036 of the tine assembly 2030. FIG. 31C illustrates another example embodiment 165M of an object picking assembly 165 where the tine assembly 2030 comprises an articulating arm having a first and second length 2031, 2032 rotatably coupled at a joint 2033, with the articulating arm being actuated via a cylinder 2034 coupled to the first and second length 2031, 2032.

Figure 32A:
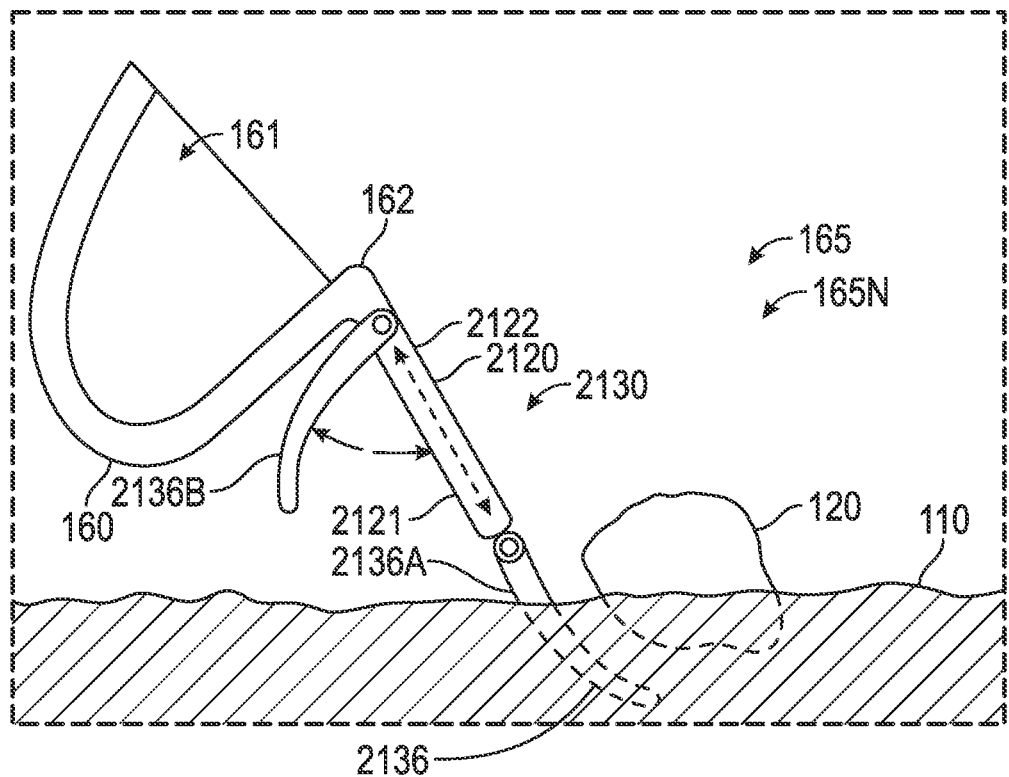
FIG. 32A illustrates a side view of yet another embodiment of an object picking assembly coupled to or extending from a front end of a bucket including an arm and a tine coupled to and configured to translate along the length of the arm between a distal end of the arm and a base end of the arm.

FIG. 32A illustrates a further example embodiment 165N of an object picking assembly 165 coupled to or extending from a front edge 162 of a bucket 160 including an arm 2120 and a tine 2136 coupled to and configured to translate along the length of the arm 2130 between a distal end 2121 of the arm 2120 and a base end 2122 of the arm 2120. More specifically, the same tine 2136 is shown in a first configuration 2126A at the distal end 2121 of the arm 2122 and at a second position 2136B at the base end 2122 of the arm 2120.

Additionally, the tine 2136 can be configured to rotate, which can provide for picking up an object 120 and depositing the object in the cavity 161 of a bucket 160. For example, the tine 2136 can assume the first position 2136A to engage the object 120 and rotate upward to capture the object 120. The tine 2136 with the captured object 120 can translate up the arm 2120 and deposit the object 120 into the cavity 161 of the bucket 160.

Although FIG. 32A illustrates a side view of an example embodiment 165N of an object picking assembly 165 having a single tine 2136 in a first and second position 2136A, 2136B, further embodiments can comprise any suitable plurality of tines 2136. For example, some embodiments can include a plurality of tines 2136 disposed on respective arms 2120 disposed along a length of the front edge 162 of the bucket 160.

Figure 32B:
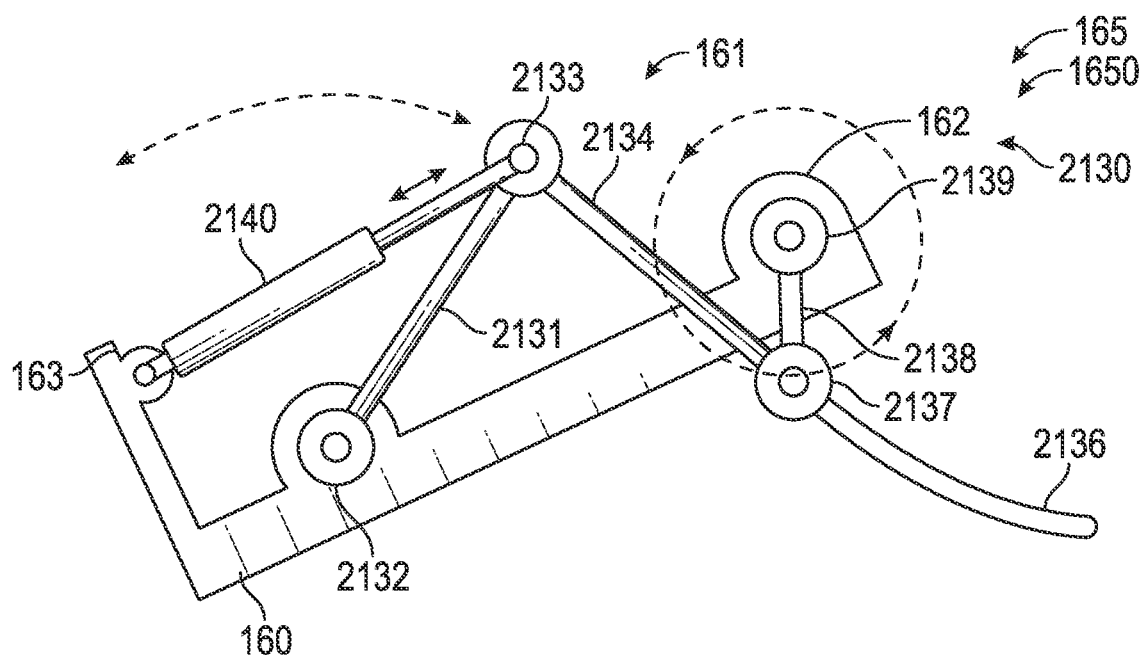
FIG. 32B illustrates a side view of yet another embodiment of an object picking assembly that includes a tine assembly having a first linkage that extends from a first joint coupled within the cavity of a bucket to a second joint.

FIG. 32B illustrates yet another example embodiment 165O of an object picking assembly 165, which includes a tine assembly 2130 that comprises a first linkage 2131 that extends from a first joint 2132 coupled within the cavity 161 of a bucket 160 to a second joint 2133. The tine assembly 2130 further comprises a second linkage 2134 that extends from the second joint 2133 to a third joint 2137 having one or more tines 2136 coupled to the third joint 2137. The tine assembly 2130 further comprises a third linkage 2138 that extends from the third joint 2137 to a fourth joint 2139 coupled at a front edge 162 of the bucket 160. A cylinder 2140 can be coupled to the second joint 2133 and a rear end 163 of the bucket 160, with the cylinder configured to drive the one or more tines 2136 via the linkages 2131, 2134, 2138. For example, the extension and retraction of the cylinder 2140 can generate a rotary motion of the tine 2136, which can be used to pick up objects 120 and deposit the objects 120 into the cavity 161 of the bucket 160.

Figure 33:
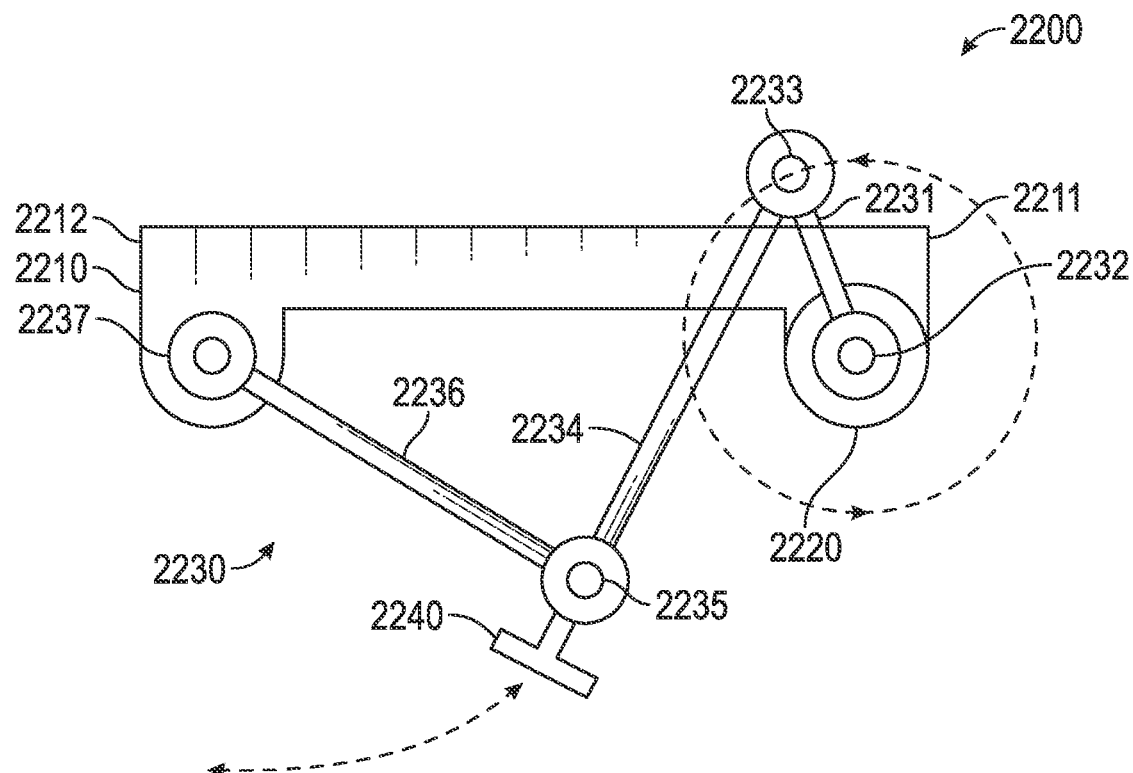
FIG. 33 illustrates a side view of yet another embodiment of an object picking assembly that includes a pusher assembly having a bar with a first and second ends.

In various embodiments, it can be desirable to push objects 120 to position the objects for pick up by an object picking assembly 165; for distribution within a container such as a cavity 161 of a bucket 160; and the like. For example, FIG. 33 illustrates an example of a pusher assembly 2200 that includes a bar 2210 having a first and second ends 2211, 2212. The pusher assembly 2200 can further comprise a first linkage 2231 coupled between a first joint 2232 disposed at the first end 2211 of the bar 2210 and a second joint 2233. The pusher assembly 2200 can also include a second linkage 2234 coupled between the second joint 2233 and a third joint 2235. The pusher assembly 2200 can also include a third linkage 2236 coupled between the third joint 2235 and a fourth joint 2237 disposed as the second end 2212 of the bar 2210.

An actuator 2220 can be coupled at the first end 2211 of the bar 2210 and configured to rotate the first joint 2232 to drive a pusher 2235 associated with the third joint 2235. For example, the pusher 2235 can be driven to push objects 120 for pick up by an object picking assembly 165; for distribution within a container such as a cavity 161 of a bucket 160; and the like.

As discussed herein, it should be clear that the examples of object picking assembly 165 discussed herein should not be limiting on the wide variety of alternative or additional embodiments that are within the scope of the present disclosure. Accordingly, further embodiments can include any suitable combination of the example object picking assemblies 165 discussed herein, including combination, substitution, duplication, or removal of one or more elements, systems or portions of an object picking assembly 165.

Figure 34A:
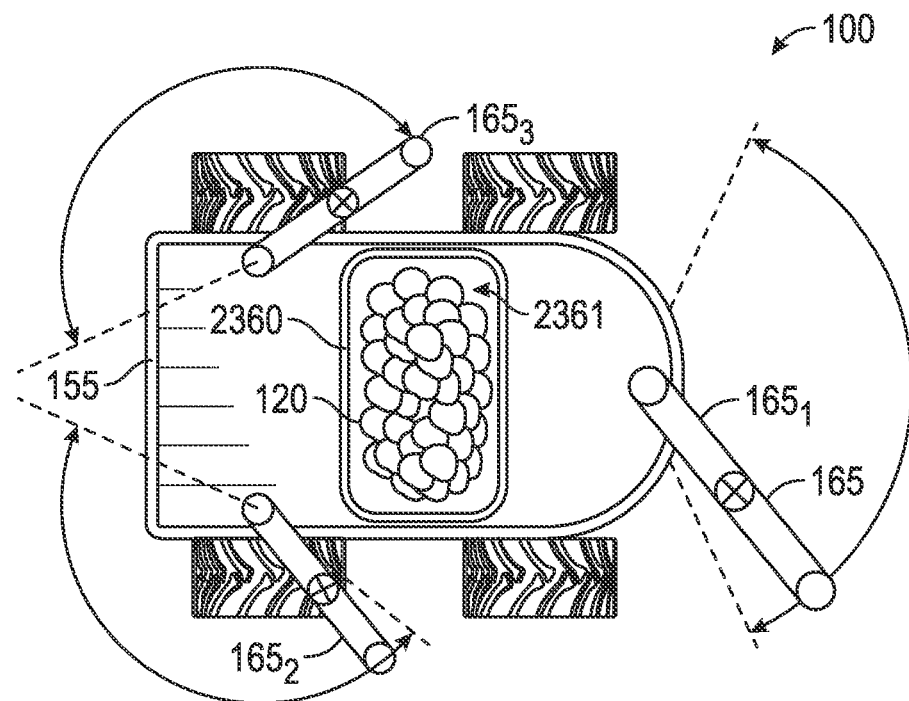
FIG. 34A illustrates a top view of yet another embodiment of an object picking assembly disposed at a front end of a vehicle with a second and third object picking assembly disposed on sides of the of the vehicle.
Figure 34B:
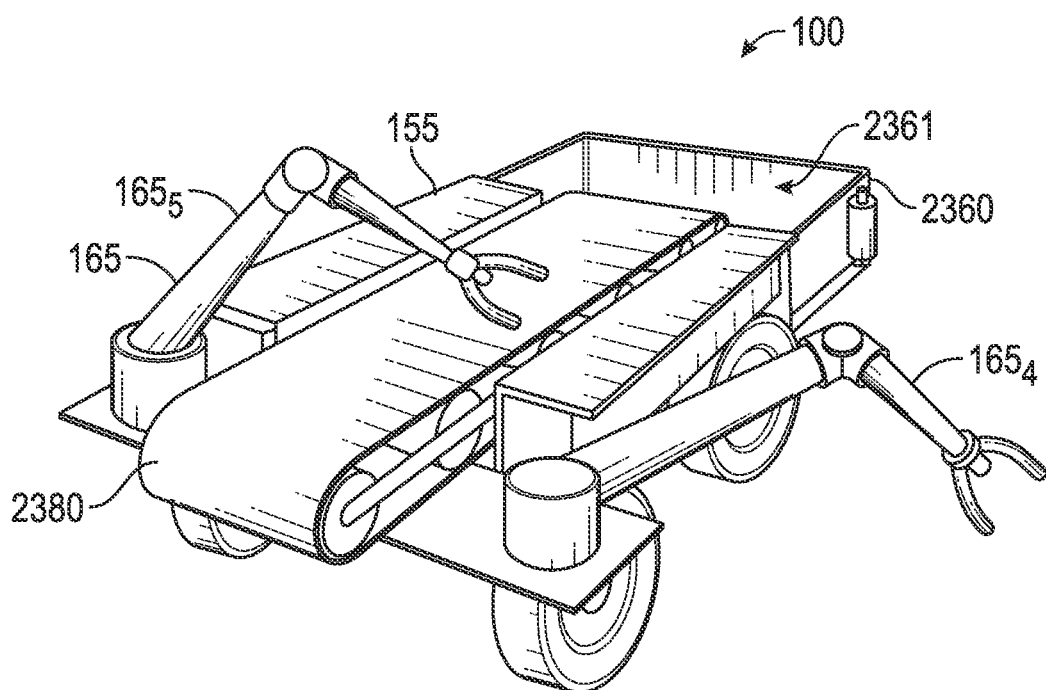
FIG. 34B illustrates a perspective view of yet another embodiment of an object picking assembly disposed at a front end of a vehicle and configured to pick up objects and deposit the objects onto a conveyor belt, which can convey the objects into a cavity of a container in the vehicle.

Similarly, object-collection system 618 can be configured in various suitable ways including combination, substitution, duplication, or removal of one or more elements, systems or portions of an object-collection system 618. For example, FIGS. 34A and 34B illustrate further example embodiments of object-collection system 618. FIG. 34A illustrates an object-collection system 618 having a first object picking assembly 1651 disposed at a front end of a vehicle 155 with a second and third object picking assembly 1652, 1653 disposed on sides of the of the vehicle 155. The object picking assemblies 165 can be configured to pick up objects 120 and deposit the objects 120 into a cavity 2361 of a container 2360 in the vehicle 155. In some examples, the object picking assemblies 165 can comprise robotic arms having any suitable degrees of freedom and various suitable configurations.

FIG. 34B illustrates a further example of an object-collection system 618 having a first and second object picking assembly 1654, 1655 disposed on sides of the of a vehicle 155. The object picking assemblies 165 can be configured to pick up objects 120 and deposit the objects 120 onto a conveyor belt 2380, which can convey the objects 120 into a cavity 2361 of a container 2360 in the vehicle 155. In some examples, the object picking assemblies 165 can comprise robotic arms having any suitable degrees of freedom and various suitable configurations.

Referring now to FIGS. 35-42 generally and FIG. 34 specifically, in some implementations, the object-collection system 2500 includes a vehicle 2510 connected to one or more buckets 2600, one or more cameras 2700 operatively connected to the vehicle 2510, one or more object picking assemblies 2800, one or more sensor arrays 2900, one or more processors 3000, and one or more memories 3100. An object picking assembly 2800 is configured to pick up objects 2810 off of the ground. In some implementations, the object picking assembly 2800 is disposed at a front-end of the bucket 2600. In other implementations, the object picking assembly 2800 is disposed at another section of the bucket 2600, such as the top, side, or rear of the bucket 2600. The object picking assembly 2800 may be connected directly to the front end of the bucket or may be connected to the front end of the bucket 2600 via a linkage assembly. Correspondingly, the object picking assembly 2800 may be connected directly to the top, side, or rear of the bucket or may be connected to the top, side, or rear of the bucket 2600 via a linkage assembly. In still other implementations, the object picking assembly 2800 is operatively associated with the bucket 2600, but is actually connected, either directly or indirectly, to another part of the object-collection system 2500, such as the vehicle 2510.

Referring now to another aspect of the object-collection system 2500, the system further includes one or more sensor arrays 2900. The one or more sensor arrays, which will be described in further detail below, are used to assist with various functions of the object-collection system 2500, including by way of example only, and not by way of limitation, monitoring the terrain being traversed by the object-collection system 2500, monitoring the approaching objects, monitoring the functionality of the object-collection system 2500, and providing feedback on the success and efficiency of the object-collection system 2500 in carrying out its assigned tasks.

In still another aspect of one implementation, the object-collection system 2500 includes a control system with at least one or more processors 3000 and one or more memories 3100. The one or more memories 3100 store computer instructions that are executed by the one or more processors 3000 and cause the processors 3000 to carry out various functions. In some implementations, these functions include, by way of example only, and not by way of limitation, obtain object information for each of one or more identified objects; guide the object-collection system over a target geographical area toward the one or more identified objects based on the object information; capture, via the camera, a plurality of images of the ground relative to the object-collection system as the object-collection system is guided towards the one or more identified objects; identify a target object in the plurality of images based on a dataset of trained object parameters; track movement of the target object across the plurality of images as the object-collection system is guided towards the one or more identified objects; and employ the tracked movement of the target object to instruct the object-collection system to pick up the target object.

It will be understood that in other implementations, only some of the above functions will be carried out by the one or more processors 3000 and one or more memories 3100 of the control system. It will also be understood that in still other implementations, more than the above functions will be carried out by the one or more processors 3000 and one or more memories 3100 of the control system. It will further be understood that in yet other implementations, alternative and additional function will be carried out by the one or more processors 3000 and one or more memories 3100 of the control system. Moreover, it will be understood that in some implementations, the one or more processors 3000 and one or more memories 3100 of the control system are not actually part of the object-collection system 2500, but rather are located outside of the system and are operatively associated with the object-collection system 2500, enabling the transfer of information between the object-collection system 2500 and the control system at its separate location.

Figure 35:
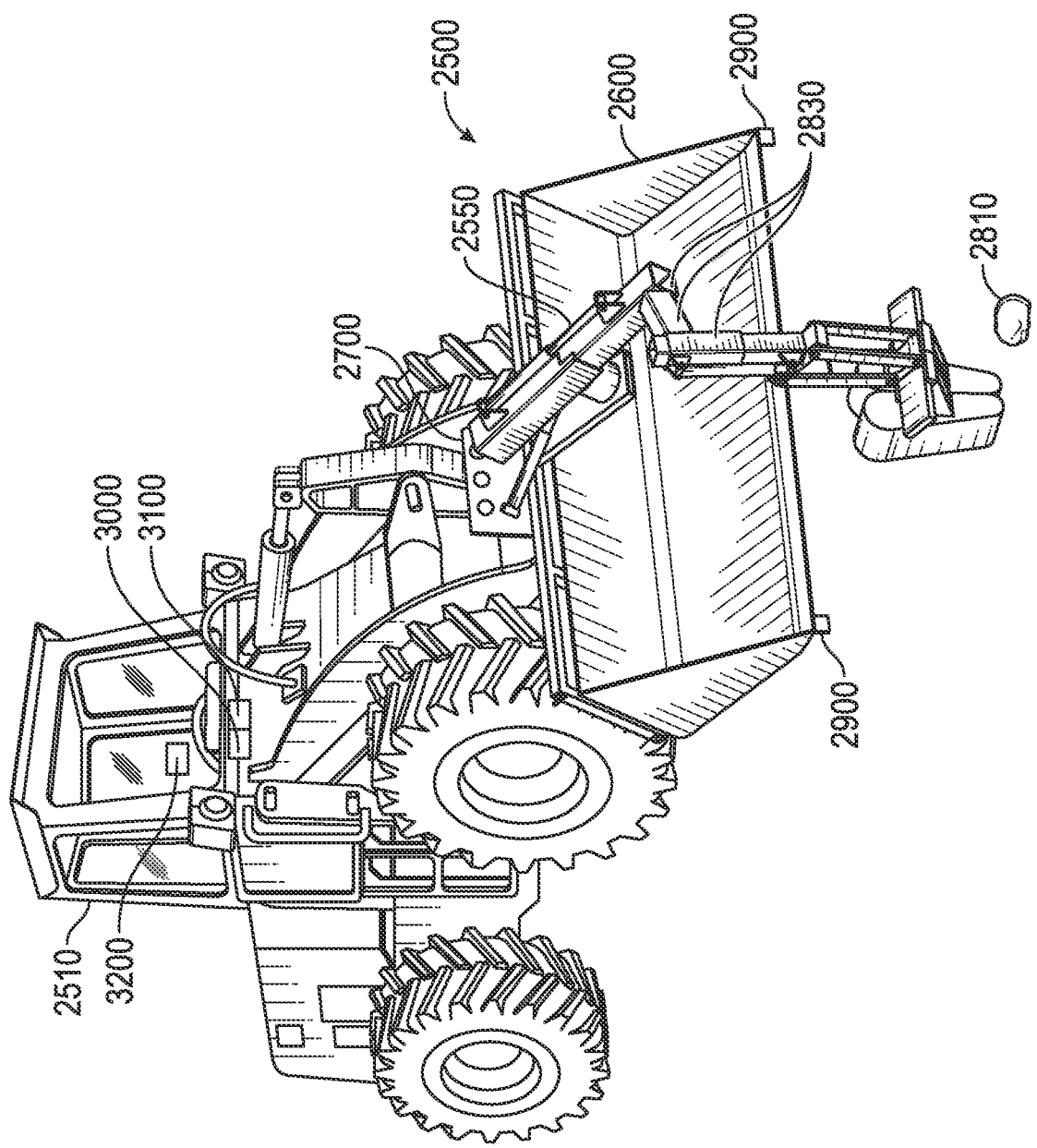
FIG. 35 illustrates a perspective view of an object-collection system having a vehicle, a bucket, and a two paddle object picking assembly with a multilink telescoping picking arm.
Figure 36:
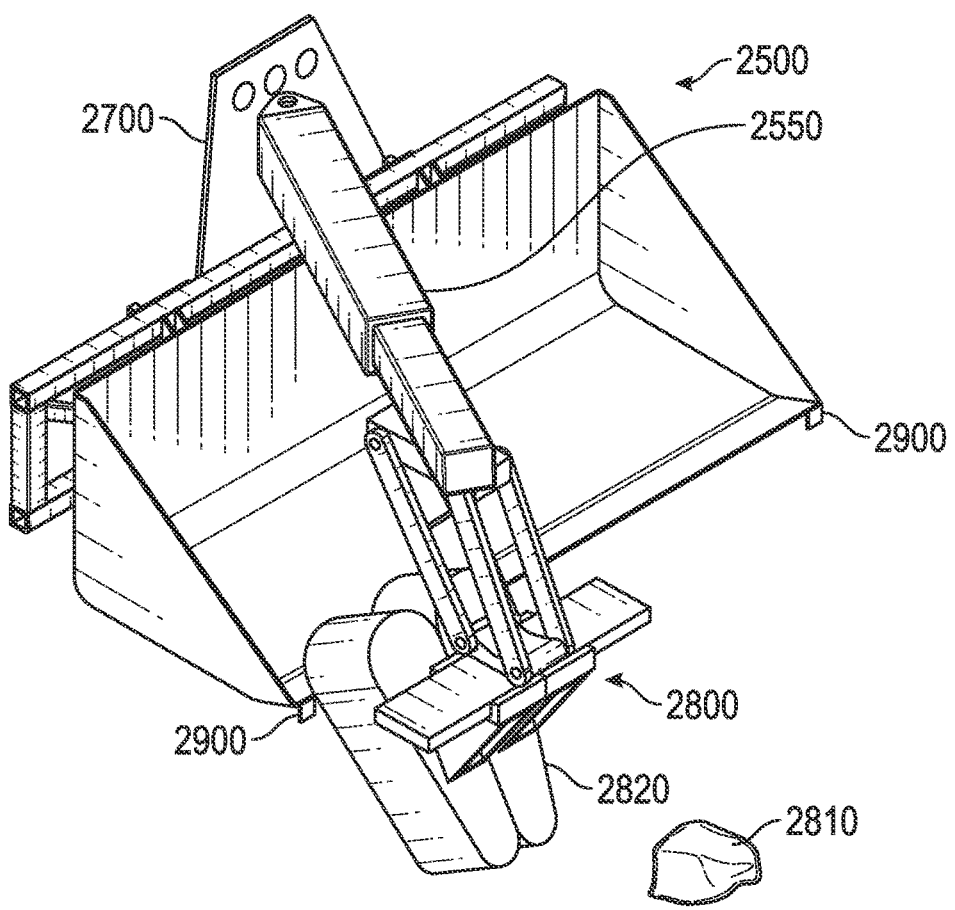
FIG. 36 illustrates a perspective view of an object-collection system having a bucket, and a two paddle object picking assembly with a telescoping picking arm.
Figure 37:
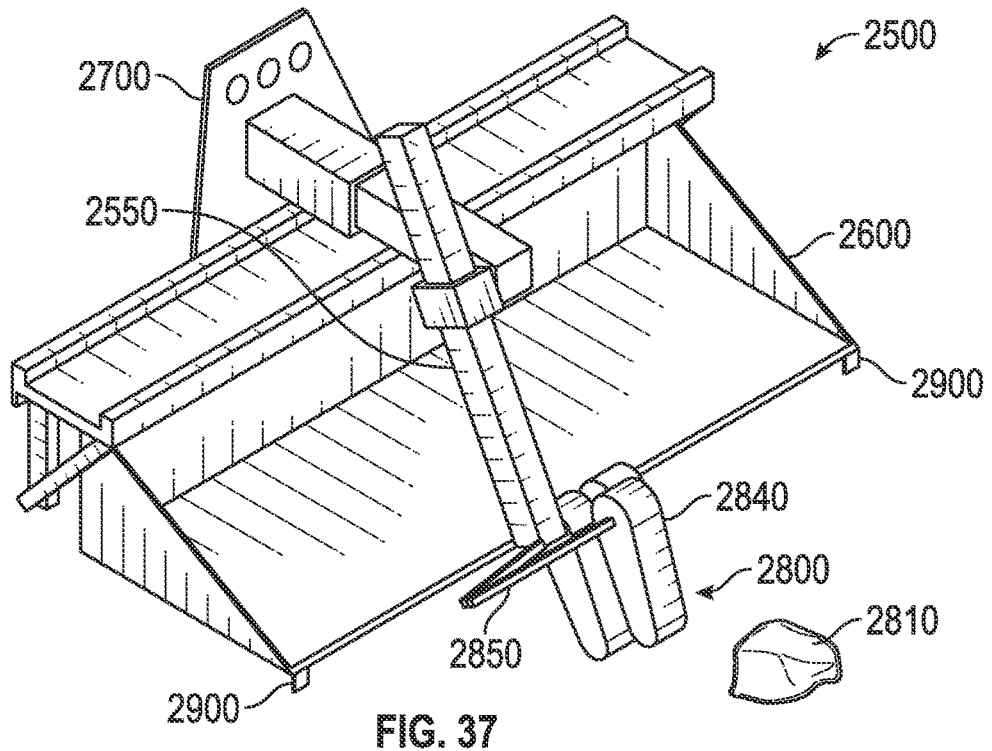
FIG. 37 illustrates a perspective view of an object-collection system having a bucket, and a three paddle object picking assembly with a telescoping picking arm and a hinge on the third paddle.
Figure 38:
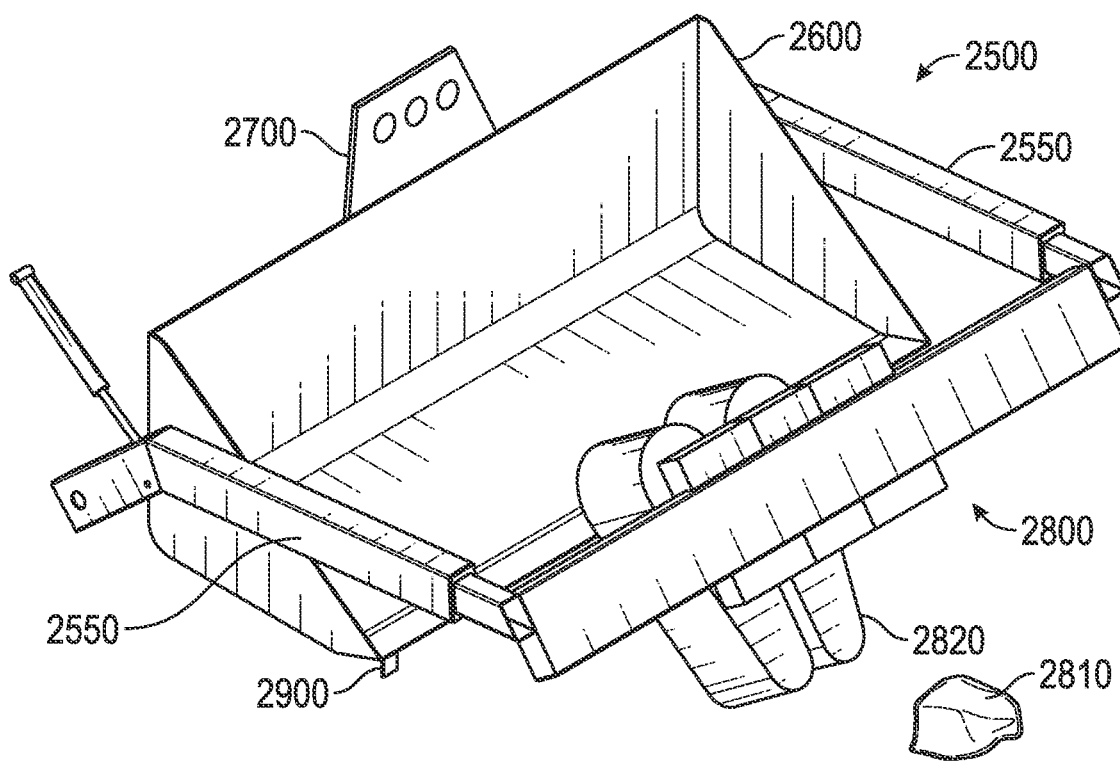
FIG. 38 illustrates a perspective view of an object-collection system having a bucket, and a two paddle object picking assembly with two telescoping picking arms.
Figure 39:
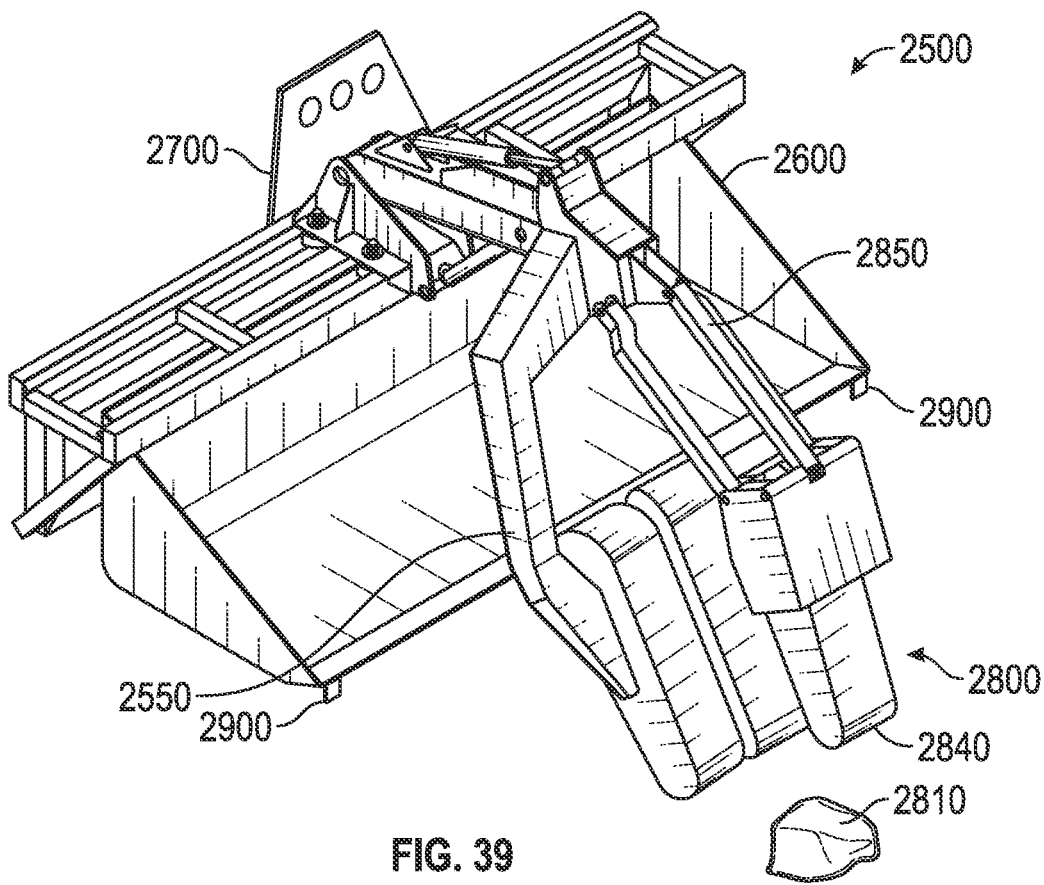
FIG. 39 illustrates a perspective view of an object-collection system having a bucket, and a three paddle object picking assembly with a lateral sliding mechanism and a hinge on the third paddle.

In other aspect of some implementations, the object picking assembly 2800 of the object-collection system 2500 includes an end-effector with two or more paddle components 2820, as shown in FIGS. 35, 36, and 38. Each of the two or more paddle components 2820 of the object-collection system 2500 has one or more moving belts 2846 (see FIGS. 41-42). In another aspect of some implementations, the one or more moving belts 2846 on each of the two or more paddle components 2820 of the object picking assembly 2800 move along a path the pulls objects in between the two or more paddle components 2820. As shown in FIG. 35, in another aspect of some implementations, the two or more paddle components 2820 of the object picking assembly 2820 include multiple joints 2830 which enable repositioning of an object after the object has been picked up. Referring now to FIGS. 37 and 39, in still another aspect of some implementations, the two or more paddle components 2820 of the object picking assembly 2800 include three paddle components 2840. In such an implementation, at least one of the three paddle components 2840 (but potentially two or more of the paddle components) includes a hinge 2850 that enables an object to be pinched so that it may be more easily picked up and manipulated. In yet another aspect of some implementations in which the two or more paddle components 2820 of the object picking assembly 2800 include three paddle components 2840, the first two of the paddle components are fixed in position with respect to each other, while the third paddle component is spaced apart from the first two of the paddle components. In some such implementations, only the third paddle component 2840 includes a hinge 2850 that enables objects to be pinched so that they may be more easily picked up and manipulated.

Referring now FIGS. 35-40, in another aspect of some implementations, the object-collection system 2500 includes one or more sensor arrays 2900 that determine whether or not the object picking assembly 2800 was successful in picking up an object. In some implementations, the sensor array 2900 includes one or more altitude sensors that determine the height distance between the ground and at least one of the object picking assemblies with its associated bucket. This height distance determination is significant in that the height distance may be continuously changing as the vehicle 2510 travels over uneven ground. In this regard, the height distance must be known so that the time needed for the object picking assembly 2800 to contact and pick up the object (e.g., rock, vegetable, fruit, mechanical object, natural object, and the like) may be determined. The time may be referred to as the sting time or strike time.

In other aspects of some implementations shown in FIGS. 35-40, the object-collection system 2500 analyzes a plurality of images taken by the one or more cameras 2700, identifies object in the plurality of images, and tags false negatives. In this regard, a false negative may be defined as an object 2810 that was not included in one or more identified objects in object information that was obtained from another part of a related system. In some implementations, tagging a false negative includes dropping virtual pins at locations of the false negatives in stored mapping data.

In still other aspects of some implementations of the object-collection system 2500, the movement of a target object is tracked across the plurality of images in stored mapping data and in object information that was obtained from another part of a related system. Notably, in some implementations, the object-collection system 2500 applies a parallax correction to assist with picking up a target object at a correct location. Parallax is a difference in the apparent position of an object viewed along two different lines of sight (e.g., one line of sight from the images in stored mapping data and another line of sight from the one or more cameras 2700). The parallax is corrected using a function of an angle of inclination between those two lines of sight. If the object 2810 is unable to be picked up by the object picking assembly 2500 due to its size, weight, location, or other parameter, the object-collection system 2500 leaves the object 2810 at its original location and tags the unpicked object by dropping a virtual pin at a location of the unpicked object in stored mapping data.

Figure 40:
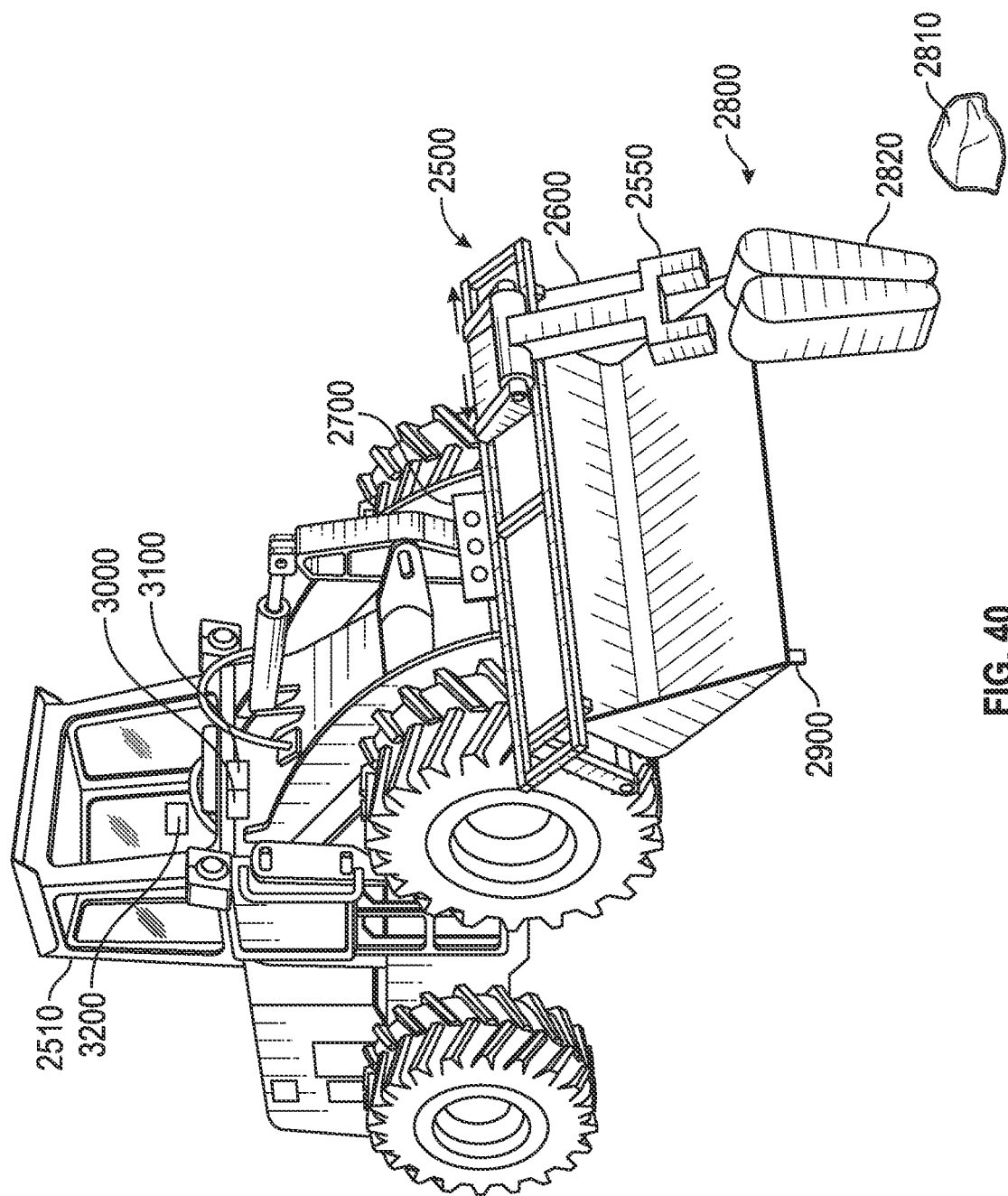
FIG. 40 illustrates a perspective view of an object-collection system having a vehicle, a bucket, and a two paddle object picking assembly with a lateral sliding mechanism.

Referring now to another aspect of the system shown in FIGS. 35-40, the one or more buckets 2600 of the object-collection system 2500 have a width, length, and height dimension. In some implementations, as shown in FIG. 40, one or more object picking assemblies 2800 are movably connected along a lateral axis to the bucket 2600, enabling the one or more object picking assemblies 2800 to slide laterally along the width of the bucket 2600 to assist in positioning the one or more object picking assemblies 2800 for picking up objects 2810. Additionally, the bucket 2600 is positioned a height distance above the ground. In some implementations, as shown in FIGS. 35-38, one or more object picking assemblies 2800 are movably connected to the bucket 2600 for extension and retraction, enabling the one or more object picking assemblies 2800 to move towards the ground with respect to the bucket 2600 in picking up objects 2810. As described above, the time it takes for the object picking assembly 2800 to move from an initial retracted position to an extended position that contacts an object 2810 to be picked is referred to as the sting time.

In some implementations of the object-collection system 2500, one or more object picking assemblies 2800 are operatively associated with the bucket 2600 by using one or more picker arms 2550 (e.g., one picker arm in FIGS. 35-37 and 39-40, and two picker arms in FIG. 38) to manipulate the one or more object picking assemblies 2800 with respect to objects 2810 to be picked. In another aspect of some implementations, the one or more picker arms 2550 have one or more degrees of freedom. In another aspect of some implementations, the one or more picker arms 2550 are extendable, enabling the one or more object picking assemblies 2800 to move away from the bucket 2600 and towards an object 2810 to be picked on the ground. Correspondingly, the one or more picker arms 2550 are retractable, enabling the one or more object picking assemblies 2800 to move towards the bucket 2600 and away from the ground after an object 2810 has been picked. Furthermore, in some implementations, the one or more picker arms 2550 are extendable and retractable by one segment of one or more picker arms telescoping within another segment of the one or more picker arms.

In another aspect of some implementations, the bucket 2600 of the object-collection system 2500 is rotatably connected to the vehicle 2510, enabling the bucket 2600 to rotate and dump objects 2810 that have been placed in the bucket 2600. In still another aspect of some implementations, the bucket 2600 and the one or more object picking assemblies 2800 are positioned on a front side of the vehicle 2510. In other implementations, the bucket 2600 and the one or more object picking assemblies 2800 are pulled behind the vehicle 2510. In some implementations, the object-collection system 2500 includes a plurality of buckets 2600 and a plurality of object picking assemblies 2800.

Additionally, some implementations the object-collection system 2500 shown in FIGS. 35 and 40 further include an in-cab display screen 3200 that presents a visual representation of the objects 2810 approaching the vehicle 2510. In another aspect of the object-collection system 2500 the control system is connected to the in-cab display screen 3200 and generates the visual representation of the objects 2810 approaching the vehicle 2510 from one or more of: the one or more identified objects in object information, the stored mapping data, and data collected from the one or more cameras 2700, and the data collected from the one or more sensor arrays 2900. In another aspect of some implementations, the vehicle 2510 is driven autonomously along a determined path to pick up identified objects 2810 using information from one or more of: the one or more identified objects in object information, the stored mapping data, and data collected from the one or more cameras 2700, and the data collected from the one or more sensor arrays 2900.

In still another aspect of some implementations, object picking success is confirmed using load sensors associated with the bucket 2600. In yet another aspect of some implementations, object picking success is confirmed using a three dimensional camera system and volumetric estimates. Moreover, in yet another aspect of some implementations, the object-collection system 2500 includes a rear facing camera to identify objects that failed to be picked up by the object-collection system.

In another implementation, the object-collection system 2500 includes one or more buckets 2600 connected to a vehicle 2510, one or more object picking assemblies 2800, one or more processors 3000, and one or more memories 3100. An object picking assembly 2800 is configured to pick up objects 2810 off of the ground. In some implementations, the object picking assembly 2800 is disposed at a front-end of the bucket 2600. In other implementations, the object picking assembly 2800 is disposed at another section of the bucket 2600, such as the top, side, or rear of the bucket 2600. The object picking assembly 2800 may be connected directly to the front end of the bucket or may be connected to the front end of the bucket 2600 via a linkage assembly. Correspondingly, the object picking assembly 2800 may be connected directly to the top, side, or rear of the bucket or may be connected to the top, side, or rear of the bucket 2600 via a linkage assembly. In still other implementations, the object picking assembly 2800 is operatively associated with the bucket 2600, but is actually connected, either directly or indirectly, to another part of the object-collection system 2500, such as the vehicle 2510.

In another aspect of some implementations, the object-collection system 2500 includes a control system with at least one or more processors 3000 and one or more memories 3100. The one or more memories 3100 store computer instructions that are executed by the one or more processors 3000 and cause the processors 3000 to carry out various functions. In some implementations, these functions include, by way of example only, and not by way of limitation, obtain object information for each of one or more identified objects; guide the object-collection system over a target geographical area toward the one or more identified objects based on the object information; receive a plurality of images of the ground relative to the object-collection system as the object-collection system is guided towards the one or more identified objects; identify a target object in the plurality of images based on a dataset of trained object parameters; track movement of the target object across the plurality of images as the object-collection system is guided towards the one or more identified objects; and employ the tracked movement of the target object to instruct the object-collection system to pick up the target object.

Figure 41A:
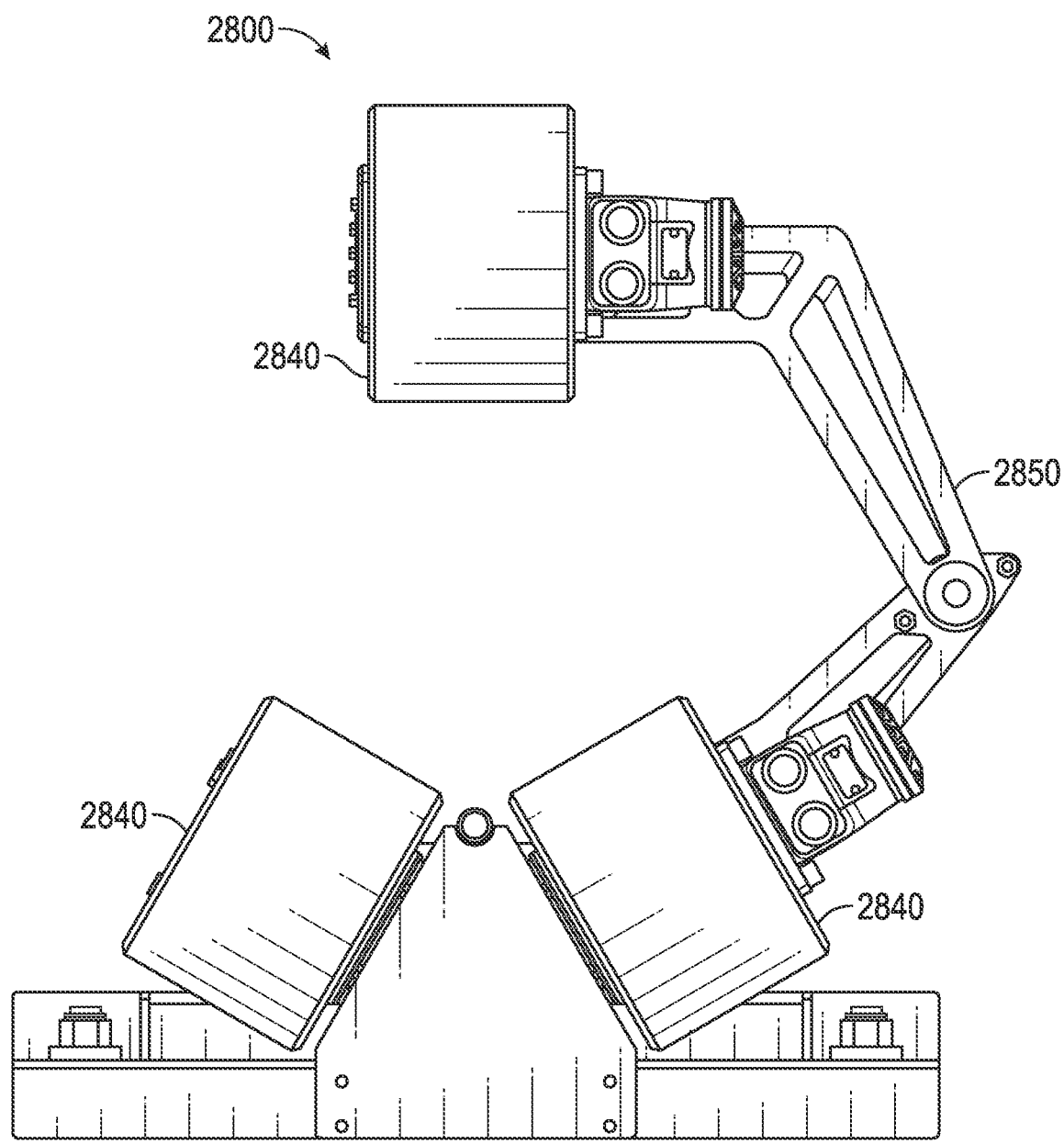
FIGS. 41A-41C illustrate various views of an object-collection system having a three paddle object picking assembly with a moving belts on the third paddle.
Figure 41B:
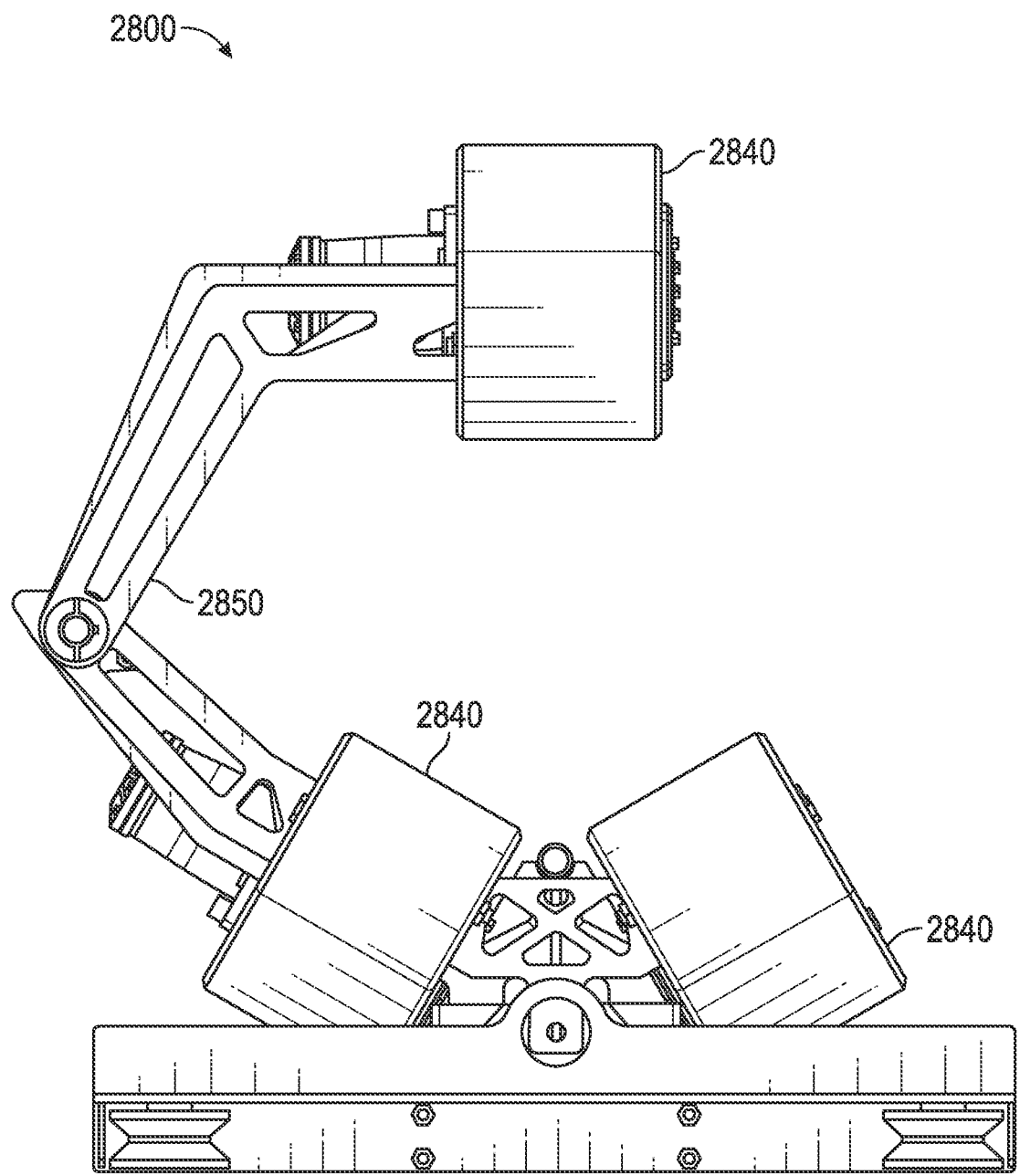
Figure 41C:
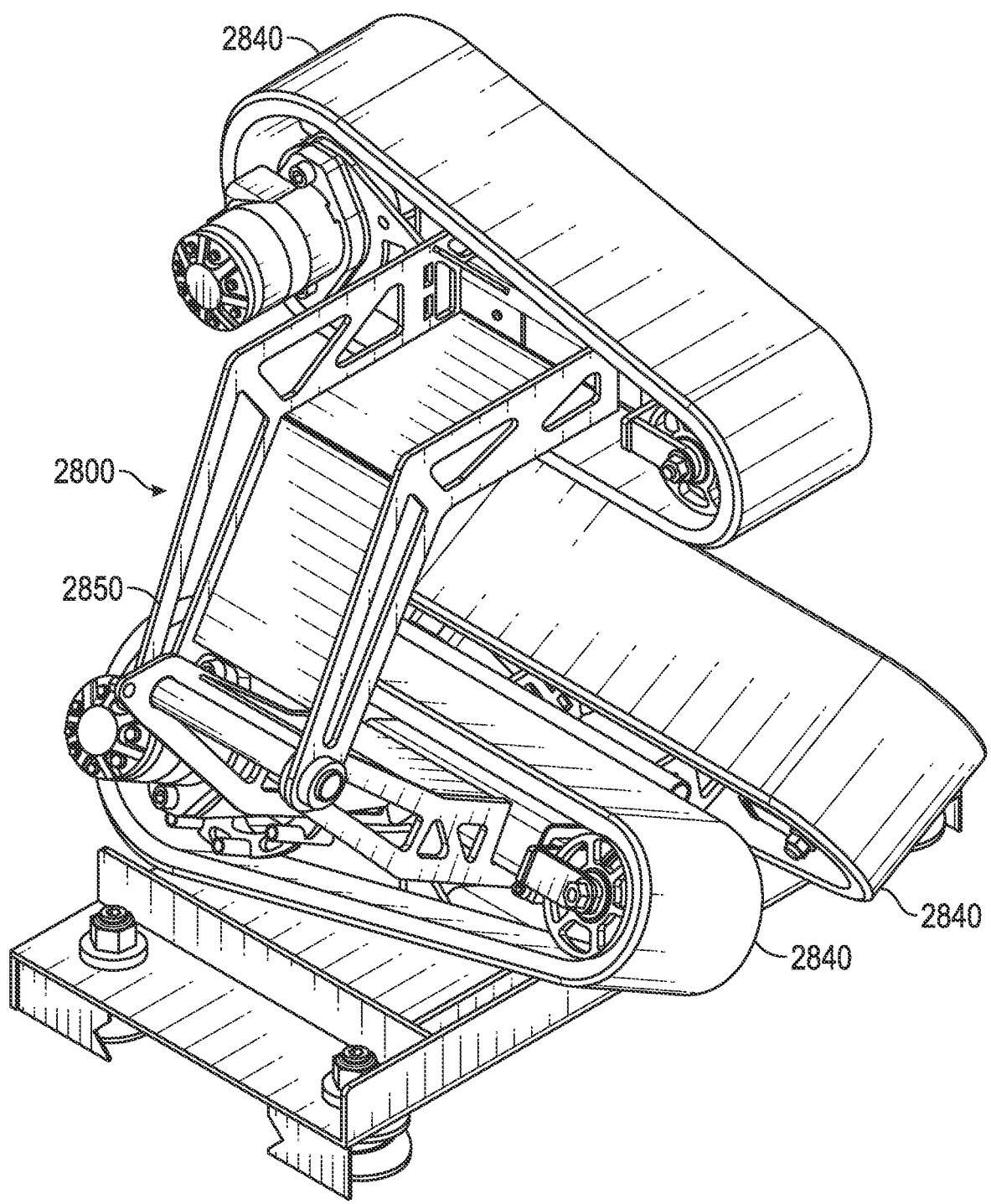
Figure 42:
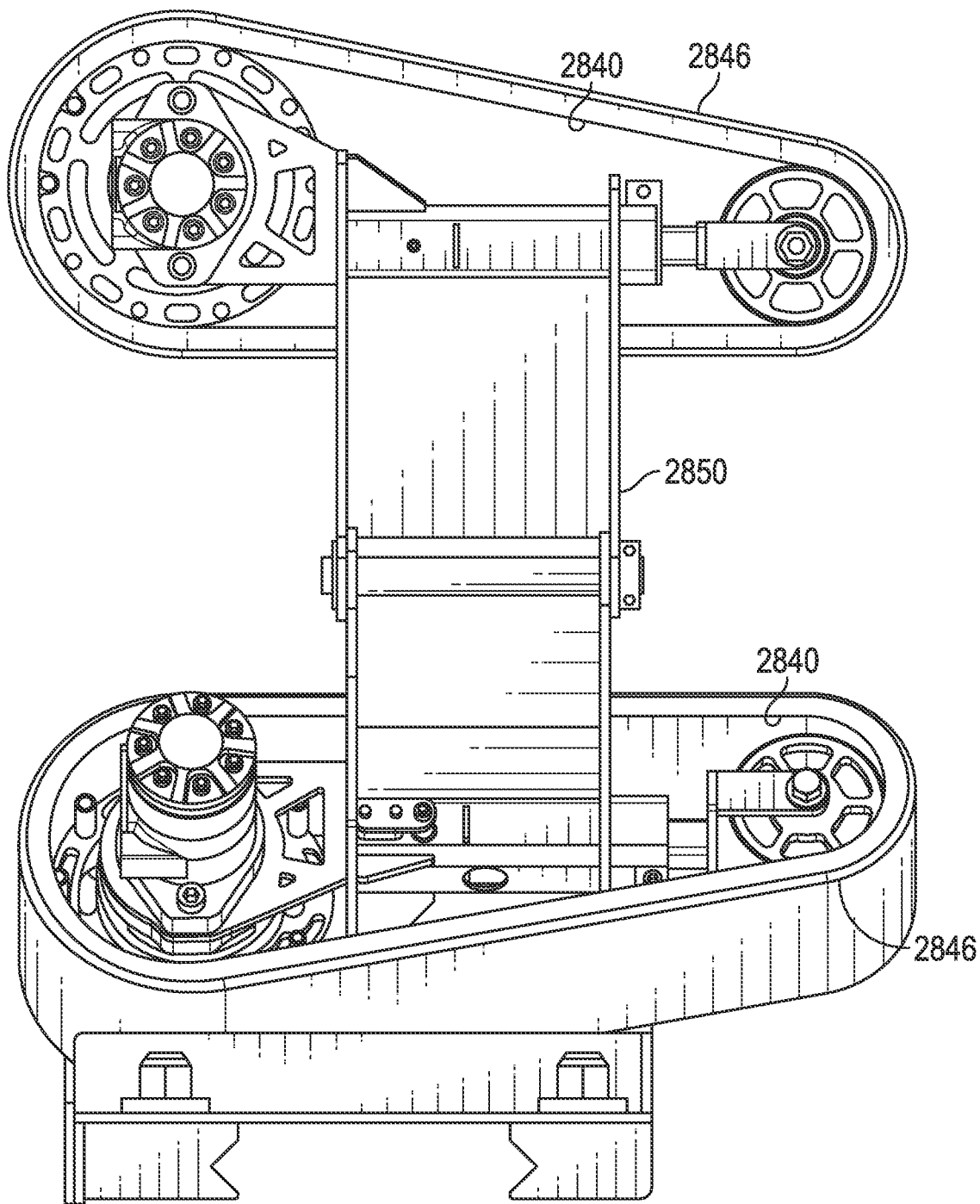
FIGS. 42-43 illustrate additional views of an object-collection system having a three paddle object picking assembly with a moving belts on the third paddle.
Figure 43:
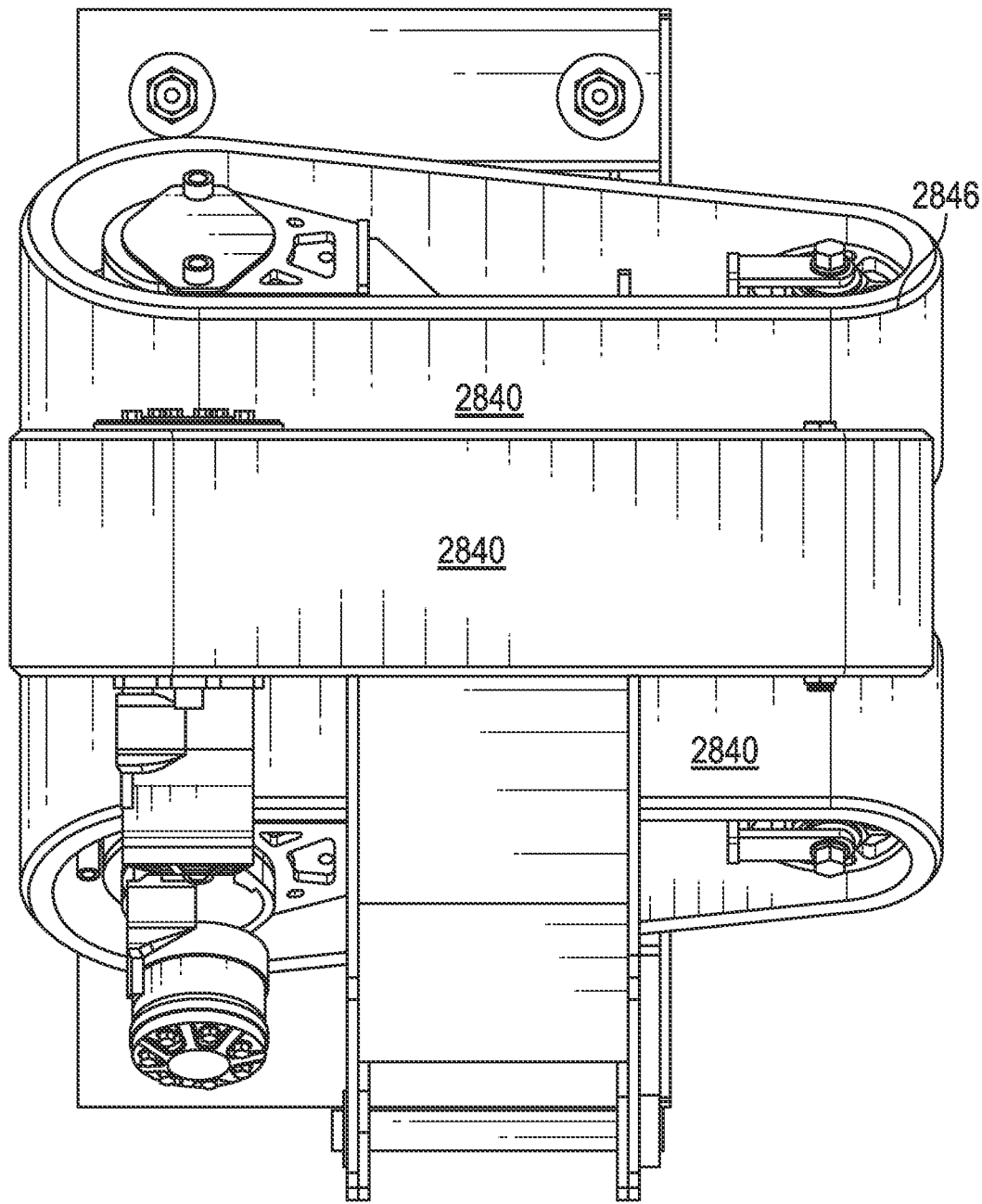
Figure 44:
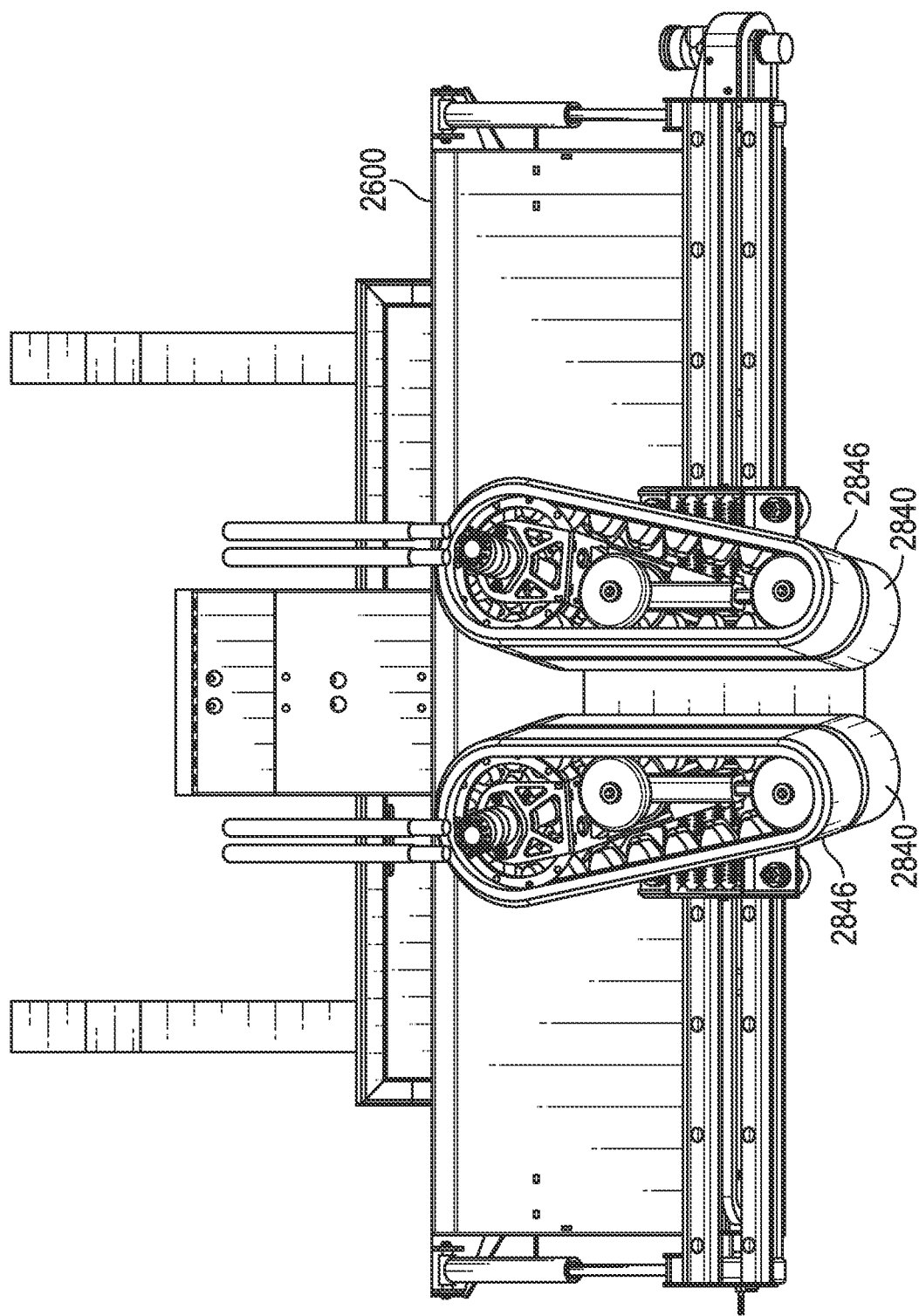
FIGS. 44, 45A, 45B, and 45C illustrate various views of an object-collection system having a two paddle object picking assembly with a two moving belts on each of the two paddles.
Figure 45A:
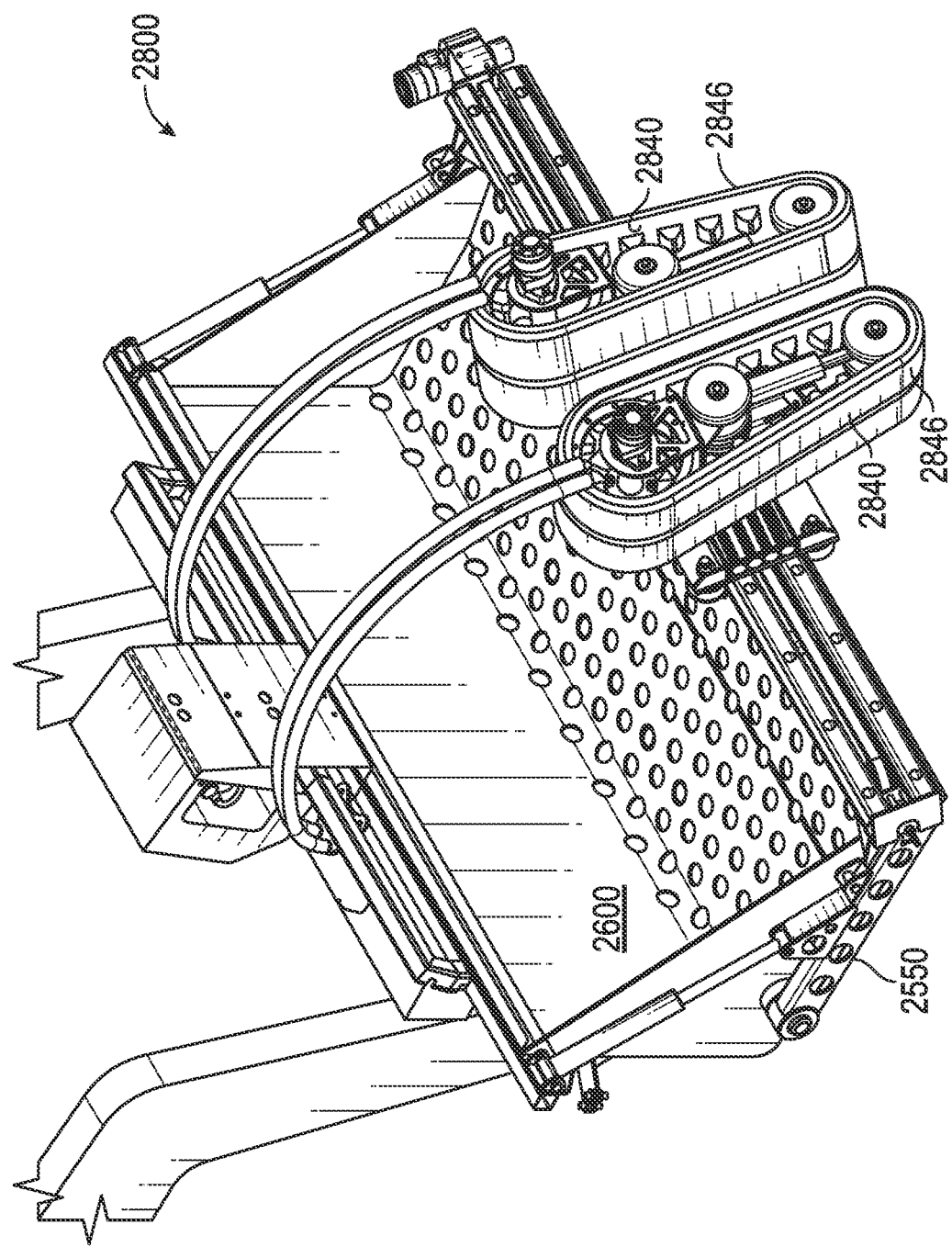
Figure 45B:
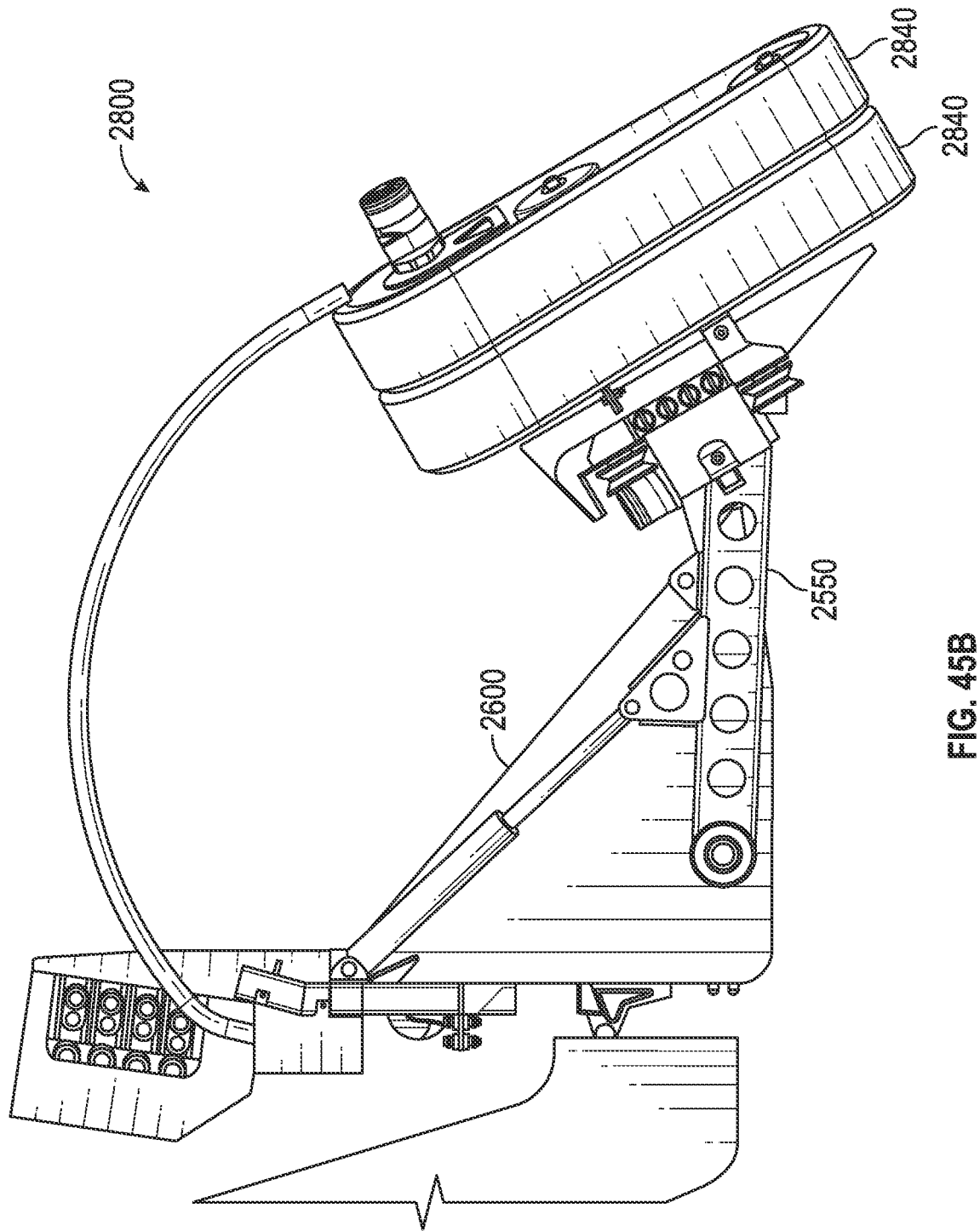
Figure 45C:
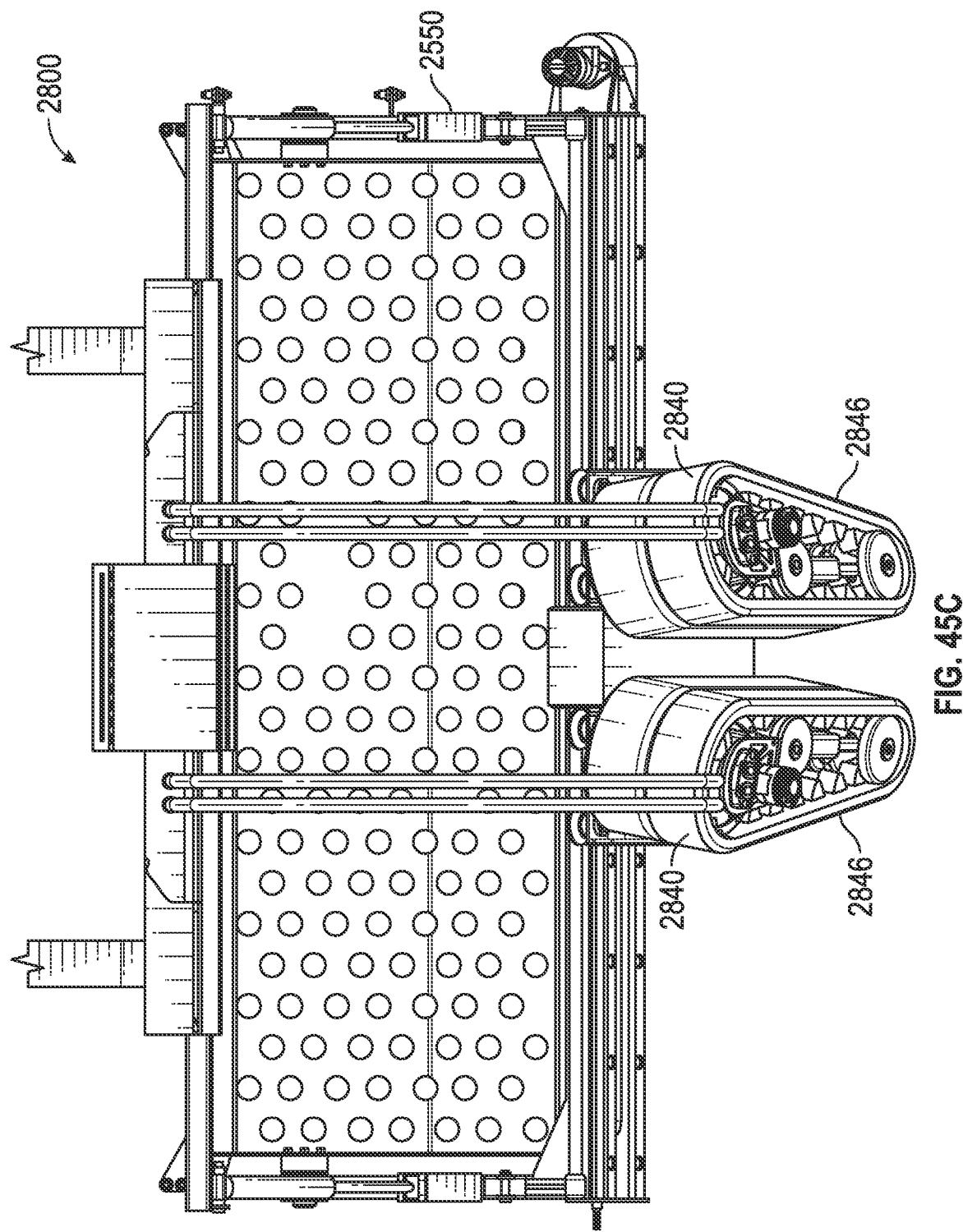

Referring now to FIGS. 41A-45C, several additional implementations of the object-collection system 2500 are shown. Specifically, FIGS. 41A, 41B, and 41C shown an object picking assembly 2800 that includes three paddle components 2840 and rotating belts 2846 on each paddle component. As shown in FIGS. 44, 45A, 45B, and 45C, in some implementations there is more than one rotating belt associated with each paddle component. By employing three paddle components 2840, and one or more rotating belts 2846 on each paddle component, the object picking assembly 2800 is able to pinch, re-orient, and manipulate objects during a collection process. In some implementations in which one or more paddle components have multiple rotating belts 2846, the belts are capable of rotating at different speeds, in different directions, or both, which assists in re-orienting and manipulating objects during a collection process. Additionally, as shown in FIGS. 41A, 41B, 41C, and 42 a hinge 2850 may be used to associate the third paddle component with at least one of the other two paddle components. In other implementations, other types of linkages with multiple components and joints may be used in more complex arrangements to provide a greater number of degrees of freedom to the third paddle component. Such multi-components linkages may include numerous arms and joints, telescoping components, multiple belts, and combinations thereof to provide advanced positioned and manipulation capabilities.

Operations of processes described herein can be performed in any suitable order unless otherwise indicated herein or otherwise clearly contradicted by context. The processes described herein (or variations and/or combinations thereof) are performed under the control of one or more computer systems configured with executable instructions and are implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media, and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, a non-transitory computer-readable storage medium store instructions and a main CPU executes some of the instructions while a graphics processor unit executes other instructions. In an embodiment, different components of a computer system have separate processors, and different processors execute different subsets of the instructions.

Accordingly, in an embodiment, computer systems are configured to implement one or more services that singly or collectively perform operations of processes described herein, and such computer systems are configured with applicable hardware and/or software that enable the performance of the operations.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure. All references, including publications, patent applications, and patents, cited herein are hereby incorporated by reference to the same extent as if each reference were individually and specifically indicated to be incorporated by reference and were set forth in its entirety herein.

The invention claimed is:

1. An object-collection system, comprising:
a ground-based object picker assembly configured to capture a target object;
a camera configured to capture a plurality of images in a direction of movement of the ground-based object picker assembly;
a memory that stores computer instructions;
a processor configured to execute the computer instructions to:
capture, via the camera, a plurality of images as the ground-based object picker assembly moves along the ground;
identify a target object in the plurality of images based on an analysis of features of the target object;
track relative movement of the target object, with respect to the ground-based object picker assembly, through the plurality of images;
determine a position of the ground-based object picker assembly relative to the target object based on an analysis of the plurality of images;
align the ground-based object picker assembly with the target object based on the tracked relative movement of the target object, with respect to the ground-based object picker assembly, and the determined position of the ground-based object picker assembly;
determine when the target object is at a position in at least one of the plurality of images to trigger pick up the target object; and
in response to determining that the target object is at the position to trigger pick up the target object, instruct the ground-based object picker assembly to pick up the target object.

2. The object-collection system of claim 1, wherein the processor is configured to determine the position of the ground-based object picker assembly by further executing the computer instructions to:
employ an artificial neural network to identify a position of the ground-based object picker assembly within the plurality of images.

3. The object-collection system of claim 1, wherein the processor is configured to align the ground-based object picker assembly with the target object by further executing the computer instructions to:
move the ground-based object picker assembly horizontally to align with the target object.

4. The object-collection system of claim 1, wherein the processor is configured to align the ground-based object picker assembly with the target object by further executing the computer instructions to:
instruct the ground-based object picker assembly to autonomously move to align the ground-based object picker assembly with the target object.

5. The object-collection system of claim 1, wherein the processor is configured to further execute the computer instructions to:
instruct the ground-based object picker assembly to pick up the target object in response to alignment of the ground-based object picker assembly with the target object when the target object is within range of the ground-based object picker assembly.

6. The object-collection system of claim 1, wherein the processor is configured to further execute the computer instructions to:
instruct the ground-based object picker assembly to move to a pick-up height to pick up the target object in response to the target object being within range of the ground-based object picker assembly and the ground-based object picker assembly being aligned with the target object; and
instruct the ground-based object picker assembly to move to a storage height after the target object is picked up, wherein the ground-based object picker assembly is within view of the camera when in the storage height.

7. The object-collection system of claim 1, wherein the processor is configured to identify the target object in the plurality of images by further executing the computer instructions to:
modifying the plurality of images such that there is an even and uniform pixel distribution within visual area representative of a swath area of the ground-based object picker assembly; and
identify the target object in the plurality of modified images based on a dataset of known object features.

8. The object-collection system of claim 1, wherein the processor is configured to further execute the computer instructions to:
  guide the ground-based object picker assembly along a pick-up path, including:
    select a travel waypoint on the pick-up path;
    determine a travel direction from a current location to the travel waypoint; and
    provide guide information from the current location to the travel waypoint on the pick-up path.

9. The object-collection system of claim 1, wherein the processor is configured to further execute the computer instructions to:
  determine when the target object is at a trigger line in at least one of the plurality of images;
  in response to determining that the target object is at the trigger line, instructing the ground-based object picker assembly to pick up the target object; and
  modify a position of the trigger line in the plurality of images based on a speed of the ground-based object picker assembly.

10. A method, comprising:
  capturing a plurality of images in a direction of movement of an ground-based object picker assembly as the ground-based object picker assembly moves;
  identifying a target object in the plurality of images based on an analysis of features of the target object;
  tracking relative movement of the target object, with respect to the ground-based object picker assembly, from image to image through the plurality of images;
  determining a position of the ground-based object picker assembly relative to the target object based on an analysis of the plurality of images;
  aligning the ground-based object picker assembly with the target object based on the tracked relative movement of the target object, with respect to the ground-based object picker assembly, and the determined position of the ground-based object picker assembly;
  determining when the target object is at a position in at least one of the plurality of images to trigger pick up the target object; and
  in response to determining that the target object is at the position to trigger pick up the target object, instructing the ground-based object picker assembly to pick up the target object.

11. The method of claim 10, wherein determining the position of the ground-based object picker assembly comprises:
  employing an artificial neural network to identify a position of the ground-based object picker assembly within the plurality of images.

12. The method of claim 10, wherein aligning the ground-based object picker assembly with the target object comprises:
  moving the ground-based object picker assembly horizontally to align with the target object.

13. The method of claim 10, wherein aligning the ground-based object picker assembly with the target object comprises:
  instructing the ground-based object picker assembly to autonomously move to align the ground-based object picker assembly with the target object.

14. The method of claim 10, further comprising:
  instructing the ground-based object picker assembly to pick up the target object in response to alignment of the ground-based object picker assembly with the target object when the target object is within range of the ground-based object picker assembly.

15. The method of claim 10, further comprising:
  instructing the ground-based object picker assembly to move to a pick-up height to pick up the target object in response to the target object being within range of the ground-based object picker assembly and the ground-based object picker assembly being aligned with the target object; and
  instructing the ground-based object picker assembly to move to a storage height after the target object is picked up, wherein the ground-based object picker assembly is within view of the camera when in the storage height.

16. The method of claim 10, wherein identifying the target object in the plurality of images comprises:
  modifying the plurality of images such that there is an even and uniform pixel distribution within visual area representative of a swath area of the ground-based object picker assembly; and
  identifying the target object in the plurality of modified images based on a dataset of known object features.

17. The method of claim 10, further comprising:
  determining when the target object is at a trigger line in at least one of the plurality of images;
  in response to determining that the target object is at the trigger line, instructing the ground-based object picker assembly to pick up the target object; and
  modifying a position of the trigger line in the plurality of images based on a speed of the ground-based object picker assembly.

18. A non-transitory processor-readable storage medium that stores computer instructions that, when executed by a processor on a computer, cause the processor to:
  capture a plurality of images in a direction of movement of an ground-based object picker assembly as the ground-based object picker assembly moves across the ground;
  identify a target object in the plurality of images based on an analysis of features of the target object;
  track relative movement of the target object, with respect to the ground-based object picker assembly, from image to image through the plurality of images;
  determine a position of the ground-based object picker assembly relative to the target object based on an analysis of the plurality of images;
  provide alignment information to align the ground-based object picker assembly with the target object based on the tracked relative movement of the target object, with respect to the ground-based object picker assembly, and the determined position of the ground-based object picker assembly;
  determine when the target object is at a position in at least one of the plurality of images to trigger pick up the target object; and
  in response to determining that the target object is at the position to trigger pick up the target object, instruct the ground-based object picker assembly to pick up the target object.

* * * * *